(12) United States Patent
Oh et al.

(10) Patent No.: US 12,512,509 B2
(45) Date of Patent: *Dec. 30, 2025

(54) SOLID STATE BATTERIES AND METHODS OF MAKING THEREOF

(71) Applicants: LG Energy Solution, Ltd., Seoul (KR); The Regents of the University of California, Oakland, CA (US)

(72) Inventors: Jeong Woo Oh, San Diego, CA (US); Min Sang Song, Daejeon (KR); Ping Liu, San Diego, CA (US); Ke Zhou, San Diego, CA (US); Mengchen Liu, San Diego, CA (US)

(73) Assignees: LG Energy Solution, Ltd., Seoul (KR); The Regents of the University of California

( * ) Notice: Subject to any disclaimer, the term of this patent is extended or adjusted under 35 U.S.C. 154(b) by 0 days.

This patent is subject to a terminal disclaimer.

(21) Appl. No.: 18/972,543

(22) Filed: Dec. 6, 2024

(65) Prior Publication Data

US 2025/0266494 A1     Aug. 21, 2025

Related U.S. Application Data

(60) Provisional application No. 63/554,077, filed on Feb. 15, 2024.

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2220/20* (2013.01); *H01M 2300/008* (2013.01)

(58) Field of Classification Search
CPC ......... H01M 10/0562; H01M 10/0525; H01M 2220/20; H01M 2300/008; H01M 10/056–0569
See application file for complete search history.

(56) References Cited

U.S. PATENT DOCUMENTS 12,148,880 B1 * 11/2024 Liu .................. H01M 10/0525
2012/0094185 A1    4/2012 Tsuchida et al.
(Continued)

FOREIGN PATENT DOCUMENTS

CN      113809399 A    12/2021
CN      117384330 A    1/2024
(Continued)

OTHER PUBLICATIONS

Kim, Kanghyeon, et al. "Trimethylsilyl Compounds for the Interfacial Stabilization of Thiophosphate-Based Solid Electrolytes in All-Solid-State Batteries." Advanced Science 10.33 (2023): 2303308. (Year: 2023).*

(Continued)

*Primary Examiner* — James Lee
(74) *Attorney, Agent, or Firm* — K&L Gates LLP

(57) ABSTRACT

The present disclosure provides additive materials to be added to sulfide-containing solid electrolyte materials for use in solid state batteries, solid state batteries using such additive materials in their solid electrolyte materials, and methods of making such solid state batteries. The additive materials provided herein allow the solid state batteries using such additive materials to operate under relatively lower pressures compared to solid state batteries without such additive materials.

18 Claims, 1 Drawing Sheet

(56) References Cited

U.S. PATENT DOCUMENTS

| | | | |
|---|---|---|---|
| 2023/0253612 A1* | 8/2023 | Cho | ................. H01M 10/0562 |
| | | | 429/322 |
| 2023/0275258 A1 | 8/2023 | Finsy et al. | |
| 2023/0307706 A1 | 9/2023 | Lee et al. | |
| 2024/0234815 A1 | 7/2024 | Xu et al. | |

FOREIGN PATENT DOCUMENTS

| | | |
|---|---|---|
| JP | 2012036254 A | 2/2012 |
| JP | 2016081905 A | 5/2016 |
| KR | 20120016079 A | 2/2012 |
| KR | 20170021687 A | 2/2017 |
| KR | 20180036413 A | 4/2018 |

OTHER PUBLICATIONS

PCT/KR2025/099380—International Search Report mailed on May 14, 2025, 6 pages.

\* cited by examiner

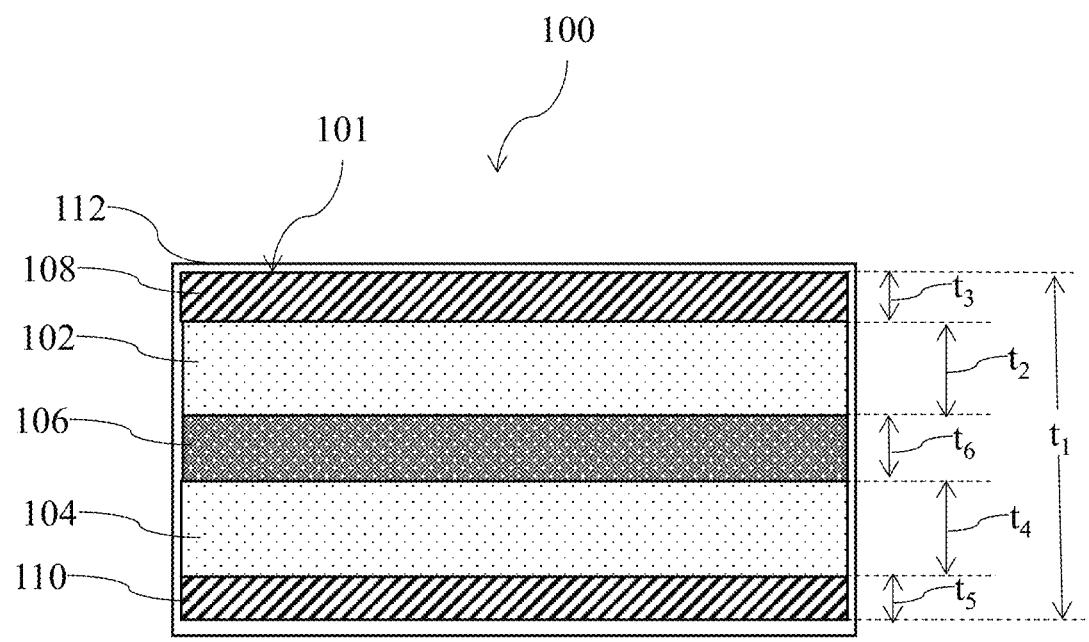

SOLID STATE BATTERIES AND METHODS OF MAKING THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to solid state batteries and methods of making solid state batteries.

Secondary Batteries

Secondary batteries have become increasingly desirable power sources for a wide range of various electronic devices, such as cars, computers, cell phones, tools, scooter, bikes, electronic automobiles, power storage systems, drones, and other devices. Among secondary batteries, lithium-based batteries have gained particular prominence due to their ability to provide a desirable balance of voltage and energy density. In addition to their performance advantages, lithium ion secondary batteries contribute to addressing climate change by enabling the electrification of transportation and facilitating the integration of renewable energy sources. These batteries help reduce greenhouse gas emissions by powering electric vehicles and storing energy from intermittent renewable sources like solar and wind. Furthermore, the long cycle life and high energy density of lithium ion batteries may support the development of smart grids and decentralized energy systems, potentially improving overall energy efficiency and reducing reliance on fossil fuels. Traditionally, lithium secondary batteries include a liquid electrolyte, typically comprising a lithium salt dissolved in an organic solvent. However, there has been growing interest in developing an all solid-state lithium secondary battery as an alternative to conventional liquid electrolyte-based systems. Solid-state batteries offer potential advantages in terms of safety, stability, and energy density. Despite these potential benefits, the development of practical all solid-state lithium secondary batteries faces several significant challenges.

Challenges of All Solid-State Secondary Batteries

One challenge in solid-state battery design is achieving and maintaining sufficient lithium ion diffusivity within the solid electrolyte material. Further, volume changes (e.g. swelling and shrinking) of certain components of the battery—such as the electrode—may occur during discharging and charging of the battery. These volume changes may lead to mechanical stress or result in a loss of contact between various components within the battery structure. The loss of contact between battery components can cause degradation of charging and discharging characteristics, as well as deterioration of overall battery capacity. Researchers and engineers in the field of energy storage are actively working to address these challenges. Efforts are focused on developing new materials and battery designs that can achieve desirable lithium ion diffusivity while also accommodating the mechanical stresses associated with battery cycling. Improving the stability of interfaces within solid-state batteries remains an area of investigation. Overcoming the current limitations of solid-state battery systems could potentially lead to significant advancements in energy storage capabilities for a wide range of applications.

NO ADMISSION OF PRIOR ART

The discussion in this section is intended to provide background information related to the present disclosure and does not constitute an admission of prior art.

SUMMARY

Additive to Solid Electrolyte

The present disclosure relates to additive materials to be added to sulfide-containing solid electrolyte materials for use in solid state batteries. The additive materials provided herein allow the solid state batteries using such additive materials to operate under relatively lower pressures compared to solid state batteries without such additive materials.

Solid State Battery

One aspect of the present disclosure provides a solid state battery comprising: a cathode; an anode; a solid electrolyte layer positioned between the cathode and the anode and configured to enable transport of lithium ions between the cathode and the anode, wherein the solid electrolyte layer comprises: particles comprising a sulfide-containing material; and an additive material represented by A-B-C (Chemical Formula 1), wherein A is a thiol group (S—H) or a leaving group, B is a substituted or unsubstituted C3-C20 perfluoroalkylene group, and C is a sulfonate, a phosphate, or a salt thereof, wherein A is configured to interact with the sulfide-containing material of the particles, wherein at least part of the additive material is interposed between two immediately neighboring ones of the particles.

Solid State Battery—Another Aspect

Another aspect of the present disclosure provides a solid state battery comprising: a cathode; an anode; a solid electrolyte layer positioned between the cathode and the anode and configured to enable transport of lithium ions between the cathode and the anode, wherein the solid electrolyte layer comprises: particles comprising a sulfide-containing material; and an additive material represented by A-B-C (Chemical Formula 1), wherein A is a thiol group (S—H) or a leaving group, wherein A is configured to interact with sulfur of the sulfide-containing material of the particles, wherein at least part of the additive material is interposed between two immediately neighboring ones of the particles, wherein when A is a leaving group, A is selected from the group consisting of chloride, bromide, iodide, tosylate (p-toluenesulfonate) or mesylate (methanesulfonate) groups, acetate or trifluoroacetate groups, phosphate or phosphonate groups, carboxylate groups, alkoxide groups, amine groups, cyano (CN) groups, azide (N3) groups, sulfonate groups, triethoxysilyl, trimethoxysilyl, and combinations thereof, wherein B is a substituted or unsubstituted C3-C20 perfluoroalkylene group, wherein B comprises a group derived from an alkane selected from the group consisting of Propane, n-Butane ($CH_3CH_2CH_2CH_3$), Isobutane ($CH_3CH(CH_3)_2$), n-Pentane ($CH_3(CH_2)_3CH_3$), Isopentane (2-methylbutane, $CH_3CH_2CH(CH_3)_2$), Neopentane (2,2-dimethylpropane, $(CH_3)_4C$), n-Hexane ($CH_3(CH_2)_4CH_3$), 2-Methylpentane ($CH_3CH_2CH_2CH(CH_3)CH_3$), 3-Methylpentane ($CH_3CH_2CH(CH_3)CH_2CH_3$), 2,2-Dimethylbutane ($CH_3C(CH_3)_2CH_2CH_3$), 2,3-Dimethylbutane ($CH_3CH(CH_3)CH(CH_3)CH_3$), n-Heptane ($CH_3(CH_2)_5CH_3$), 2-Methylhexane ($CH_3CH_2CH_2CH_2CH(CH_3)CH_3$), 3-Methylhexane ($CH_3CH_2CH_2CH(CH_3)CH_2CH_3$), 2,2-Dimethylpentane ($CH_3C(CH_3)_2$ $CH_2CH_2CH_3$), 2,3-Dimethylpentane ($CH_3CH(CH_3)CH_2CH(CH_3)CH_3$), 2,4-Dimethylpentane ($CH_3CH(CH_3)CH_2CH_2CH(CH_3)CH_3$), 3,3-Dimethylpentane ($CH_3CH_2CH(CH_3)_2CH_2CH_3$), 3-Ethylpentane ($CH_3CH_2CH(CH_2CH_3)CH_2CH_3$), 2,2,3-Trimethylbutane (($CH_3)_2CHCH2CH(CH_3)_2$), n-Octane ($CH_3(CH_2)_6CH_3$), 2-Methylheptane ($CH_3CH_2CH_2CH_2CH_2CH(CH_3)CH_3$), 3-Methylheptane ($CH_3CH_2CH_2CH_2CH(CH_3)CH_2CH_3$), 4-Methylheptane ($CH_3CH_2CH_2CH(CH_3)CH_2CH_2CH_3$), 2,2-Dimethylhexane ($CH_3C(CH_3)_2 (CH_2)_4CH_3$), 2,3-Dimethylhexane ($CH_3CH(CH_3)CH_2CH_2CH(CH_3)CH_3$), 2,4-Dimethylhexane ($CH_3CH(CH_3)CH_2CH_2CH_2CH(CH_3)CH_3$), 3,3-Dimethylhexane ($CH_3CH_2CH(CH_3)_2CH_2CH_2CH_3$), 3,4-Dimethylhexane ($CH_3CH_2CH(CH_3)CH_2CH(CH_3)CH_3$), 2,2,4-Trimethylpentane (isooctane, $CH_3CH(CH_3)_2CH_2CH(CH_3)_2$), 2-Ethylhexane ($CH_3CH_2CH(CH_2CH_3)CH_2CH_3$), n-Nonane ($CH_3(CH_2)_7CH_3$), 2-Methyloctane ($CH_3CH_2CH_2CH_2CH_2CH_2CH(CH_3)CH_3$), 3-Methyloctane ($CH_3CH_2CH_2CH_2CH_2CH(CH_3)CH_2CH_3$), 2,2-Dimethylheptane ($CH_3C(CH_3)_2 (CH_2)_5CH_3$), 2,3-Dimethylheptane ($CH_3CH(CH_3)CH_2CH_2CH_2CH(CH_3)CH_3$), 2,4-Dimethylheptane ($CH_3CH(CH_3)CH_2CH_2CH(CH_3)CH_2CH_3$), 2,2,4-Trimethylhexane ($CH_3C(CH_3)_2CH_2CH(CH_3)_2 CH_2CH_3$), 3,3-Dimethylheptane ($CH_3CH_2CH(CH_3)_2 CH_2CH_2CH_2CH_3$), 3-Ethylheptane ($CH_3CH_2CH_2CH(CH_2CH_3)CH_2CH_3$), n-Decane ($CH_3(CH_2)_8CH_3$), 2-Methylnonane ($CH_3CH_2CH_2CH_2CH_2CH_2CH_2CH(CH_3)CH_3$), 3-Methylnonane ($CH_3CH_2CH_2CH_2CH_2CH_2CH(CH_3)CH_2CH_3$), 2,2-Dimethyloctane ($CH_3C(CH_3)_2 (CH_2)_6CH_3$), 2,3-Dimethyloctane ($CH_3CH(CH_3)CH_2CH_2CH_2CH_2CH(CH_3)CH_3$), 2,4-Dimethyloctane ($CH_3CH(CH_3)CH_2CH_2CH_2CH(CH_3)CH_2CH_3$), 2,5-Dimethyloctane ($CH_3CH_2CH(CH_3)CH_2CH_2CH_2CH_2CH_3$), 3,3-Dimethyloctane ($CH_3CH_2CH(CH_3)_2CH_2CH_2CH(CH_3)CH_2CH_3$), 2-Ethyloctane ($CH_3CH_2CH(CH_2CH_3)CH_2CH_2CH_3$), n-Undecane ($C_{11}H_{24}$) and its branched isomers, n-Dodecane ($C_{12}H_{26}$) and its branched isomers, n-Tridecane ($C_{13}H_{28}$) and its branched isomers, n-Tetradecane ($C_{14}H_{30}$) and its branched isomers, n-Pentadecane ($C_{15}H_{32}$) and its branched isomers, n-Hexadecane ($C_{16}H_{34}$) and its branched isomers, n-Heptadecane ($C_{17}H_{36}$) and its branched isomers, n-Octadecane ($C_{18}H_{38}$) and its branched isomers, n-Nonadecane ($C_{19}H_{40}$) and its branched isomers, and n-Eicosane ($C_{20}H_{42}$) and its branched isomers, wherein when B is an unsubstituted C3-C20 perfluoroalkylene group, all hydrogen atoms of the group derived from the alkane are substituted by fluorine atoms, wherein when B is a substituted C3-C20 perfluoroalkylene group, a one or more hydrogen atoms of the group derived from the alkane are each substituted by a substituent, and all the other hydrogen atoms of the group derived from the alkane are substituted by fluorine atoms, wherein the substituent is selected from the group consisting of Chloro (—Cl), Bromo (—Br), Iodo (—I), Hydroxyl (—OH), Ether (—OR), Aldehyde (—CHO), Ketone (—CO), Carboxyl (—COOH), Ester (—COOR), Peroxide (—O—O—), Amino (—$NH_2$), Secondary amine (—NHR), Tertiary amine (—NR2)), Nitro (—$NO_2$), Cyanide (—CN), Amide (—$CONH_2$), substituted amides (—CONHR, —$CONR_2$), Thiol (—SH), Sulfide (—SR), Sulfonyl (—$SO_2R$), Sulfate (—$SO_4R$), Phosphate (—$PO_4R_2$), Phosphine (—$PR_2$); Alkyl (—R), Alkylene (—R=R), Cycloalkyl (—R), Aryl (—Ar), Benzyl (—$C_6H_5CH_2$), Alkenyl (—C=C—), Alkynyl (—C≡C—), Aromatic rings, Acyl (—COR); Sulfonyl (—$SO_2R$); Carbamoyl (—$CONH_2$); Isonitrile (—NC); Azide (—$N_3$), Perfluoroalkyl (—$CF_3$) and other fluoroalkyl chains, Acetal (—$RCH(OR)_2$), Ketal (—$RC(OR)_2R$), and Organometallic groups, and wherein C is a sulfonate, a phosphate, a sulfonate salt, or a phosphate salt, wherein the sulfonate salt or the phosphate salt is a salt with at least one selected from the group consisting of sodium (Na), potassium (K), lithium (Li), rubidium (Rb), cesium (Cs), calcium (Ca), magnesium (Mg), strontium (Sr), a barium (Ba), iron (II) (Fe II), iron (III), (Fe III), copper (I) (Cu I), copper (II) (Cu II), zinc (Zn), manganese (Mn), ammonium ($NH_4^+$), methylammonium ($CH_3NH_3^+$), dimethylammonium (—$(CH_3)_2NH_2^+$), trimethylammonium (($CH_3)_3N^+$), pyridinium ($C_5H_5NH^+$), lead (II) (Pb), mercury (II) (Hg), cadmium (Cd), lanthanum (La), cerium (Ce), uranium (U), sodium-calcium (Na—Ca), potassium-magnesium (K—Mg), tetramethylammonium ($N(CH_3)_4^+$), imidazolium ($C_3H_4NH_2^+$), phosphonium ($P^+(CH_3)_4$), and guanidinium ($C(NH_2)_3^+$).

Surface Attachment

In some embodiments, the at least part of the additive material contacts surfaces of either of the two neighboring particles. In some embodiments, the at least part of the additive material contacts surfaces of either of the two neighboring particles by at least one of a covalent bond or a non-covalent attachment.

In some embodiments, contacts between the at least part of the additive material and adjacent particles provide pathways for diffusion of lithium ions in the solid electrolyte layer. In some embodiments, the solid state battery is configured to operate at a pressure under 10 MPa that is substantially lower than a pressure that would be required in the absence of the additive material in the solid electrolyte layer. In some embodiments, the solid state battery is configured to operate under a pressure of less than 5 MPa. In some embodiments, the solid state battery has a specific capacity of greater than 100 mAh/g.

Sulfide-Containing Material

In some embodiments, the sulfide-containing material comprises lithium phosphorus sulfur chloride (LPSCl). In some embodiments, the sulfide-containing material has a volume-based average particle size from about 0.1 μm to about 50 μm as measured by laser diffraction type particle size distribution measurement. In some embodiments, the sulfide-containing material has a first hardness of about 0.1 to about 1 GPa obtained from nanoindentation tests, and the additive material has a second hardness of about 0.001 to about 0.01 GPa obtained from nanoindentation tests. In some embodiments, the sulfide-containing material has a first hardness, the additive material has a second hardness, and the second hardness is at most about 1% of the first hardness. In some embodiments, the additive material is in a powder form.

Additive Material

In some embodiments, the additive material is not in the form of particles. In some embodiments, the leaving group is triethoxysilyl or trimethoxysilyl. In some embodiments, the additive material is selected from the group consisting of

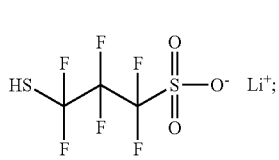

(Chemical Formula 2)

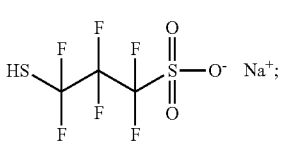

(Chemical Formula 3)

(Chemical Formula 4)
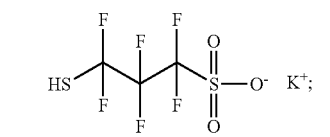
(Chemical Formula 5)
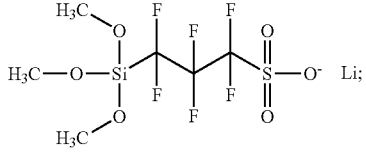
(Chemical Formula 6)
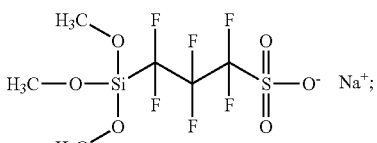
(Chemical Formula 7)
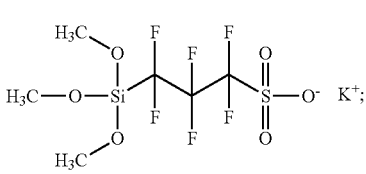
(Chemical Formula 8)
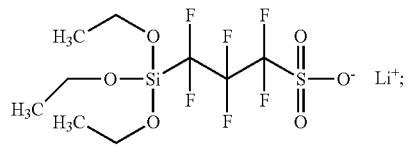
(Chemical Formula 9)
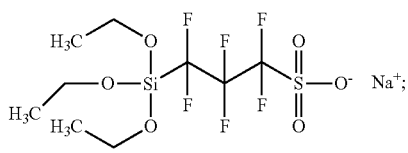
(Chemical Formula 10)
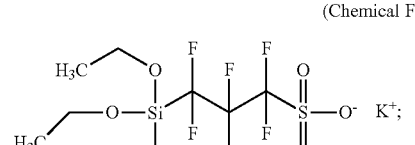
(Chemical Formula 11)
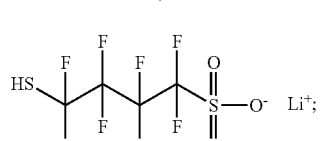
(Chemical Formula 12)
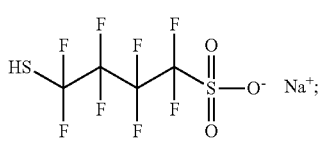
(Chemical Formula 13)
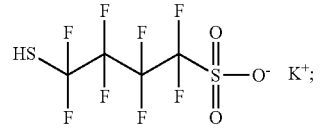
(Chemical Formula 14)
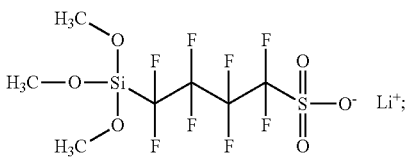
(Chemical Formula 15)
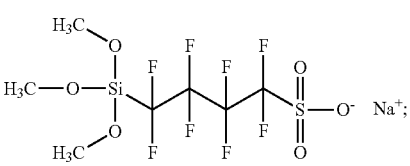
(Chemical Formula 16)
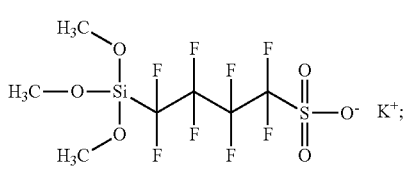
(Chemical Formula 17)
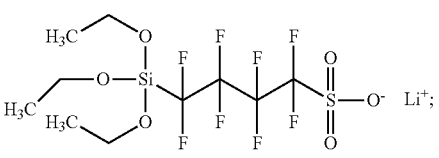
(Chemical Formula 18)
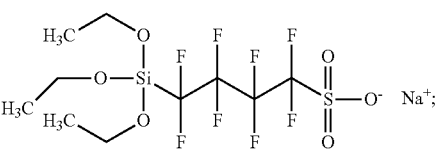
(Chemical Formula 19)
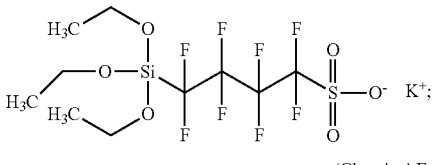
(Chemical Formula 20)
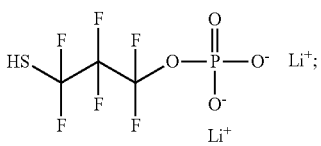
(Chemical Formula 21)
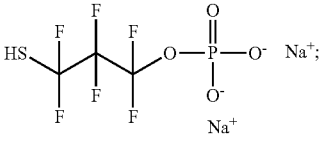
(Chemical Formula 22)
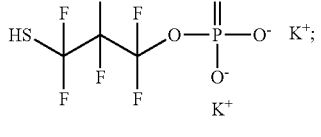

(Chemical Formula 23)
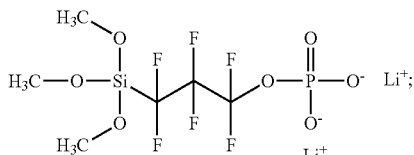

(Chemical Formula 24)
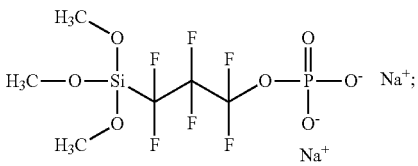

(Chemical Formula 25)
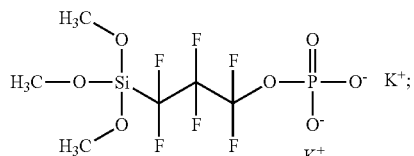

(Chemical Formula 26)
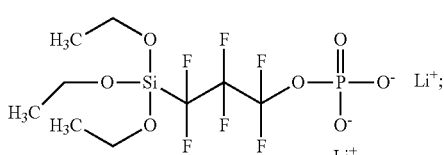

(Chemical Formula 27)
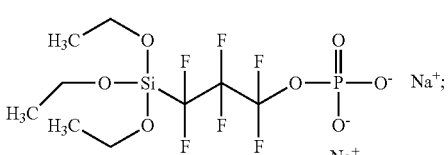

(Chemical Formula 28)
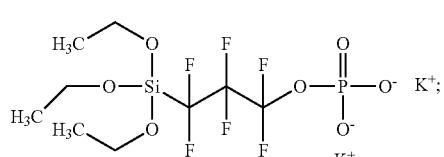

(Chemical Formula 29)
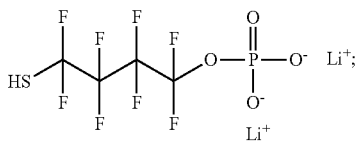

(Chemical Formula 30)
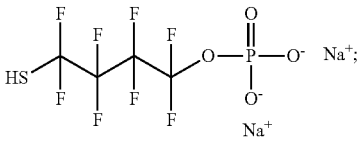

(Chemical Formula 31)
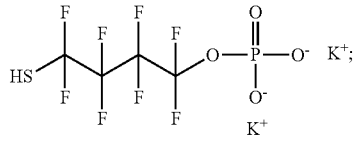

(Chemical Formula 32)
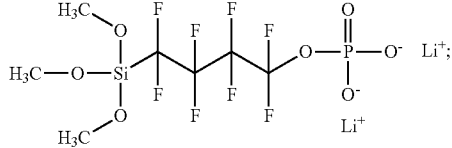

(Chemical Formula 33)
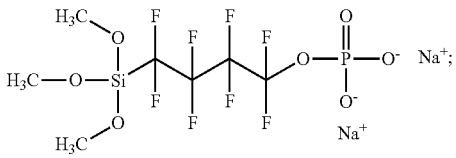

(Chemical Formula 34)
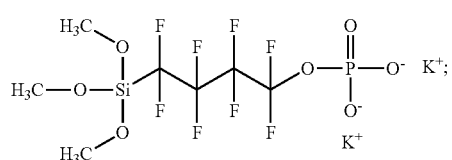

(Chemical Formula 35)
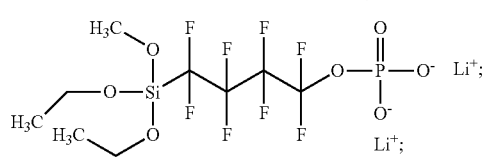

(Chemical Formula 36)
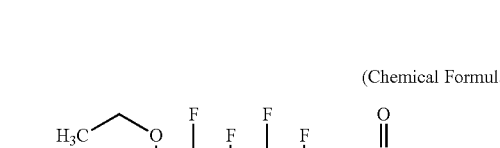

(Chemical Formula 37)
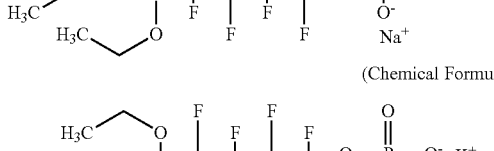

and combinations thereof.

Solid Electrolyte

In some embodiments, the solid electrolyte comprises the sulfide-containing material and the additive material in a weight ratio of from about 1:1 to about 25:1. In some embodiments, the solid electrolyte has a porosity of from about 5% to about 15%. In some embodiments, the solid electrolyte has a density increased by more than about 10% compared to one without the additive material.

Method of Making Solid State Battery

Another aspect of the present disclosure provides a method of making a solid state battery. The method comprises: providing the solid electrolyte, which comprises ball-milling the particles and the additive material provided herein together. In some embodiments, the ball-milling causes A to interact with the sulfide-containing material of the particles such that at least part of the additive material is attached onto surfaces of the particles.

Attachment

In some embodiments, the at least part of the additive material is attached onto surfaces of the particles by a non-covalent attachment. In some embodiments, the non-covalent attachment is chemisorption, van der Waals interaction, or ionic interaction. In some embodiments, the at least part of the additive material is attached onto surfaces of the particles by a covalent bond. In some embodiments, the covalent bond is a sulfide bond or a disulfide bond.

Solid State Battery—Additional Aspect

Another aspect of the present disclosure provides a solid state battery comprising: a cathode; an anode; a solid electrolyte layer positioned between the cathode and the anode and configured to enable transport of lithium ions between the cathode and the anode, wherein the solid electrolyte layer comprises: particles comprising a sulfide-containing material; and an additive material selected from the group consisting of

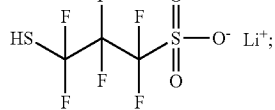

(Chemical Formula 2)

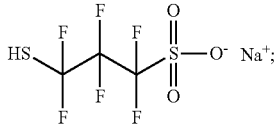

(Chemical Formula 3)

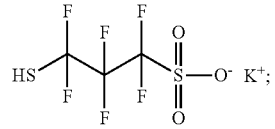

(Chemical Formula 4)

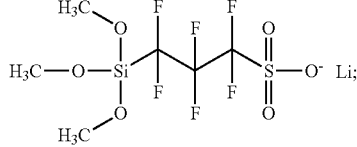

(Chemical Formula 5)

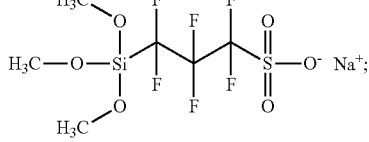

(Chemical Formula 6)

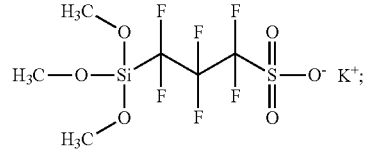

(Chemical Formula 7)

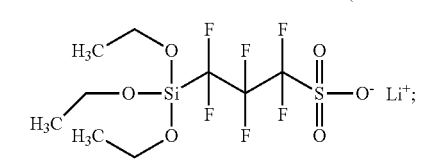

(Chemical Formula 8)

-continued

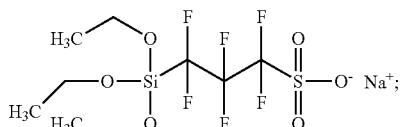

(Chemical Formula 9)

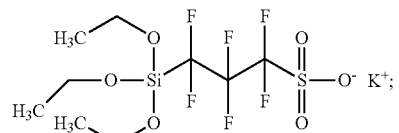

(Chemical Formula 10)

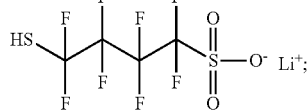

(Chemical Formula 11)

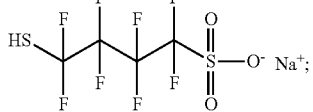

(Chemical Formula 12)

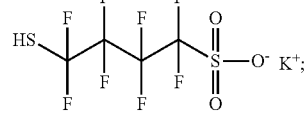

(Chemical Formula 13)

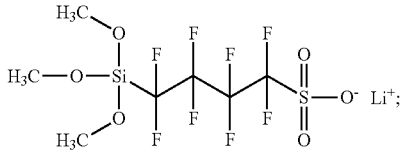

(Chemical Formula 14)

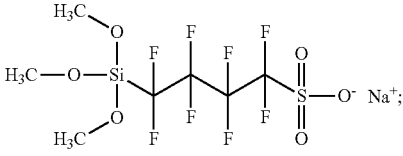

(Chemical Formula 15)

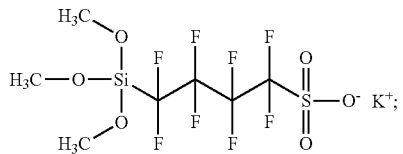

(Chemical Formula 16)

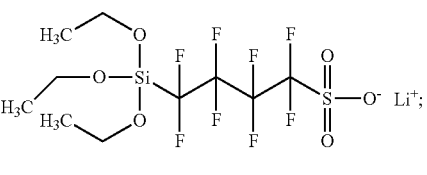

(Chemical Formula 17)

-continued
(Chemical Formula 18)
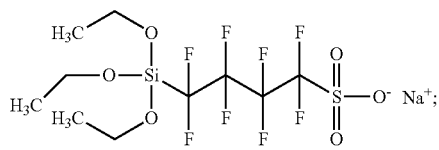
(Chemical Formula 19)
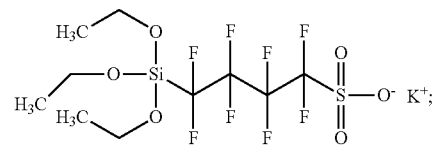
(Chemical Formula 20)
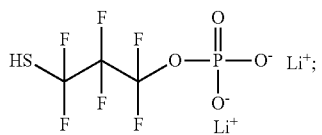
(Chemical Formula 21)
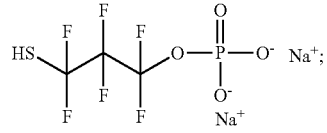
(Chemical Formula 22)
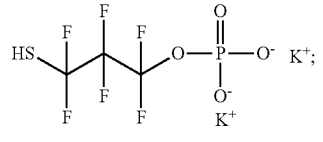
(Chemical Formula 23)
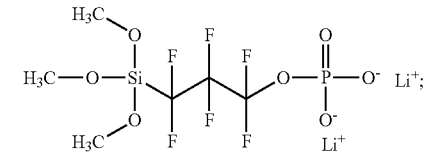
(Chemical Formula 24)
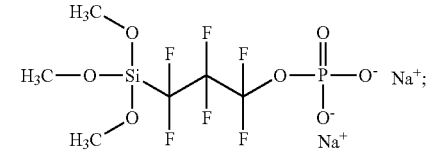
(Chemical Formula 25)
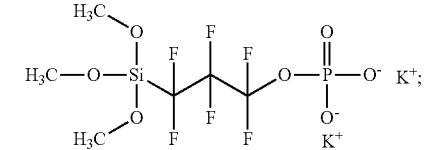
(Chemical Formula 26)
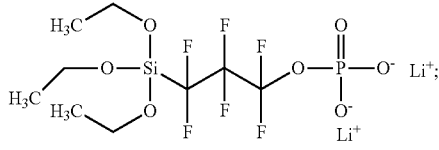
-continued
(Chemical Formula 27)
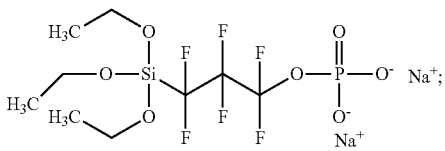
(Chemical Formula 28)
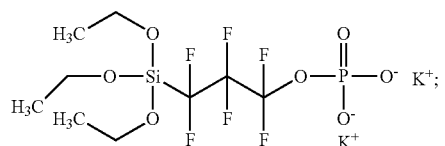
(Chemical Formula 29)
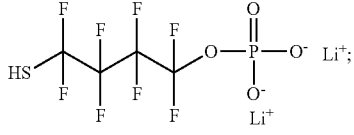
(Chemical Formula 30)
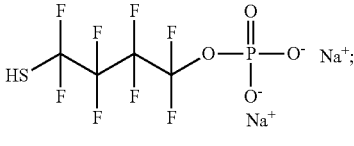
(Chemical Formula 31)
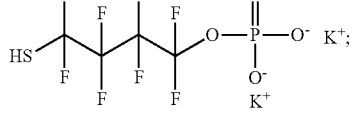
(Chemical Formula 32)
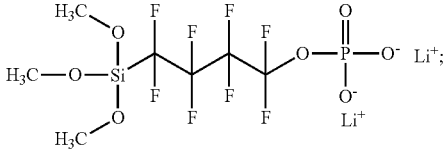
(Chemical Formula 33)
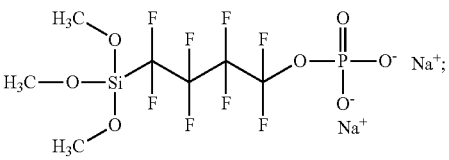
(Chemical Formula 34)
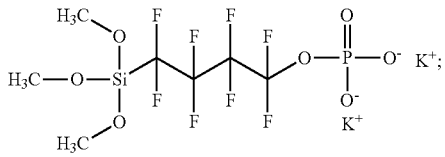
(Chemical Formula 35)
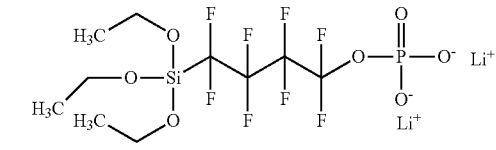

(Chemical Formula 36)

(Chemical Formula 37)

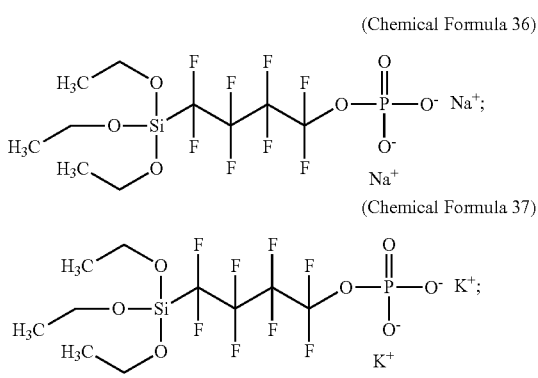

and combinations thereof.

Interaction

In some embodiments, the additive material is configured to interact with sulfur of the sulfide-containing material of the particles, and wherein at least part of the additive material is interposed between two immediately neighboring ones of the particles and contacts surfaces of either of the two neighboring particles by a covalent bond and/or a non-covalent attachment.

Solid State Battery—Different Aspect

Yet another aspect of the present disclosure provides A solid state battery comprising: a cathode; an anode; a solid electrolyte layer positioned between the cathode and the anode and configured to enable transport of lithium ions between the cathode and the anode, wherein the solid electrolyte layer comprises: particles comprising a sulfide-containing material; and an additive material represented by A-B—C (Chemical Formula 1), wherein A is a thiol group (S—H), B is a substituted or unsubstituted C3-C10 perfluoro alkane group, C is a sulfonate, a phosphate, or a salt thereof, wherein A is configured to interact with sulfur of the sulfide-containing material of the particles, wherein at least part of the additive material is interposed between two immediately neighboring ones of the particles.

Substituent

In some embodiments, B is a substituted C3-C10 perfluoro alkane group comprising a substituent selected from the group consisting of Fluoro (F), Chloro (—Cl), Bromo (—Br), Iodo (—I), Hydroxyl (—OH), Ether (—OR), Aldehyde (—CHO), Ketone (—CO)), Carboxyl (—COOH), Ester (—COOR), Peroxide (—O—O—), Amino (—NH$_2$), Secondary amine (—NHR), Tertiary amine (—NR$_2$)), Nitro (—NO$_2$), Cyanide (—CN), Amide (—CONH$_2$), substituted amides (—CONHR, —CONR$_2$), Thiol (—SH), Sulfide (—SR), Sulfonyl (—SO$_2$R), Sulfate (—SO$_4$R), Phosphate (—PO$_4$R$_2$), Phosphine (—PR$_2$); Alkyl (—R), Alkylene (—R=R), Cycloalkyl (—R), Aryl (—Ar), Benzyl (—C$_6$H$_5$CH$_2$), Alkenyl (—C=C—), Alkynyl (—C≡C—), Aromatic rings, Acyl (—COR); Sulfonyl (—SO$_2$R); Carbamoyl (—CONFH); Isonitrile (—NC); Azide (—N$_3$), Perfluoroalkyl (—CF$_3$) and other fluoroalkyl chains, Acetal (—RCH(OR)$_2$), Ketal (—RC(OR)$_2$R), Organometallic groups, and combinations thereof.

Salts

In some embodiments, B is a substituted C3-C10 perfluoroalkylene group, wherein one or more hydrogen atoms of the group derived from the alkane are each substituted by a substituent, and all the other hydrogen atoms of the group derived from the alkane are substituted by fluorine atoms, wherein the substituent is selected from the group consisting of Chloro (—Cl), Bromo (—Br), Iodo (—I), Hydroxyl (—OH), Ether (—OR), Aldehyde (—CHO), Ketone (—CO)), Carboxyl (—COOH), Ester (—COOR), Peroxide (—O—O—), Amino (—NH$_2$), Secondary amine (—NHR), Tertiary amine (—NR$_2$)), Nitro (—NO$_2$), Cyanide (—CN), Amide (—CONH$_2$), substituted amides (—CONHR, —CONR$_2$), Thiol (—SH), Sulfide (—SR), Sulfonyl (—SO$_2$R), Sulfate (—SO$_4$R), Phosphate (—PO$_4$R$_2$), Phosphine (—PR$_2$); Alkyl (—R), Alkylene (—R=R), Cycloalkyl (—R), Aryl (—Ar), Benzyl (—C$_6$H$_5$CH$_2$), Alkenyl (—C=C—), Alkynyl (—C≡C—), Aromatic rings, Acyl (—COR); Sulfonyl (—SO$_2$R); Carbamoyl (—CONH$_2$); Isonitrile (—NC); Azide (—N$_3$), Perfluoroalkyl (—CF$_3$) and other fluoroalkyl chains, Acetal (—RCH(OR)$_2$), Ketal (—RC(OR)$_2$R), and Organometallic groups.

In some embodiments, C is a sulfonate or phosphate salt with at least one selected from the group consisting of sodium (Na), potassium (K), lithium (Li), rubidium (Rb), cesium (Cs), calcium (Ca), magnesium (Mg), strontium (Sr), a barium (Ba), iron (II) (Fe II), iron (III), (Fe III), copper (I) (Cu I), copper (II) (Cu II), zinc (Zn), manganese (Mn), ammonium (NH$_4^+$), methylammonium (CH$_3$NH$_3^+$), dimethylammonium (—(CH$_3$)$_2$NH$_2^+$), trimethylammonium ((CH$_3$)$_3$ N$^+$), pyridinium (C$_5$H$_5$NH+), lead (II) (Pb), mercury (II) (Hg), cadmium (Cd), lanthanum (La), cerium (Ce), uranium (U), sodium-calcium (Na—Ca), potassium-magnesium (K—Mg), tetramethylammonium (N(CH$_3$)$_4^+$), imidazolium (C$_3$H$_4$NH$_2^+$), phosphonium (P$^+$ (CH$_3$)$_4$), and guanidinium (C(NH$_2$)$_3^+$).

EXAMPLE EMBODIMENTS

These and other features of the present disclosure may be understood from the following detailed description and will become more fully apparent from the example embodiments of the present disclosure. Also, it will be easily understood that the objects and advantages of the present disclosure may be realized by the means shown in the appended claims and combinations thereof.

Summary not Limiting

It is understood that this disclosure is not limited to the examples summarized in this Summary. Various other aspects are described and exemplified herein.

BRIEF DESCRIPTION OF THE DRAWINGS

FIG. 1 is an example of a solid state battery according to one embodiment.

EXEMPLIFICATIONS NOT LIMITING

The exemplifications set out herein illustrate certain non-limiting embodiments, in one form, and such exemplifications are not to be construed as limiting the scope of the appended claims in any manner.

DETAILED DESCRIPTION

Examples and Embodiments

The presently disclosed subject matter now will be described and discussed in more detail in terms of some specific embodiments and examples with reference to the accompanying drawings, in which some, but not all embodiments of the invention are shown. Like numbers refer to like elements or parts throughout unless otherwise referenced. The presently disclosed subject matter may be embodied in many different forms and should not be construed as limited to the specific embodiments set forth herein. Rather, these embodiments are provided so that this disclosure will satisfy applicable legal requirements. Indeed, many modifications and other embodiments of the presently disclosed subject matter will come to the mind of one skilled in the art to which the presently disclosed subject matter pertains. Therefore, it is to be understood that the presently disclosed subject matter is not to be limited to the specific embodiments disclosed and that modifications and other embodiments are intended to be included within the scope of the appended claims.

Definitions

"A," "An" and "The"

As used herein, the singular form of a word includes the plural, unless the context clearly dictates otherwise. The plural encompasses the singular and vice versa. Thus, the references "a," "an" and "the" are generally inclusive of the plurals of the respective terms. For example, while the present disclosure has been described in terms of "a" layer, "a" substrate, "a" cell, and the like, more than one of these and other components, including combinations, can be used.

"About"

The term "about" indicates and encompasses an indicated value and a range above and below that value.

"Comprise," "Consisting Essentially Of", and "Consisting Of"

The words "comprise," "comprises," and "comprising" are to be interpreted inclusively rather than exclusively. Likewise, the terms "include," "including" and "or" should all be construed to be inclusive, unless such a construction is clearly prohibited from the context. A disclosure of an embodiment defined using the term "comprising" is also a disclosure of embodiments "consisting essentially of" and "consisting of" the disclosed components. The phrase "consisting of" excludes any element, step, or ingredient not specified.

"And/Or"

The term "and/or" used in the context of "X and/or Y" should be interpreted as "X," "Y," or "X and Y."

"On" and "Over"

As used herein, the terms "on," "applied on," "formed on," "deposited on," "provided on," and the like mean applied, formed, overlaid, deposited, or provided on in contact with an underlying or overlying surface. On the other hand, the terms "over" "applied over," "formed over," "deposited over," "overlay," "provided over," and the like, mean applied, formed, overlaid, deposited, or provided on or over but not necessarily in contact with the surface. For example, a formed layer "applied over" a substrate layer may contact the substrate without an intervening material; however, the same phrase does not preclude the presence of one or more other layers of the same or different composition located between the formed layer and the substrate layer.

Markush Group

As used herein, the term "combination thereof" included in any Markush-type expression means a combination or mixture of one or more elements selected from the group of elements disclosed in the Markush-type expression, and refers to the presence of one or more elements selected from the group. The term "combinations thereof" includes every possible combination of elements to which the term refers.

"Between"

As used herein, the expression "between" is inclusive of end points.

Numerical Ranges

Furthermore, all numerical ranges herein should be understood to include all integers, whole or fractions, within the range. Moreover, any numerical range recited herein is intended to include all sub-ranges subsumed therein, and these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth. When ranges are given, any endpoints of those ranges and/or numbers within those ranges can be combined with the scope of the present disclosure.

"Including," "Such As" and "for Example"

As used herein, "including," "such as," "for example," and like terms mean "including/such as/for example but not limited to."

Combination of Embodiments

As used herein, the term "example," particularly when followed by a listing of terms, is merely illustrative, and should not be deemed to be exclusive or comprehensive. Any embodiment disclosed herein can be combined with any other embodiment disclosed herein unless explicitly indicated otherwise.

Particle Size

As used herein, particle size refers to the mean particle diameter (Dso) as measured using microscopy (e.g., optical microscopy, electron microscopy, scanning electron microscopy (SEM), transmission electron microscopy (TEM), atomic force microscopy (AFM), confocal microscopy, X-ray microscopy, cryo-electron microscopy, Raman microscopy, or fluorescence microscopy). The size can be the diameter of spherical particles or the length along the largest dimension of ellipsoidal or otherwise irregularly shaped particles. As used herein, "$D_{50}$" of particles refers to the diameter at which 50% of the particles have a smaller diameter.

Operating Pressure

Operating Pressure

The operating pressure of solid-state batteries can vary depending on the specific design and materials used. Solid-state batteries are characterized by the use of solid electrolytes instead of liquid electrolytes found in traditional lithium-ion batteries. As a result, they can potentially operate at different pressures compared to liquid electrolyte batteries.

Factors to Determine Operating Pressure

In general, solid-state batteries are designed to operate at atmospheric pressure or slightly elevated pressures. The exact operating pressure can depend on factors such as the specific materials used in the solid electrolyte and electrodes, the cell design, and the intended application of the battery. For example, the solid electrolyte in these batteries can be made from various materials, including ceramics, polymers, or sulfide-based compounds. These materials have properties that influence the battery's operating pressure. For instance, some ceramic electrolytes may require higher pressures to maintain good contact between components and ensure efficient ion transport. In contrast, certain polymer electrolytes might allow for operation at lower pressures due to their flexibility.

Higher Operating Pressure

Some solid-state battery designs aim to operate at ambient pressure, similar to conventional lithium-ion batteries. However, there are also solid-state battery concepts that may benefit from operating at higher pressures. Compared to liquid electrolytes, solid electrolytes often have spaces in the materials, resulting in poor contact between the solid electrolyte materials, such as in forms of particles, and between the lithium ions and the solid electrolyte material, thereby causing poor ion conductivity and poor lithium ion diffusion in the solid electrolyte layer. Increased pressure can potentially enhance the contact between solid electrolyte and electrode materials, improving the overall performance of the battery.

Challenges of High Operating Pressure

While solid-state batteries have several advantages, including potentially improved safety and energy density, high operating pressure can pose challenges.

Mechanical Stress

High pressure within the battery cell can lead to mechanical stress on the materials, including the solid electrolyte and electrodes. This stress can result in deformation, cracking, or failure of components over time, compromising the structural integrity of the battery.

Sealing Challenges

Maintaining a high-pressure environment may require effective sealing of the battery cell. Achieving and maintaining a reliable seal under high pressure can be challenging, and any leakage can lead to the ingress of contaminants or air, compromising the performance and safety of the battery.

Manufacturing Complexity

Designing and manufacturing batteries that can operate at high pressure can be more complex and costly. Ensuring the reliability of seals, avoiding leaks, and preventing mechanical failure require careful engineering and manufacturing processes.

Material Compatibility

The materials used in solid-state batteries, including the solid electrolyte and electrodes, may be compatible with high-pressure conditions. Some materials may degrade or undergo unwanted chemical reactions under high pressure, impacting the overall performance and cycle life of the battery.

Energy Density Trade-Offs

While high pressure can enhance certain aspects of battery performance, it may also lead to trade-offs in terms of energy density.

Temperature Effects

High pressure can affect the thermal behavior of the battery. Managing heat dissipation becomes desirable to prevent overheating and ensure the safe operation of the solid-state battery at elevated pressures.

Novel Additive Materials

Additive Attached to Solid Electrolyte

The present disclosure addresses key challenges in solid-state battery technology by introducing novel additive materials designed to enhance the performance of sulfide-containing solid electrolytes. Aspects of this disclosure are directed to additives to be added to sulfide-containing solid electrolyte materials for use in solid state batteries, solid state batteries using such additive materials in their solid electrolyte materials, and methods of making such solid state batteries. These additive materials are specifically formulated to interact with the sulfide-containing solid electrolyte materials at a molecular level, resulting in a unique attachment mechanism where at least part of the additive material bonds or attaches to the surfaces of the sulfide-containing solid electrolyte material.

Lithium Ion Diffusion

This surface attachment serves multiple critical functions. It facilitates the overall conductivity or diffusivity of lithium ions in the solid electrolyte layer. By creating a network of conductive pathways between adjacent electrolyte particles through contacts between the at least part of the additive material and the adjacent solid electrolyte material, the additives facilitate more efficient lithium ion transport through the battery structure.

Contact Between Components

Further, the attached additive material acts as a flexible or formable interface between rigid electrolyte particles. The additive material may not be in the form of particles, but in the form of individual molecules. These additive material molecules each may be flexible and able to bend or move without breaking and maintain their ability to return to their original form after deformation. Alternatively, these additive material molecules each may be formable and able to be shaped, molded, or deformed without breaking or losing their integrity. This flexibility or formability helps accommodate volume changes that may occur during battery cycling, maintaining crucial contact between components.

Stability

Furthermore, by enhancing particle-to-particle contact and overall electrolyte cohesion, the additive materials provided herein allow for improved performance under relatively lower pressures compared to solid state batteries without such additive materials. With the enhanced particle-to-particle contact, the solid electrolyte material is held together, which ensures continuous pathways for lithium ions to move efficiently between electrodes, enhances the stability of the solid electrolyte, and prevents the solid electrolyte from degrading over time or cracking under stress.

Advantages of Reduced Operating Pressure

The ability to operate solid-state batteries at reduced pressures represents a significant advancement in the field. Conventional solid-state batteries often require high pressures to maintain adequate contact between components, which can lead to mechanical stress, potential safety issues, and manufacturing complexities. By enabling lower-pressure operation, the additive materials provided in this disclosure may offer several advantages, including but not limited to improved safety and longevity due to reduced mechanical stress on battery components, simplified battery design and manufacturing processes, potential for lighter and more compact battery structures, and expanded range of possible applications for solid-state battery technology.

Manufacturing Processes

Furthermore, the methods described for incorporating these additive materials into solid-state batteries are designed to be compatible with existing manufacturing processes, facilitating potential adoption by manufacturers for mass production.

Additive Materials

The additive material provided herein may be represented by Chemical Formula 1 below:

$$\text{A-B-C} \qquad \text{(Chemical Formula 1)}$$

wherein A is a thiol group (S—H) or a leaving group; B is a substituted or unsubstituted C3-C20 perfluoroalkylene group; and C is a sulfonate, a phosphate or a salt thereof. An alkylene group is derived from an alkane that consists entirely of single-bonded carbon and hydrogen atoms and has the general formula $C_nH_{2n+2}$.

Covalent Bond

In some embodiments, A in the additive material A-B—C (Chemical Formula 1) provided herein may be a thiol group (S—H). In some embodiments, the thiol group may react with the sulfur of the sulfide-containing solid electrolyte material to form a covalent bond, for example, a sulfide bond or a disulfide bond. This covalent bond allows at least part of the additive material to attach onto the surfaces of the solid electrolyte material particles. In some embodiments, metal-sulfur covalent bonds may form if the sulfide-containing material includes metal ions, creating strong anchoring points for the additive material.

Multiple Covalent Bonds

Additionally, the formation of multiple covalent bonds between a single additive molecule and multiple sulfur atoms on the electrolyte surface may result in a crosslinked network, enhancing the structural stability of the interface. Multiple electrolyte particles are connected by the crosslinks between the additive molecule and the multiple sulfur atoms to form a three-dimensional network, increasing the strength, toughness, and/or elasticity of the electrolyte material and thus creating a more stable electrolyte material with enhanced durability and mechanical strength, making it more resistant to deformation or volume changes.

Redox Reactions

In some cases, the covalent attachment may also involve redox reactions, where the thiol group undergoes oxidation to form disulfide linkages, potentially contributing to the electrochemical properties of the solid-state battery.

Strength and Nature of Covalent Bonds

The strength and nature of these covalent bonds may be influenced by factors such as local pH, applied voltage, and the presence of other ions in the solid electrolyte system, allowing for potential tuning of the interface properties to optimize battery performance.

Non-Covalent Attachment

In some embodiments, the additive material with the thiol group may be adsorbed onto the surface of the particles of the sulfide-containing material in the solid electrolyte layer, such that at least part of the additive material is attached onto the surfaces of the particles of the sulfide-containing material by a non-covalent attachment. The non-covalent attachment may be chemisorption, van der Waals interaction, ionic interaction, hydrogen bonding, π-π stacking, dipole-dipole interactions, and electrostatic interactions.

Chemisorption

Chemisorption refers to the formation of a chemical bond between the adsorbate and the surface, which may be stronger than typical physical adsorption but weaker than covalent bonding.

Van der Waals Forces

Van der Waals forces are weak attractive forces between molecules or atoms that arise from temporary fluctuations in electron distribution.

Tuning Non-Covalent Attachments

The strength and nature of these attachments can be tuned by modifying the chemical structure of the additive material. For example, varying the number and position of hydrogen bond donors/acceptors can alter hydrogen bonding interactions. Incorporating different aromatic ring systems or heteroatoms can affect π-π stacking and dipole interactions. Adjusting side chain length, branching, and polarity can influence van der Waals forces and overall adsorption behavior. Adding charged functional groups or zwitterionic moieties can enhance electrostatic interactions and potentially improve ion conductivity at the particle-additive interface.

Leaving Group

In some embodiments, A in the additive material A-B—C (Chemical Formula 1) provided herein may be a leaving group. The term "leaving group" may be understood as defined by the IUPAC, e.g., it may be an atom or group of atoms that detaches from the main or residual part of a substrate during a reaction or elementary step of a reaction. For instance, a leaving group may be a fragment that departs with a pair of electrons in heterolytic bond cleavage.

Examples of Leaving Group

Additional examples of leaving groups include halides such as chloride, bromide, or iodide; tosylate (p-toluenesulfonate) or mesylate (methanesulfonate) groups; acetate or trifluoroacetate groups; phosphate or phosphonate groups; carboxylate groups like formate or benzoate; alkoxide groups such as methoxide or ethoxide; amine groups like dimethylamino or diethylamino; cyano (CN) groups; azide ($N_3$) groups; and sulfonate groups like triflate (trifluoromethanesulfonate).

Additional Examples of Leaving Group

In certain aspects, leaving groups may be anions or neutral species, departing from neutral or cationic substrates. Suitable leaving groups may be used, which are compatible with the solid electrolyte material. In some embodiments, the leaving group may include a "triethoxysilyl" moiety (e.g., derived from $HSi(OC_2H_5)_3$) or "trimethoxysilyl" (e.g., derived from $HSi(OCH_3)_3$).

Selecting Leaving Group

According to aspects of this disclosure, the choice of leaving group may be tailored to optimize reactivity with the sulfide-containing solid electrolyte material or to enhance specific properties of the resulting solid-state battery. The leaving group may also be selected based on factors such as stability, ease of synthesis, or compatibility with battery manufacturing processes.

Covalent Bond

In some embodiments, the leaving group may react with the sulfur of the sulfide-containing solid electrolyte material to form a covalent bond, for example, a sulfide bond or a disulfide bond. This covalent bond allows at least part of the additive material to attach onto the surfaces of the solid electrolyte material particles. The covalent bond formed between the leaving group and the sulfur of the sulfide-containing solid electrolyte material may involve various chemical interactions, including sulfide bonds, disulfide bonds, metal-sulfur bonds, or multiple covalent bonds creating a crosslinked network.

Tuning Covalent Attachment

The strength and nature of the covalent attachment may be tuned by modifying the chemical structure of the leaving group, such as using different electron-withdrawing or electron-donating substituents, sterically bulky groups, or multifunctional leaving groups.

Covalent Attachment Process

The covalent attachment process may be initiated or enhanced through thermal activation, photochemical activation, mechanical force during ball milling or pressing, or chemical catalysts.

Extent and Distribution of Covalent Attachment

The extent and distribution of covalent attachment across the solid electrolyte particles may be controlled by adjusting the ratio of additive to solid electrolyte material, exploiting preferential attachment to specific crystal facets or surface features, or utilizing reversible attachment under certain conditions for dynamic reorganization of the additive layer.

Non-Covalent Attachment

In some embodiments, the additive material with the leaving group may interact with the particles of the sulfide-containing material in the solid electrolyte layer. In some embodiments, the additive material is adsorbed onto the surface of the particles, such that at least part of the additive material is attached onto the surfaces of the particles of the sulfide-containing solid electrolyte material by a non-covalent attachment. The non-covalent attachment may be chemisorption, van der Waals interaction, ionic interaction, hydrogen bonding, π-π stacking, dipole-dipole interactions, and electrostatic interactions.

Unsubstituted Perfluoro Alkane Group

In some embodiments, B in the additive material A-B-C (Chemical Formula 1) provided herein may be an unsubstituted C3-C20 perfluoroalkylene group. For example, B may be an unsubstituted C3-C5 perfluoroalkylene group, an unsubstituted C6-C16 perfluoroalkylene group, an unsubstituted C16-C20 perfluoroalkylene group, or an unsubstituted perfluoroalkylene group with any other number from 3 to 20 of carbons.

Substituted Perfluoro Alkane Group

In some embodiments, B in the additive material A-B-C (Chemical Formula 1) provided herein may be a substituted C3-C20 perfluoroalkylene group, wherein one or more hydrogen atoms of the group derived from the alkane are each substituted by a substituent, and all the other hydrogen atoms of the group derived from the alkane are substituted by fluorine atoms, wherein the substituent is selected from the group consisting of Halogens [Chloro (—Cl), Bromo (—Br), Iodo (—I)]; Oxygen-containing Substituents [Hydroxyl (—OH), Ether (—OR), Carbonyl Groups (Aldehyde (—CHO), Ketone (—CO)), Carboxyl (—COOH), Ester (—COOR), Peroxide (—O—O—)]; Nitrogen-containing Substituents [Amino (—$NH_2$), N-substituted Amines (Secondary amine (—NHR), Tertiary amine (—$NR_2$)), Nitro (—$NO_2$), Cyanide (—CN), Amide (—$CONH_2$) or substituted amides (—CONHR, —$CONR_2$)]; Sulfur-containing Substituents [Thiol (—SH), Sulfide (—SR), Sulfonyl (—$SO_2R$), Sulfate (—$SO_4R$)]; Phosphorus-containing Substituents [Phosphate (—$PO_4R_2$), Phosphine (—$PR_2$)]; Hydrocarbon-based Substituents [Alkyl (—R), Alkylene (—R═R), Cycloalkyl (—R), Aryl (—Ar), Benzyl (—C6HsCH2)]; Alkenyl (—C═C—); Alkynyl (—C≡C—); Aromatic Rings; Acyl (—COR); Sulfonyl (—$SO_2R$); Carbamoyl (—$CONH_2$); Isonitrile (—NC); Azide (—N3); Polyfunctional Groups [Perfluoroalkyl (—CF3) and other fluoroalkyl chains, Acetal (—RCH (OR) 2), Ketal (—RC (OR) 2R)]; and Metal-based Substituents [Organometallic Groups (e.g., methyl lithium (—$CH_3Li$), Grignard reagents (—RMgX))]. For example, B may be a substituted C3-C5 perfluoroalkylene group, a substituted C6-C16 perfluoroalkylene group, a substituted C16-C20 perfluoroalkylene group, or a substituted perfluoroalkylene group with any other number from 3 to 20 of carbons, including a substituent that may be chlorine, bromine, ester, ketone, or any combination thereof.

Perfluoro Alkane Group

In some embodiments, B in the additive material A-B-C (Chemical Formula 1) provided herein may be an unsubstituted or substituted C3-C20 perfluoroalkylene group. For example, B may be an unsubstituted or substituted perfluoro C3, C4, C5, C6, C7, C8, C9, C10, C3-C4, C3-C5, C3-C6, C3-C7, C3-C8, C3-C9, C3-C10, C4-C5, C4-C6, C4-C7, C4-C8, C4-C9, C4-C10, C5-C6, C5-C7, C5-C8, C5-C9, C5-C10, C6-C7, C6-C8, C6-C9, C6-C10, C7-C8, C7-C9, C7-10, C8-C9, C8-10, C9-C10, etc.

Perfluoro Alkane Group Examples

B in the additive material A-B-C (Chemical Formula 1) is a substituted or unsubstituted perfluoroalkylene group. B comprises a group derived from an alkane. The alkane may be selected from the group consisting of Propane, n-Butane ($CH_3CH_2CH_2CH_3$), Isobutane ($CH_3CH(CH_3)_2$), n-Pentane ($CH_3(CH_2)_3CH_3$), Isopentane (2-methylbutane, $CH_3CH_2CH(CH_3)_2$), Neopentane (2,2-dimethylpropane, $(CH_3)_4C$), n-Hexane ($CH_3(CH_2)_4CH_3$), 2-Methylpentane ($CH_3CH_2CH_2CH(CH_3)CH_3$), 3-Methylpentane ($CH_3CH_2CH(CH_3)CH_2CH_3$), 2,2-Dimethylbutane ($CH_3C(CH_3)_2CH_2CH_3$), 2,3-Dimethylbutane ($CH_3CH(CH_3)CH(CH_3)CH_3$), n-Heptane ($CH_3(CH_2)_5CH_3$), 2-Methylhexane ($CH_3CH_2CH_2CH_2CH(CH_3)CH_3$), 3-Methylhexane ($CH_3CH_2CH_2CH(CH_3)CH_2CH_3$), 2,2-Dimethylpentane ($CH_3C(CH_3)_2CH_2CH_2CH_3$), 2,3-Dimethylpentane ($CH_3CH(CH_3)CH_2CH(CH_3)CH_3$), 2,4-Dimethylpentane ($CH_3CH(CH_3)CH_2CH_2CH(CH_3)CH_3$), 3,3-Dimethylpentane ($CH_3CH_2CH(CH_3)_2CH_2CH_3$), 3-Ethylpentane ($CH_3CH_2CH_2CH(CH_2CH_3)CH_3$), 2,2,3-Trimethylbutane (($CH_3)_2CHCH_2CH(CH_3)_2$), n-Octane ($CH_3(CH_2)_6CH_3$), 2-Methylheptane ($CH_3CH_2CH_2CH_2CH_2CH(CH_3)CH_3$), 3-Methylheptane ($CH_3CH_2CH_2CH_2CH(CH_3)CH_2CH_3$), 4-Methylheptane ($CH_3CH_2CH_2CH(CH_3)CH_2CH_2CH_3$), 2,2-Dimethylhexane ($CH_3C(CH_3)_2 (CH_2)_4CH_3$), 2,3-Dimethylhexane ($CH_3CH(CH_3)CH_2CH_2CH(CH_3)CH_3$), 2,4-Dimethylhexane ($CH_3CH(CH_3)CH_2CH_2CH_2CH(CH_3)CH_3$), 3,3-Dimethylhexane ($CH_3CH_2CH(CH_3)_2CH_2CH_2CH_3$), 3,4-Dimethylhexane ($CH_3CH_2CH(CH_3)CH_2CH(CH_3)CH_3$), 2,2,4-Trimethylpentane (isooctane, $CH_3CH(CH_3)_2CH_2CH(CH_3)_2$), 2-Ethylhexane ($CH_3CH_2CH(CH_2CH_3)CH_2CH_3$), n-Nonane ($CH_3(CH_2)$—$CH_3$), 2-Methyloctane ($CH_3CH_2CH_2CH_2CH_2CH_2CH(CH_3)CH_3$), 3-Methyloctane ($CH_3CH_2CH_2CH_2CH_2CH(CH_3)CH_2CH_3$), 2,2-Dimethylheptane ($CH_3C(CH_3)_2 (CH_2)_5CH_3$), 2,3-Dimethylheptane ($CH_3CH(CH_3)CH_2CH_2CH_2CH(CH_3)CH_3$), 2,4-Dimethylheptane ($CH_3CH(CH_3)CH_2CH_2CH(CH_3)CH_2CH_3$), 2,2,4-Trimethylhexane ($CH_3C(CH_3)_2CH_2CH(CH_3)_2CH_2CH_3$), 3,3-Dimethylheptane ($CH_3CH_2CH(CH_3)_2CH_2CH_2CH_2CH_3$), 3-Ethylheptane ($CH_3CH_2CH_2CH(CH_2CH_3)CH_2CH_3$), n-Decane ($CH_3(CH_2)_8CH_3$), 2-Methylnonane ($CH_3CH_2CH_2CH_2CH_2CH_2CH_2CH(CH_3)CH_3$), 3-Methylnonane ($CH_3CH_2CH_2CH_2CH_2CH_2CH(CH_3)CH_2CH_3$), 2,2-Dimethyloctane ($CH_3C(CH_3)_2 (CH_2)_6CH_3$), 2,3-Dimethyloctane ($CH_3CH(CH_3)CH_2CH_2CH_2CH_2CH(CH_3)CH_3$), 2,4-Dimethyloctane ($CH_3CH(CH_3)CH_2CH_2CH_2CH(CH_3)CH_2CH_3$), 2,5-Dimethyloctane ($CH_3CH_2CH(CH_3)CH_2CH_2CH_2CH(CH_3)CH_3$), 3,3-Dimethyloctane ($CH_3CH_2CH(CH_3)_2CH_2CH_2CH(CH_3)CH_2CH_3$), 2-Ethyloctane ($CH_3CH_2CH(CH_2CH_3)CH_2CH_2CH_3$), n-Undecane ($C_{11}H_{24}$) and its branched isomers, n-Dodecane ($C_{12}H_{26}$) and its branched isomers, n-Tridecane ($C_{13}H_{28}$) and its branched isomers, n-Tetradecane ($C_{14}H_{30}$) and its branched isomers, n-Pentadecane ($C_{15}H_{32}$) and its branched isomers, n-Hexadecane ($C_{16}H_{34}$) and its branched isomers, n-Heptadecane ($C_{17}H_{36}$) and its branched isomers, n-Octadecane ($C_{18}H_{38}$) and its branched isomers, n-Nonadecane ($C_{19}H_{40}$) and its branched isomers, and n-Eicosane ($C_{20}H_{42}$) and its branched isomers.

Salts

In some embodiments, C may be a salt of sulfonate or phosphate. For example, C may be one of alkali metal salts [sodium (Na), potassium (K), lithium (Li), rubidium (Rb), and/or cesium (Cs) sulfonate/phosphate], alkaline earth metal salts [calcium (Ca), magnesium (Mg), strontium (Sr), and/or barium (Ba) sulfonate/phosphate], transition metal salts [iron (II) (Fe II), iron (III), (Fe III), copper (I) (Cu I), copper (II) (Cu II), zinc (Zn), and/or manganese (Mn) sulfonate/phosphate], ammonium and organic amine salts [ammonium ($NH_4^+$), methylammonium ($CH_3NH_3^+$), dimethylammonium (—(CH$_3$)$_2$NH$_2^+$), trimethylammonium ((CH$_3$)$_3$N$^+$), and/or pyridinium (C$_5$H$_5$NH$^+$) sulfonate/phosphate], heavy metal salts [lead (II) (Pb), mercury (II) (Hg), and/or cadmium (Cd) sulfonate/phosphate], lanthanide and actinide salts [lanthanum (La), cerium (Ce), and/or uranium (U) sulfonate/phosphate], mixed cation salts [sodium-calcium (Na—Ca) and/or potassium-magnesium (K—Mg) sulfonate/phosphate], exotic and polyatomic cation salts [tetramethylammonium (N(CH$_3$)$_4^+$), imidazolium (C$_3$H$_4$NH$_2^+$), phosphonium (P$^+$ (CH$_3$)$_4$), and/or guanidinium (C(NH$_2$)$_3^+$) sulfonate/phosphate].

ADDITIVE MATERIAL EXAMPLES

Non-limiting examples of the additive material provided herein include, but are not limited to Chemical Formulas 2-37:

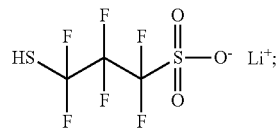
(Chemical Formula 2)

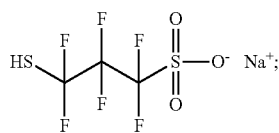
(Chemical Formula 3)

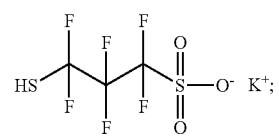
(Chemical Formula 4)

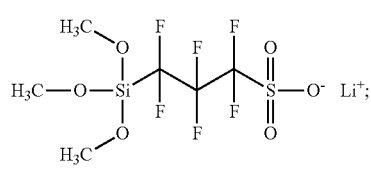
(Chemical Formula 5)

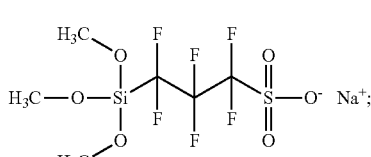
(Chemical Formula 6)

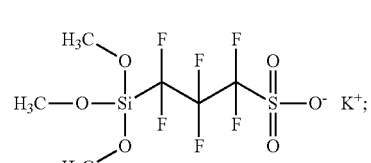
(Chemical Formula 7)

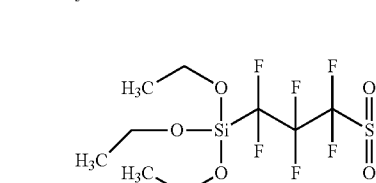
(Chemical Formula 8)

-continued

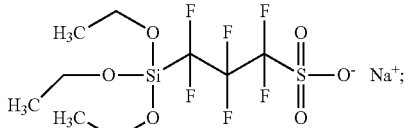
(Chemical Formula 9)

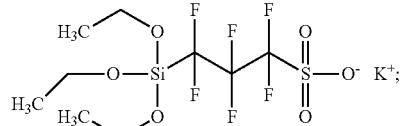
(Chemical Formula 10)

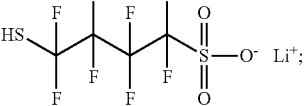
(Chemical Formula 11)

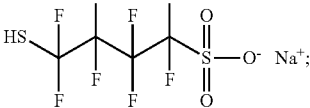
(Chemical Formula 12)

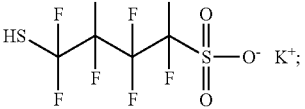
(Chemical Formula 13)

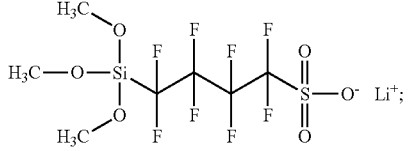
(Chemical Formula 14)

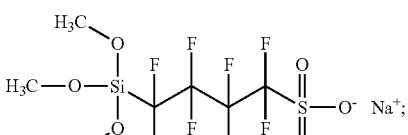
(Chemical Formula 15)

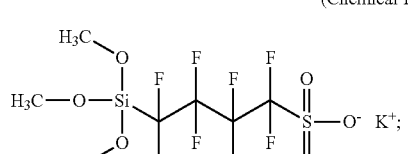
(Chemical Formula 16)

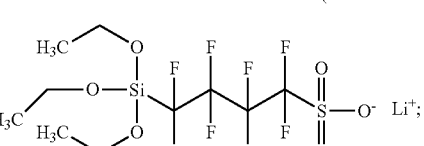
(Chemical Formula 17)

(Chemical Formula 18)
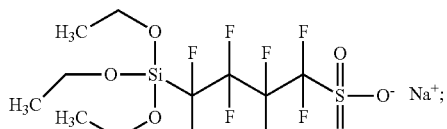
(Chemical Formula 19)
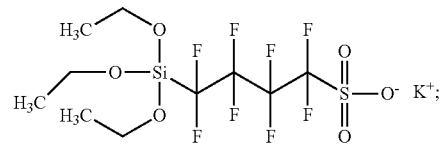
(Chemical Formula 20)
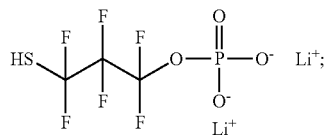
(Chemical Formula 21)
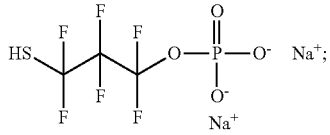
(Chemical Formula 22)
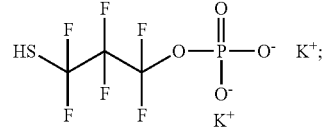
(Chemical Formula 23)
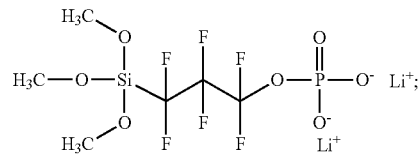
(Chemical Formula 24)
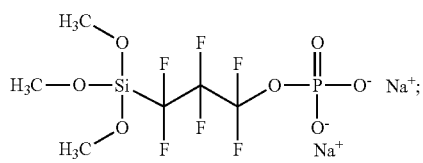
(Chemical Formula 25)
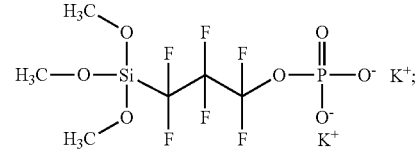
(Chemical Formula 26)
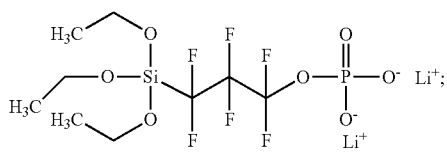
(Chemical Formula 27)
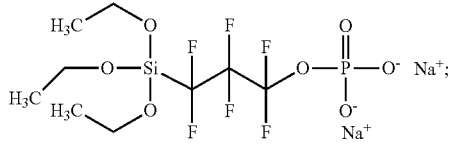
(Chemical Formula 28)
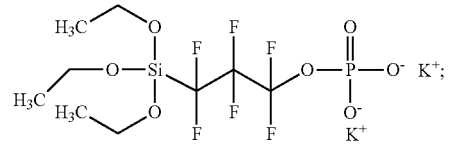
(Chemical Formula 29)
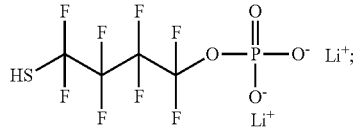
(Chemical Formula 30)
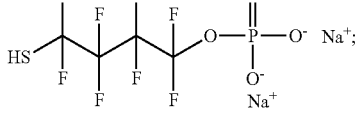
(Chemical Formula 31)
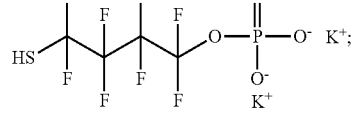
(Chemical Formula 32)
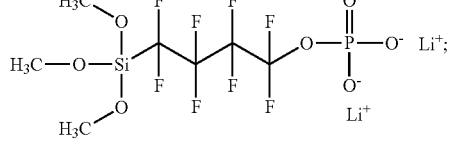
(Chemical Formula 33)
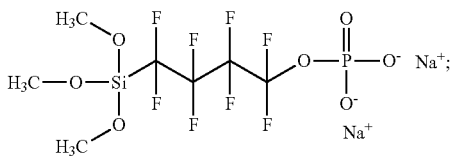
(Chemical Formula 34)
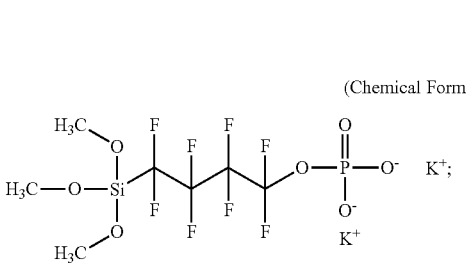
(Chemical Formula 35)
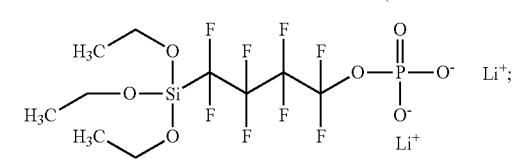

(Chemical Formula 36)

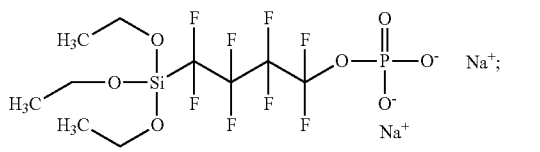

(Chemical Formula 37)

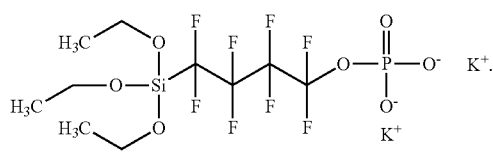

The additive material may be in any suitable form to be added to and/or mixed with a sulfide-containing solid electrolyte material for use in a solid state battery. The physical form of the additive material can significantly influence its interaction with the sulfide-containing solid electrolyte and its overall effectiveness in enhancing battery performance.

Powder Form

In some embodiments, the additive material may be in a powder form. Powder forms may offer advantages such as increased surface area for interaction and improved dispersibility within the solid electrolyte matrix.

Other Forms

However, other forms of the additive material may also be suitable, depending on the specific manufacturing process and desired properties of the final solid-state battery. For instance, the additive material may be provided as a liquid, gel, or even as a gas that can be deposited onto the solid electrolyte particles. In some cases, the additive material may be incorporated into the solid electrolyte through a solution-based process, where it is dissolved in a suitable solvent before mixing with the sulfide-containing material.

Choice of Form

The choice of form may also depend on factors such as the chemical stability of the additive, its compatibility with other battery components, and the ease of achieving uniform distribution throughout the solid electrolyte layer.

Solid Electrolyte Layer

Solid Electrolyte Layer Generally

The solid electrolyte layer provided herein is suitable for and enables lithium ion diffusion between the cathode electrode and the anode electrode. The solid electrolyte layer is in electrical communication with the cathode and the anode and provides an electrically conductive pathway for the movement of charge carriers between the cathode and the anode. In some embodiments, the solid electrolyte layer may be formed over and in direct contact with the cathode or the anode. In other embodiments, another functional layer may be interposed between the solid electrolyte layer and the cathode and/or the anode.

Materials for Solid Electrolyte Layer Generally

In general, the material of the solid electrolyte layer is not particularly limited as long as it allows adhesion with adjacent layers, has a suitable electrical conductivity, and does not cause significant chemical changes in the solid state battery in the voltage range of the solid state battery. For example, the solid electrolyte layer may include a may include various inorganic solid electrolytes, polymer solid electrolytes, and/or polymer gel electrolytes, although not limited thereto.

Sulfide-Containing Solid Electrolyte Materials Generally

In the solid state batteries provided herein, the solid electrolyte is a sulfide-containing material, which may also be referred to as "sulfide-based material." As used here, "sulfide-containing electrolyte" refers to an electrolyte that includes inorganic materials containing S which conduct ions (e.g., Li+), and which are suitable for electrically insulating the positive and negative electrodes of an electrochemical cell. The sulfide-based/containing solid electrolyte material includes sulfur (S) and has ionic conductivity of metal belonging to Group I or Group II of the periodic table, and may include Li—P—S-based glass or Li—P—S-based glass ceramics. For example, the sulfide-based/containing solid electrolyte material used herein may include lithium sulfide, silicon sulfide, germanium sulfide and boron sulfide. Non-limiting examples of the inorganic solid electrolyte may include $xLi_2S \cdot yP_2S_5$ (x+y=1), $Li_{3.833}Sn_{0.833}As_{0.166}S_4$, $Li_4SnS_4$, $Li_{3.25}Ge_{0.25}P_{0.75}S_4$, $Li_2S$—$P_2So$, $B_2S_3$—$Li_2S$, $XLi_2S$-(100-x)$P_2S_5$ (x=70-80), $Li_2S$—$SiS_2$—$Li_3N$, $Li_2S$—$P_2S_5$—LiI, $Li_2S$—$SiS_2$—LiI, $Li_2S$—$B_2S_3$—LiI, $Li_3N$, LISICON, UPON ($Li_{3+y}PO_{4-x}N_x$), thio-LISICON ($Li_{3.25}Ge_{0.25}P_{0.75}S_4$), $Li_2O$—$Al_2O_3$—$TiO_2$—$P_2O_5$(LATP), $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, the like, or combinations thereof.

Particular Sulfide-Containing Solid Electrolyte Materials

In some embodiments of the solid state battery provided herein, the sulfide-containing solid electrolyte material may comprise an inorganic-based solid electrolyte material. In some embodiments, the sulfide-containing solid electrolyte material comprises an inorganic-based solid electrolyte material. In some embodiments, the sulfide-containing solid electrolyte material may comprise at least one of $Li_3P_7S_{11}$, $Li_{10}GeP_2S_{12}$, $Na_3PS_4$, $Li_{6-y}PS_{5-y}Cl_{1+y}$ (y<1), and/or $Li_6PS_5X$ (X is Cl, Br, or I).

Lithium Phosphorus Sulfur Chloride

In some embodiments, the sulfide-containing solid electrolyte material comprises $Li_6PS_5Cl$ (lithium phosphorus sulfur chloride, "LPSCl"). LPSCl is known for its high ionic conductivity, which is a crucial property for a solid electrolyte material. High ionic conductivity allows for the efficient movement of lithium ions within the material, facilitating the charging and discharging processes in solid state batteries. LPSCl also has good chemical and thermal stability, which is important for the long-term performance and safety of solid-state batteries. Stability is particularly crucial in high-temperature and high-voltage applications. Moreover, LPSCl has a wide electrochemical stability window and can withstand a wide range of voltages without undergoing undesirable reactions. This is essential for supporting a variety of cathode and anode materials.

Solid Electrolyte Material Particle Size

In the solid state batteries provided herein, the solid electrolyte material is provided in the form of particles. In some embodiments, the sulfide-containing material has a volume-based average particle size from, for example, about 0.1 μm to about 50 μm, about 0.1 μm to about 40 μm, about 0.1 μm to about 30 μm, about 0.1 μm to about 20 μm, about 0.1 μm to about 10 μm, about 0.1 μm to about 5 μm, about 0.1 μm to about 1 μm, about 1 μm to about 50 μm, about 1 μm to about 40 μm, about 1 μm to about 30 μm, about 1 μm to about 20 μm, about 1 μm to about 10 μm, about 1 μm to about 5 μm, about 5 μm to about 50 μm, about 5 μm to about 40 μm, about 5 μm to about 30 μm, about 5 μm to about 20 μm, about 5 μm to about 10 μm, about 10 μm to about 50 μm, about 10 µm to about 40 µm, about 10 µm to about 30 µm, about 10 µm to about 20 µm, about 20 µm to about 50 µm, about 20 µm to about 40 µm, about 20 µm to about 30 µm, about 20 µm to about 50 µm, about 20 µm to about 40 µm, about 20 µm to about 30 µm, about 30 µm to about 50 µm, about 30 µm to about 40 µm, about 40 µm to about 50 µm, etc, as measured by laser diffraction type particle size distribution measurement. In embodiments, the sulfide-containing solid electrolyte material can have an average particle size in a range of from about 0.1 µm to about 50 µm, such as about any of 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 µm. In embodiments, particle size of the cathode active material may be within a range formed by selecting any two numbers listed above or by selecting any two numbers in the range of from about 0.1 µm to about 50 µm.

Lithium Phosphorus Sulfur Chloride Particles Forming Covalent Bond

In some embodiments where LPSCl is used as the solid electrolyte material, LPSCl is provided in the form of particles. In some of these embodiments wherein the additive material provided herein includes the thiol group, the thiol group may interact with the sulfur of the LPSCl particles to form a sulfide bond or a disulfide bond, which causes at least some of the additive material to attach on to the surface of the LPSCl particles.

Interaction Between Additive Material and Solid Electrolyte Particles

As provided herein, the interaction between the thiol group or the leaving group of the additive material provided herein and the solid electrolyte particles allows the end of the thiol group or the leaving group of at least part of the additive material to attach onto the surfaces of the solid electrolyte material particles. Because of this attachment, at least part of the additive material attached onto the surfaces of the solid electrolyte particles can stay in the spaces formed between immediately neighboring solid electrolyte particles and fill such spaces. The hydrophobic tail on the other end of at least some of the additive material attached onto the surfaces of the solid electrolyte particles also contacts adjacent solid electrolyte particles. With the additive material provided herein, the materials in the solid electrolyte layer have better contact with each other generally, and the solid electrolyte layer has higher density.

Benefits of Interaction Between Additive Material and Solid Electrolyte Particles Moreover, the additive material may be softer and have better fluidity than the solid electrolyte particles and thus expand and shrink more easily. During charging and discharging of the solid state battery, while the solid electrolyte particles expand or shrink in size, the additive material attached onto the surfaces of the solid electrolyte particles change its own size (e.g., length of the additive material molecules or a particle diameter if in the particle form) accordingly while still staying in spaces between the solid electrolyte material particles and keeping these spaces filled. This helps prevent the loss of contact between the solid electrolyte particles if the additive material is not used and thus maintain the contact between the solid electrolyte particles themselves and also with the additive material. This better contact thus improves the conductivity of lithium ions in the solid electrolyte layer and maintains the conductivity of lithium ions in the solid electrolyte layer during charging and discharging of the solid state battery.

Hardness

As provided herein, the additive material may be softer than the solid electrolyte particles. In some embodiments, the sulfide-containing solid electrolyte material may have a hardness of about 0.1 to about 1 GPa obtained from nanoindentation tests, and the additive material may have a hardness of about 0.001 to about 0.01 GPa obtained from nanoindentation tests. In some embodiments, the hardness of the additive material may be at most about 10% of the hardness of the sulfide-containing material, for example, about 9%, 8%, 7%, 6%, 5%, 4%, 3%, 2%, 1%. 0.5%, 0.1%, 0.01%, which may be within a range formed by selecting any two numbers listed above or by selecting any two numbers in the range of from about 0.01% to about 10%.

Weight Ratio

In some embodiments, the solid electrolyte comprises the sulfide-containing material and the additive material in a weight ratio of, for example, from about 1:1 to about 25:1, from about 1:1 to about 24:1, from about 1:1 to about 23:1, from about 1:1 to about 22:1, from about 1:1 to about 21:1, from about 1:1 to about 20:1, from about 1:1 to about 19:1, from about 1:1 to about 18:1, from about 1:1 to about 17:1, from about 1:1 to about 16:1, from about 1:1 to about 15:1, from about 1:1 to about 14:1, from about 1:1 to about 13:1, from about 1:1 to about 12:1, from about 1:1 to about 11:1, from about 1:1 to about 10:1, from about 1:1 to about 9:1, from about 1:1 to about 8:1, from about 1:1 to about 7:1, from about 1:1 to about 6:1, from about 1:1 to about 5:1, from about 1:1 to about 4:1, from about 1:1 to about 3:1, from about 1:1 to about 4:1, or about 1:1; or from 1:1 to 25:1, from 1:1 to 24:1, from 1:1 to 23:1, from 1:1 to 22:1, from 1:1 to 21:1, from 1:1 to 20:1, from 1:1 to 19:1, from 1:1 to 18:1, from 1:1 to 17:1, from 1:1 to 16:1, from 1:1 to 15:1, from 1:1 to 14:1, from 1:1 to 13:1, from 1:1 to 12:1, from 1:1 to 11:1, from 1:1 to 10:1, from 1:1 to 9:1, from 1:1 to 8:1, from 1:1 to 7:1, from 1:1 to 6:1, from 1:1 to 5:1, from 1:1 to 4:1, from 1:1 to 3:1, from 1:1 to 4:1, or 1:1; or any other ratio in the range of from about 1:1 to about 25:1 or from 1:1 to 25:1. In embodiments, the weight ratio of the sulfide-containing material and the additive material can be in a range of from about 1:1 to about 25:1, such as about 1:1, 2:1, 3:1, 4:1, 5:1, 6:1, 7:1, 8:1, 9:1, 10:1, 11:1, 12:1, 13:1, 14:1, 15:1, 16:1, 17:1 18:1, 19:1, 20:1, 21:1, 22:1, 23:1. 24:1, or 25:1. In embodiments, the weight ratio of the sulfide-containing material and the additive material may be within a range formed by selecting any two numbers listed above or by selecting any two numbers in the range of from about 1:1 to about 25:1.

Porosity

While the additive material fills the spaces between the particles of the solid electrolyte material, the solid electrolyte layer still maintains a suitable porosity for the lithium ion to travel through the solid electrolyte layer. In some embodiments, the solid electrolyte layer provided herein has a porosity of greater than about 5%, for example, from about 5% to about 15%, from about 5% to about 14%, from about 5% to about 13%, from about 5% to about 12%, from about 5% to about 11%, from about 5% to about 10%, from about 5% to about 9%, from about 5% to about 8%, from about 5% to about 7%, from about 5% to about 6%, or any other % in the range of greater than 5%, such as any other % in the range of from about 5% to about 15% or from 5% to 15%. In embodiments, the porosity of the solid electrolyte layer can be greater than about 5%, 6%, 7%, 8%, 9%, 10%, 11%, 12%, 13%, 14%, or 15%. In embodiments, the porosity of the solid electrolyte layer may be within a range formed by selecting any two numbers listed above or by selecting any numbers between about 5% and about 99%.

Density

The additive material added to the solid electrolyte material and filling in the spaces between the solid electrolyte material particles increases the density of the solid electrolyte layer. In some embodiments, the solid electrolyte layer has a density increased by more than about 10% compared to one without the additive material. For example, the density of the solid electrolyte layer can be increased by at or about 11%, 12% 3%, 14%, 15%, 16%, 1'7%, 18%, 19%, 20%, 25%, 30%, 35%, 40%, 45%, 50%, or any other % greater than 10%, etc. In embodiments, the density of the solid electrolyte layer can be increased by any number within a range formed by selecting any two numbers listed above or by selecting any two numbers greater than 10%.

Lower Operating Pressure

As provided herein, with the additive materials in the solid electrolyte layer, the interaction between the additive material and the particles of the solid electrolyte material allows at least part of the additive material to attach onto surfaces of the solid electrolyte material particles, resulting in better and/or closer contact between the materials in the solid electrolyte layer, such as at least part of the additive material and the adjacent solid electrolyte material particles, as well as between the solid electrolyte material particles. This interaction and attachment also maintain such improved contact during charging and discharging of the solid state batter. This improved contact facilitates conductivity of lithium ions in the solid electrolyte layer, such that the solid state battery provided herein can operate at a pressure under 10 MPa, which is substantially lower than a pressure that would be required in the absence of the additive material in the solid electrolyte layer. In some embodiments, the solid state battery can operate under a pressure of, for example, about 9 MPa, 8 MPa, 7 MPa, 6 MPa, 5 MPa, 4 MPa, 3 MPa, 2 MPa, or 1 MPa. In embodiments, the solid state battery can operate under a pressure within a range formed by selecting any two numbers listed above or by selecting any two numbers in the range of under 10 MPa.

Specific Capacity

The lower operating pressures can prevent, reduce, and/or eliminate the problems associated with higher operating pressures normally applied to solid state batteries as described herein. For example, the stability and the specific capacity of the solid state batteries can be improved. In some embodiments, the solid state battery has a specific capacity of greater than about 100, 110, 120, 130, 140, 150, 160, 170, 180, 190, 200, 210, 220, 230, 240, 250, 260, 270. 280, 290, 300, 310, 320, 330, 340, 350, 360, 370, 380, 390, 400, 410, 420. 430, 440, 450, 460, 470, 480, 490, or 500 mAh/g, etc. In embodiments, the specific capacity of the solid state battery can be within a range formed by selecting any two numbers listed above or by selecting any two numbers in the range of greater than about 100 mAh/g.

Making Solid State Battery

Methods of Making Solid State Battery

Another aspect of the present disclosure provides a method of making the solid state battery provided herein. The method of making the solid state battery provided herein comprises providing the solid electrolyte, which comprises ball milling a mixtures of the particles of the sulfide-containing solid electrolyte material and the additive material provided herein. While ball milling is used as an example herein, other known methods for mixing or combining the solid electrolyte material and the additive material may be implemented. Examples of such known methods include planetary mixing, high-shear mixing, ultrasonic mixing, mechanical alloying, or solution-based techniques such as co-precipitation, sol-gel processing, or spray drying with heat treatments.

Weight Ratio

In some embodiments, the mixture comprises the sulfide-containing solid electrolyte material and the additive material in a weight ratio of, for example, from about 1:1 to about 25:1, from about 1:1 to about 24:1, from about 1:1 to about 23:1, from about 1:1 to about 22:1, from about 1:1 to about 21:1, from about 1:1 to about 20:1, from about 1:1 to about 19:1, from about 1:1 to about 18:1, from about 1:1 to about 17:1, from about 1:1 to about 16:1, from about 1:1 to about 15:1, from about 1:1 to about 14:1, from about 1:1 to about 13:1, from about 1:1 to about 12:1, from about 1:1 to about 11:1, from about 1:1 to about 10:1, from about 1:1 to about 9:1, from about 1:1 to about 8:1, from about 1:1 to about 7:1, from about 1:1 to about 6:1, from about 1:1 to about 5:1, from about 1:1 to about 4:1, from about 1:1 to about 3:1, from about 1:1 to about 4:1, or about 1:1; or from 1:1 to 25:1, from 1:1 to 24:1, from 1:1 to 23:1, from 1:1 to 22:1, from 1:1 to 21:1, from 1:1 to 20:1, from 1:1 to 19:1, from 1:1 to 18:1, from 1:1 to 17:1, from 1:1 to 16:1, from 1:1 to 15:1, from 1:1 to 14:1, from 1:1 to 13:1, from 1:1 to 12:1, from 1:1 to 11:1, from 1:1 to 10:1, from 1:1 to 9:1, from 1:1 to 8:1, from 1:1 to 7:1, from 1:1 to 6:1, from 1:1 to 5:1, from 1:1 to 4:1, from 1:1 to 3:1, from 1:1 to 4:1, or 1:1; or any other ratio in the range of from about 1:1 to about 25:1 or from 1:1 to 25:1. In embodiments, the weight ratio of the sulfide-containing material and the additive material can be in a range of from about 1:1 to about 25:1, such as about 1:1, 2:1, 3:1, 4:1, 5:1, 6:1, 7:1, 8:1, 9:1, 10:1, 11:1, 12:1, 13:1, 14:1, 15:1, 16:1, 17:1 18:1, 19:1, 20:1, 21:1, 22:1, 23:1. 24:1, or 25:1. In embodiments, the weight ratio of the sulfide-containing material and the additive material may be within a range formed by selecting any two numbers listed above or by selecting any two numbers in the range of from about 1:1 to about 25:1.

Ball Milling Generally

Ball milling is a valuable technique for mixing and preparing materials for solid-state batteries. Ball milling is a mechanical technique widely used to grind powders into fine particles and mix materials in various applications, including the preparation of solid-state battery components. In the context of solid-state batteries, ball milling is often employed to mix and blend the electrode materials, solid electrolytes, and other components. Example ball milling devices may include planetary ball mills, attritor mills, and vibratory ball mills. These devices typically consist of a rotating or vibrating chamber containing grinding balls made of materials such as steel, ceramic, or zirconia.

Homogeneous Mixing

Ball milling is effective in achieving a homogeneous mixture of different powders. This is crucial for ensuring uniform distribution of components in the electrode materials and solid electrolytes, which, in turn, impacts the overall performance of the battery.

Reducing Particle Size

Ball milling can reduce the particle size of the materials involved, leading to increased surface area and improved reactivity. Smaller particle sizes can enhance the kinetics of electrochemical reactions, contributing to better battery performance.

Enhanced Electrode-Electrolyte Interface

Ball milling can facilitate the formation of a well-defined interface between the electrode and solid electrolyte. This is important for promoting efficient ion transport and minimizing interfacial resistance within the solid-state battery.

Promoting Solid-State Reactions

Ball milling can induce solid-state reactions between different components, promoting the formation of desired phases and structures in the materials. This is particularly relevant for the synthesis of composite electrode materials or preparation of the composite electrolyte materials provided herein.

Optimizing Conductivity

Ball milling can be used to optimize the conductivity of electrode materials by ensuring a good distribution of conductive additives, such as carbon or metal nanoparticles, within the composite; or the additive materials, within the solid electrolyte, as provided herein.

Controlling Morphology

The milling process can also influence the morphology of the materials, including particle shape and size distribution. Controlling these aspects is important for achieving the desired electrochemical properties and overall performance of the solid-state battery.

Energy Considerations

Ball milling is an energy-intensive process, and the duration and speed of milling need to be carefully controlled to avoid excessive heating, which could lead to undesired reactions or damage to the materials.

Speed

In some embodiments, the ball milling is conducted at about a speed of, for example, about 250 RPM to about 750 RPM, about 250 RPM to about 700 RPM, about 250 RPM to about 650 RPM, about 250 RPM to about 600 RPM, about 250 RPM to about 550 RPM, about 250 RPM to about 500 RPM, about 250 RPM to about 450 RPM, about 250 RPM to about 400 RPM, about 250 RPM to about 350 RPM, about 250 RPM to about 300 RPM, about 300 RPM to about 750 RPM, about 300 RPM to about 700 RPM, about 300 RPM to about 650 RPM, about 300 RPM to about 600 RPM, about 300 RPM to about 550 RPM, about 300 RPM to about 450 RPM, about 300 RPM to about 400 RPM, about 300 RPM to about 350 RPM, about 350 RPM to about 750 RPM, about 350 RPM to about 700 RPM, about 350 RPM to about 650 RPM, about 350 RPM to about 600 RPM, about 350 RPM to about 550 RPM, about 350 RPM to about 450 RPM, about 350 RPM to about 400 RPM, about 400 RPM to about 750 RPM, about 400 RPM to about 700 RPM, about 400 RPM to about 650 RPM, about 400 RPM to about 600 RPM, about 400 RPM to about 550 RPM, about 400 RPM to about 500 RPM, about 400 RPM to about 450 RPM, about 450 RPM to about 750 RPM, about 450 RPM to about 700 RPM, about 450 RPM to about 650 RPM, about 450 RPM to about 600 RPM, about 450 RPM to about 550 RPM, about 450 RPM to about 500 RPM, about 500 RPM to about 750 RPM, about 500 RPM to about 700 RPM, about 500 RPM to about 650 RPM, about 500 RPM to about 600 RPM, about 500 RPM to about 550 RPM, about 550 RPM to about 750 RPM, about 550 RPM to about 700 RPM, about 550 RPM to about 650 RPM, about 550 RPM to about 600 RPM, about 600 RPM to about 750 RPM, about 600 RPM to about 700 RPM, about 600 RPM to about 650 RPM, about 650 RPM to about 750 RPM, about 650 RPM to about 700 RPM, or about 700 RPM to about 750 RPM, about 250 RPM, about 300 RPM, about 350 RPM, about 400 RPM, about 450 RPM, about 500 RPM, about 550 RPM, about 600 RPM, about 650 RPM, about 700 RPM, about 750 RPM, etc. In embodiments, the speed at which the ball-milling is conducted can be within a range formed by selecting any two numbers listed above or by selecting any two numbers in the range of from about 250 RPM to about 750 RPM.

Duration

In some embodiments, the ball-milling is conducted for, for example, about 1 minute to about 20 hours, about 1 minute to about 19 hours, about 1 minute to about 18 hours, about 1 minute to about 17 hours, about 1 minute to about 16 hours, about 1 minute to about 15 hours, about 1 minute to about 14 hours, about 1 minute to about 13 hours, about 1 minute to about 12 hours, about 1 minute to about 11 hours, about 1 minute to about 10 hours, about 1 minute to about 9 hours, about 1 minute to about 8 hours, about 1 minute to about 7 hours, about 1 minute to about 6 hours, about 1 minute to about 5 hours, about 1 minute to about 4 hours, about 1 minute to about 3 hours, about 1 minute to about 2 hours, about 1 minute to about 1 hour, about 1 hour to about 20 hours, about 1 hour to about 19 hours, about 1 hour to about 18 hours, about 1 hour to about 17 hours, about 1 hour to about 16 hours, about 1 hour to about 15 hours, about 1 hour to about 14 hours, about 1 hour to about 13 hours, about 1 hour to about 12 hours, about 1 hour to about 11 hours, about 1 hour to about 10 hours, about 1 hour to about 9 hours, about 1 hour to about 8 hours, about 1 hour to about 7 hours, about 1 hour to about 6 hours, about 1 hour to about 5 hours, about 1 hour to about 4 hours, about 1 hour to about 3 hours, about 1 hour to about 2 hours, about 0.1 hour, about 0.5 hour, about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, etc. In embodiments, the ball-milling can be conducted for a duration within a range formed by selecting any two numbers listed above or by selecting any two numbers in the range of from about 1 minute to about 20 hours.

Effect of Ball Milling

In some embodiments, the ball milling causes the thiol group or the leaving group to interact with the sulfur of the sulfide-containing solid electrolyte material, such that at least part of the additive material is attached onto surfaces of the particles. In some embodiments, the at least part of the additive material is attached onto surfaces of the particles by a non-covalent attachment. In some embodiments, the non-covalent attachment is chemisorption, van der Waals interaction, or ionic interaction. In some embodiments, the at least part of the additive material is attached onto surfaces of the particles by a covalent bond. In some embodiments, the covalent bond is a sulfide bond or a disulfide bond.

Conductivity or Diffusivity of Lithium Ion

The surface attachment of the at least part of the additive material to the sulfide-containing solid electrolyte particles creates a network of conductive pathways between adjacent electrolyte particles through contacts between the at least part of the additive material and the adjacent solid electrolyte material. This network of conductive pathways facilitates more efficient lithium ion transport through the battery structure. Moreover, the enhanced particle-to-particle contact holds the solid electrolyte material together, which ensures continuous pathways for lithium ions to move efficiently between electrodes.

Lower Operating Pressure

By ball milling the additive materials and the sulfide-containing solid electrolyte material to make the solid electrolyte layer, the interaction between the additive material and the particles of the solid electrolyte material allows at least part of the additive material to be attached onto surfaces of the solid electrolyte material particles, resulting in better and/or closer contact between the materials in the solid electrolyte layer, such as at least part of the additive material and the adjacent solid electrolyte material particles, as well as between the solid electrolyte material particles. This interaction and attachment also maintains such improved contact during charging and discharging of the solid state batter. This improved contact facilitates conductivity of lithium ions in the solid electrolyte layer, such that the solid state battery provided herein can operate at a pressure under 10 MPa, which is substantially lower than a pressure that would be required in the absence of the additive material in the solid electrolyte layer. In some embodiments, the solid state battery can operate under a pressure of, for example, about 9 MPa, 8 MPa, 7 MPa, 6 MPa, 5 MPa, 4 MPa, 3 MPa, 2 MPa, or 1 MPa. In embodiments, the solid state battery can operate under a pressure within a range formed by selecting any two numbers listed above or by selecting any two numbers in the range of under 10 MPa.

Specific Capacity

The lower operating pressures can prevent, reduce, or eliminate the problems associated with higher operating pressures normally applied to solid state batteries as described herein. For example, the stability and the specific capacity of the solid state batteries can be improved. In some embodiments, the solid state battery has a specific capacity of greater than about 100, 110, 120, 130, 140, 150, 160, 170, 180, 190, 200, 210, 220, 230, 240, 250, 260, 270. 280, 290, 300, 310, 320, 330, 340, 350, 360, 370, 380, 390, 400, 410, 420. 430, 440, 450, 460, 470, 480, 490, or 500 mAh/g, etc. In embodiments, the specific capacity of the solid state battery can be within a range formed by selecting any two numbers listed above or by selecting any two numbers in the range of greater than about 100 mAh/g.

Reaction and Test Environment

Since sulfide-containing materials are sensitive to air and moisture and might decompose to produce toxic gas such as $H_2S$, the steps of making the solid state battery and test steps provided herein may be performed in a closed apparatus (e.g., MBraun MB 200B, $H_2O$ <0.5 ppm, $O_2$<0.5 ppm) filled with inert gas, such as argon.

Other Aspects

The following provides other aspects of the present disclosure. The additional features, embodiments and examples discussed below will be applicable to various aspects of the invention discussed above. In case there is a conflict between information in the foregoing discussions and information in the following discussions, however, the information in the foregoing section should apply.

Solid State Lithium Ion Batteries

A solid state battery can receive a charge and discharge an electrical load various times. A solid state battery includes electrodes, a cathode electrode and an anode electrode, and an electrolyte to allow lithium ions to travel between the electrodes. In contrast to conventional liquid electrolyte batteries, the solid state battery does not include any flowable liquids. Forming a circuit between the electrodes causes electricity to flow between the electrodes. During charging of the lithium ion rechargeable battery, lithium ions are emitted from the cathode electrode and are intercalated into an active material of the anode electrode. During discharging of the lithium ion rechargeable battery, lithium ions are emitted from the anode electrode and are intercalated into an active material of the cathode electrode. As lithium ions reciprocate between the electrodes, they transfer energy.

Solid State Battery Configuration

The present disclosure provides a solid state battery 100 comprising a cathode electrode 102, an anode electrode 104, and a solid electrolyte layer 106 intermediate the cathode electrode 102 and the anode electrode 104. While listed as exemplary, the solid state battery 100 does not require all of these components. For example, in some configurations, such as in anodeless system, the anode electrode 104 may be omitted.

Optional Additional Layers

The solid state battery 100 can optionally comprise an additional layer or layers, such as, for example, a separator layer, a protective layer, an inhibitor layer, a solid electrolyte interface layer, or a combination thereof.

Protective Layer

For example, a protective layer may be incorporated between the electrodes 102 and 104 and the solid electrolyte layer 106. The protective layer may also serve to mitigate dendrite formation, particularly on the anode side, thereby improving the overall cycle life and safety of the battery. In some cases, the protective layer may help improve interfacial stability between the electrodes and electrolyte, potentially reducing unwanted side reactions. Additionally, the protective layer may enhance the mechanical properties of the electrode-electrolyte interface, which could be beneficial for maintaining good contact during cycling.

Protective Layer Materials

This protective layer may comprise materials such as lithium phosphate, lithium titanate, or lithium lanthanum zirconium oxide (LLZO), which can help prevent undesirable side reactions at the electrode-electrolyte interface. Other options for the protective layer material may include, but are not limited to, lithium niobium oxide ($LiNbO_3$), lithium tantalum oxide ($LiTaO_3$), lithium aluminum titanium phosphate (LATP), lithium aluminum germanium phosphate (LAGP), lithium silicate, and lithium boron oxide Separator Layer A separator layer may also be included in some configurations of the solid state battery 100. These separator layers can provide additional mechanical support to the battery structure while still allowing for efficient ion transport. The separator layer may also be designed to have a gradient structure, with properties optimized for contact with both the cathode and anode materials. This gradient structure could involve, for example, varying the porosity, composition, or surface properties across the thickness of the separator. In some aspects, the separator surface may be functionalized with ion-conductive groups or coatings to enhance lithium ion transport at the electrode-separator interfaces. The separate layer may further be designed with multiple layers, by incorporating different materials optimized for specific functions, such as a mechanically strong core layer sandwiched between ion-conductive outer layers. The separator layer may additional be designed to be self-healing e.g., by reforming bonds after mechanical stress to help prevent short circuits caused by dendrite growth.

Separator Layer Materials

While traditional liquid electrolyte batteries often use porous polymer separators, solid state batteries may employ thin ceramic or glass-ceramic layers as separators. Materials such as LLZO, LATP (lithium aluminum titanium phosphate), or LAGP (lithium aluminum germanium phosphate) may be used for this purpose. Other separator layer materials that may be suitable for solid state batteries include lithium phosphate oxynitride (LiPON), lithium lanthanum titanate (LLTO), lithium garnet-type materials like Li6BaLa2Ta2O12, sulfide-based materials like Li10GeP2S12, and polymer-ceramic composites combining materials like polyethylene oxide (PEO) with ceramic fillers.

Solid State Battery Cell

FIG. 1 illustrates a cell 101 of a solid state battery 100 according to an embodiment. The cell 101 includes a cathode electrode 102, an anode electrode 104, and a solid electrolyte layer 106 intermediate the cathode electrode 102 and the anode electrode 104. The cell 101 can optionally include an additional layer or layers, such as, for example, a separator layer, a protective layer, an inhibitor layer, a solid electrolyte interface layer, or a combination thereof.

Cell Configuration

As illustrated in FIG. 1, the solid state battery 100 may include a single cell 101. In other examples, the solid state battery 100 can include multiple cells, such as, at least two cells, at least three cells, or at least four cells. Connecting the cells in series increases a voltage of the solid state battery 100 and connecting the cells in parallel increases an amp-hour capacity of the solid state battery 100.

Dimensions of Cell

The cell 101 may have a width, $w_1$, a length, $l_1$, and a thickness, $t_1$.

Thickness of Cell

A thickness, $t_1$, of the cell 101 can be at or about any number in a range of from about 100 μm to about 5000 μm, such as about 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400,410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1100, 1200, 1300, 1400, 1500, 1600, 1700, 1800, 1900, 2000, 3000, 4000, or 5000 μm. In some embodiments, the thickness, $t_1$, of the cell 101 may be within a range formed by selecting any two numbers listed above or by selecting any two numbers within the range of from about 100 μm to about 5000 μm, e.g., between about 100 μm and about 5,000 μm or about 100 μm and about 1,000 μm.

Aspect Ratio of Width

The width, $w_1$, of the cell 101 may be substantially greater than the thickness, $t_1$, of the cell 101. In some embodiments, an aspect ratio of the width, $w_1$, to the thickness, $t_1$, may be at least 10, at least 20, at least 30, at least 40, at least 50, at least 60, at least 70, at least 80, at least 90, at least 100, at least 110, at least 120, at least 130, at least 140, at least 150, at least 160, at least 170, at least 180, at least 190, at least 200, at least 210, at least 220, at least 230, at least 240, at least 250, at least 260, at least 270, at least 280, at least 290, at least 300, at least 350, at least 400, at least 450, at least 500, at least 550, at least 600, at least 650, at least 700, at least 750, at least 800, at least 850, at least 900, at least 950, at least 1000, at least 2000, at least 3000, at least 4000, at least 5000, at least 6000, at least 7000, at least 8000, at least 9000, or at least 10000.

Aspect Ratio of Length

The length, $l_1$, of the cell 101 may be substantially greater than the thickness, $t_1$, of the cell 101. In some embodiments, an aspect ratio of the length, $l_1$, to the thickness, $t_1$, may be at least 10, at least 20, at least 30, at least 40, at least 50, at least 60, at least 70, at least 80, at least 90, at least 100, at least 110, at least 120, at least 130, at least 140, at least 150, at least 160, at least 170, at least 180, at least 190, at least 200, at least 210, at least 220, at least 230, at least 240, at least 250, at least 260, at least 270, at least 280, at least 290, at least 300, at least 350, at least 400, at least 450, at least 500, at least 550, at least 600, at least 650, at least 700, at least 750, at least 800, at least 850, at least 900, at least 950, at least 1000, at least 2000, at least 3000, at least 4000, at least 5000, at least 6000, at least 7000, at least 8000, at least 9000, or at least 10000.

Cathode Electrode

The cathode electrode 102 is associated with one polarity (e.g., positive) of the solid state battery 100. The cathode electrode 102 is configured as a positive electrode during discharge of the solid state battery 100. The cathode electrode 102 is suitable for lithium ion diffusion between a current collector 108 and the solid electrolyte layer 106. The cathode electrode 102 is in electrical communication with the current collector 108.

Cathode Electrode Positioning

In embodiments, the cathode electrode 102 is formed over and in direct contact with the current collector 108. In other embodiments, another functional layer may be interposed between the cathode electrode 102 and the current collector 108.

Materials for Cathode Electrode

The cathode electrode 102 may be capable of reversible intercalation and deintercalation of lithium ions. For example, the cathode electrode 102 can comprise a cathode active material alone. In other examples, the cathode electrode 102 may optionally include one or more of a conductive carbon, a solid electrolyte material, and a binder. Optionally, the cathode electrode 102 may further comprise an additive, such as, for example, an oxidation stabilizing agent, a reduction stabilizing agent, a flame retardant, a heat stabilizer, an antifogging agent, a thickener, a plasticizer, an ion conductivity enhancer, a binder (described in detail further below), a dispersant, a wetting agent, an adhesion promoter, a crosslinking agent, a colorant, the like, or a combination thereof.

Examples of Additives

Examples of these additives may include butylated hydroxyanisole (BHA) or butylated hydroxytoluene (BHT) as oxidation stabilizing agents, ascorbic acid or sodium sulfite as reduction stabilizing agents, aluminum hydroxide or magnesium hydroxide as flame retardants, phenolic compounds or phosphites as heat stabilizers, polyethylene glycol or silica nanoparticles as antifogging agents, and carboxymethyl cellulose (CMC) or xanthan gum as thickeners, dibutyl phthalate or triethyl citrate as plasticizers, ceramic fillers or ionic liquids as ion conductivity enhancers, polyvinylpyrrolidone or sodium dodecyl sulfate as dispersants, polysorbates or poloxamers as wetting agents, silanes or titanates as adhesion promoters, peroxides or aziridines as crosslinking agents, and carbon black or metal oxides as colorants.

Cathode Active Material

The cathode active material can include lithium cobalt oxide ($LiCoO_2$), lithium nickel oxide ($LiNiO_2$), $Li[Ni_aCo_bMn_cM^1_d]O_2$ (wherein $M^1$ is any one element elected from the group consisting of Al, Ga, In, or a combination thereof, $0.3 \leq a < 1.0$, $0 \leq b < 0.5$, $0 \leq c \leq 0.5$, $0 \leq d \leq 0.1$, and $a+b+c+d=1$), $Li(Li_eM^2_{f-e-f}M^3_{f'})O_{2-g}A_g$ (wherein $0 \leq e \leq 0.2$, $0.6 \leq f \leq 1$, $0 \leq f' \leq 0.2$, $0 \leq g \leq 0.2$, $M^2$ includes Mn and at least one element selected from the group consisting of Ni, Co, Fe, Cr, V, Cu, Zn and Ti, $M^3$ is at least one element selected from the group consisting of Al, Mg and B, and A is at least one element selected from the group consisting of P, F, S and N), or those compounds substituted with one or more transition metals; lithium manganese oxides such as those represented by the chemical formula of $Li^{1+h}Mn_{2-h}O_4$ (wherein $0 \leq h \leq 0.33$), $LiMnO_3$, $LiMn_2O_3$, $LiMnO_2$, or the like; lithium copper oxide ($Li_2CuO_2$); vanadium oxides such as $LiV_3O_8$, $V_2O_5$ or $Cu_2V_2O_7$; Ni-site type lithium nickel oxides represented by the chemical formula of $LiNi_{1-i}M^4{}_iO_2$ (wherein $M^4$=Co, Mn, Al, Cu, Fe, Mg, B or Ga, and $0.01 \leq y \leq 0.3$); lithium manganese composite oxides represented by the chemical formula of $LiMn_{2-j}M^5{}_jO_2$ (wherein $M^5$=Co, Ni, Fe, Cr, Zn, or Ta, and $0.01 \leq y \leq 0.1$) or $Li_2Mn_3M^6O_8$ (wherein $M^6$=Fe, Co, Ni, Cu, or Zn); $LiMn_2O_4$ in which Li is partially substituted with an alkaline earth metal ion; disulfide compounds; $LiFe_3O_4$, $Fe_2(MoO_4)_3$; the like; or combinations thereof.

Phosphate-Based Materials

In addition to the cathode active materials previously mentioned, the cathode electrode may include other types of materials. For example, lithium iron phosphate (LiFePO4) may be used as a cathode active material due to its excellent thermal stability and long cycle life. Other phosphate-based materials such as lithium manganese iron phosphate (LiMnxFe1-xPO4), lithium vanadium phosphate (LiVOPO4), lithium titanium phosphate (LiTi2(PO4)3), lithium nickel phosphate (LiNiPO4), fluorophosphates such as LiVPO4F or LiFeSO4F, or lithium cobalt phosphate (LiCoPO4) may also be suitable.

Layered Oxide Materials

The cathode active material may also include layered oxide materials with various compositions, such as Li(Ni1-x-yCoxMny)O2 (NCM) or Li(Ni1-x-yCoxAly)O2 (NCA), where the ratios of Ni, Co, Mn, and Al can be adjusted to optimize performance characteristics. For instance, NCM materials with high nickel content, such as NCM811 (LiNi0.8Co0.1Mn0.1O2), may be used to achieve higher energy density. In some cases, the cathode active material may comprise spinel structures like LiNi0.5Mn1.5O4, which can offer high voltage operation. Alternatively, materials with tavorite structures, such as LiFeSO4F or LiVPO4F, may be employed for their potential for high energy density and good thermal stability.

Composite or Blended Cathode Materials

Composite or blended cathode materials, combining two or more active materials, may also be used. For example, a blend of layered oxides and spinel materials might be employed to balance energy density and power capability. As another example, lithium iron phosphate may be blended with one or more of the cathode active materials described above. In some embodiments, the cathode active material may include surface-modified versions of the aforementioned compounds, where the surface modification aims to improve stability, conductivity, or other performance metrics.

Emerging Classes of Materials

The cathode active material may also include emerging classes of materials such as disordered rock salt structures (e.g., Li3NbO4-based materials), lithium-rich anti-perovskites (e.g., Li3OCl), cation-disordered oxides (e.g., Li—Mn—V—O systems), or high-entropy oxides, which may offer desirable combinations of high capacity and structural stability. In some cases, the cathode active material may incorporate dopants or substitutional elements to further tune its electrochemical properties.

Particulate Nature of Cathode Active Material

The cathode active material can be particle shaped. The cathode active material can have a particle size in a range of from about 1 nm to about 1000 μm, such as about any of 10 nm, 20 nm, 30 nm, 40 nm, 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 550 nm, 600 nm, 650 nm, 700 nm, 750 nm, 800 nm, 850 nm, 900 nm, 950 nm, 1000 nm, 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 550 μm, 600 μm, 650 μm, 700 μm, 750 μm, 800 μm, 850 μm, 900 μm, 950 μm, or 1,000 μm. In embodiments, particle size of the cathode active material may be within a range formed by selecting any two numbers listed above or by selecting any two numbers in the range of from about 1 nm to about 1000 μm, e.g., between about 10 nm and about 1,000 μm. Gaps between cathode active material particles in the cathode electrode 102 can be filled with the solid electrolyte material.

Amount of Cathode Active Material in Cathode Electrode

The amount of the cathode active material in the solid state battery 100 affects the charge and discharge capacity of the solid state battery 100. In order to manufacture a high-capacity cathode electrode 102, a high level of cathode active material can be included in the cathode electrode 102. For example, the cathode electrode 102 includes at, about, or greater than 1, 5, 10, 15, 20, 25, 30, 35, 40, 45, 50, 55, 60, 65, 70, 75, 80, 85, 90, 95, 98, or 99 wt % based on the total weight of the cathode electrode 102. In embodiments, cathode active material in the cathode electrode 102 may be within a range formed by selecting any two numbers listed above or by selecting any two numbers within the range from greater than 0 to about 100 wt %, e.g., between about 40 wt % and about 98 wt %.

Conductive Material in Cathode Electrode

The conductive material in the cathode electrode 102 is not particularly limited, as long as it has conductivity while not causing any chemical change in the corresponding solid state battery 100. For example, the conductive material can comprise graphite, such as natural graphite or artificial graphite; carbon black, such as acetylene black, ketjen black, channel black, furnace black, lamp black or thermal black; conductive fibers, such as carbon fibers or metal fibers; carbon nanotubes (CNT), including both singled-walled carbon nanotubes (SWCNT) and multi-walled carbon nanotubes (MWCNT); metal powder, such as fluorocarbon, aluminum or nickel powder; conductive whiskers, such as zinc oxide or potassium titanate; conductive metal oxides, such as titanium oxide; conductive polymers, such as polyphenylene derivatives; graphene, metallic nanowires (e.g. silver nanowires), indium tin oxide (ITO), antimony-doped tin oxide (ATO), fluorine-doped tin oxide (FTO), aluminum-doped zinc oxide (AZO), gallium-doped zinc oxide (GZO), conductive ceramics like titanium nitride or titanium carbide, the like, or combinations thereof.

Amount of Conductive Material in Cathode Electrode

The cathode electrode 102 includes at or about 1, 3, 4, 5, 6, 7, 8, 9, 10, 11, 12, 13, 14, 15, 16, 17, 18, 19, 20, 21, 22, 23, 24, 25, 26, 27, 28, 29, or 30 wt % of conductive material based on the total weight of the cathode electrode 102. In embodiments, conductive material in the cathode electrode 102 may be within a range formed by selecting any two numbers listed in the immediately previous sentence, e.g., between about 1 wt % and about 30 wt %.

Materials for Binder

The binder can comprise various types of binder polymers, such as, for example, polyvinylidene fluoride-co-hexafluoropropylene (PVdF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate, ethylene-propylene-diene monomer (EPDM), sulfonated EPDM, styrene butadiene rubber (SBR), fluororubber, polyacrylic acid, polyimide, polyamide-imide, polyurethane, polyethylene oxide (PEO), poly(ethylene-co-vinyl acetate) (PEVA), poly(vinyl acetate) (PVA), chitosan, guar gum (GG), xanthan gum, carrageenan, pectin, water-soluble polymers, lignin, polymers thereof whose hydrogen atoms are substituted with Li, Na or Ca, various copolymers thereof, the like, or combinations thereof.

Other Binder Materials

In addition to the binder materials previously mentioned, other types of binder materials may be used in the cathode electrode to enhance its performance and stability. For instance, water-soluble binders such as sodium alginate, gelatin, or polyacrylamide may be employed to improve the environmental friendliness of the electrode manufacturing process. These binders may also offer advantages in terms of electrode flexibility and adhesion strength. In some cases, conductive binders like poly(3,4-ethylenedioxythiophene):poly(styrene sulfonate) (PEDOT:PSS) or polyaniline (PANI) may be used to simultaneously improve both the mechanical integrity and electrical conductivity of the electrode.

Novel Binder Systems

Novel binder systems, such as self-healing polymers or supramolecular assemblies, may be incorporated to enhance the long-term stability and cycle life of the battery. Additionally, composite binders combining multiple polymers or incorporating inorganic nanoparticles may be utilized to tailor the mechanical, thermal, and electrochemical properties of the electrode. In some embodiments, bio-derived or biodegradable binders, such as cellulose derivatives or chitosan, may be employed to reduce the environmental impact of battery production and disposal.

Amount of Binder in the Cathode Electrode

The cathode electrode 102 may include at or about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt % of binder based on the total weight of the cathode electrode 102. In embodiments, binder in the cathode electrode 102 may be within a range formed by selecting any two numbers listed in the immediately previous sentence, e.g., between about 1 wt % and about 30 wt %.

Solid Electrolyte Material

The solid electrolyte material in the cathode electrode 102 can be configured the same as the material for the solid electrolyte layer 106 discussed below. The solid electrolyte material in the cathode electrode 102 can be the same as or different than the material for the solid electrolyte layer 106.

Amount of Solid Electrolyte Material in Cathode Electrode

The cathode electrode 102 may include about 1, 2, 3, 4, 5, 6, 7, 8, 9, 10, 11, 12, 13, 14, 15,16, 17, 18, 19, 20, 21, 22, 23, 24, 25, 26, 27, 28, 29, or 30 wt % of solid electrolyte material based on the total weight of the cathode electrode 102. In embodiments, the amount of solid electrolyte material in the cathode electrode 102 may be within a range formed by selecting any two numbers listed in the immediately previous sentence, e.g., between about 1 wt % and about 30 wt %.

Thickness of Cathode Electrode

A thickness, $t_2$, of the cathode electrode 102 can be at or about any number in a range of from greater than 0 to 1000 μm, such as 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400,410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1,000 μm. In embodiments, the thickness, $t_2$, of the cathode electrode 102 may be within a range formed by selecting any two numbers listed above or by selecting any two numbers within the range of from greater than 0 to about 1000 μm, e.g., between about 10 μm and about 1,000 μm.

Porosity of Cathode Electrode

A porosity of the cathode electrode 102 can be at or about any number in a range of from 0 to 20 vol %, such as 0, 1, 2 3, 4, 5, 6, 7, 8, 9, 10, 11, 12, 13, 14, 15, 16, 17, or 18 vol % or any other vol % within the range of 0 to 20 vol %, based on the total volume of the cathode electrode 102. In embodiments, the porosity of the cathode electrode 102 may be within a range formed by selecting any two numbers listed above or by selecting any two numbers within the range of 0 to 20 vol %, e.g., between 0 vol % and about 18 vol %.

Lithium Ion Diffusivity of Cathode Electrode

The cathode electrode 102 can include a lithium ion diffusivity at or about any number in a range of from greater than 0 to $1 \times 10^{-7}$ cm$^2$/s, such as $1 \times 10^{-14}$ cm$^2$/s, $1 \times 10^{-13}$ cm$^2$/s, $1 \times 10^{-12}$ cm$^2$/s, $1 \times 10^{-11}$ cm$^2$/s, $1 \times 10^{-11}$ cm$^2$/s, $1 \times 10^{-9}$ cm$^2$/s, $1 \times 10^{-8}$ cm$^2$/s, or $1 \times 10^{-7}$ cm$^2$/s. In embodiments, the lithium ion diffusivity of the cathode electrode 102 may be within a range formed by selecting any two numbers listed above or by selecting any two numbers within the range of from greater than 0 to $1 \times 10^{-7}$ cm$^2$/s, e.g., between $1 \times 10^{-14}$ cm$^2$/s and about $1 \times 10^{-7}$ cm$^2$/s.

Current Collector at Cathode Electrode

The current collector 108 collects electrical energy generated at the cathode electrode 102 and supports the cathode electrode 102.

Materials for Current Collector at Cathode Electrode

The material of the current collector 108 is not particularly limited as long as it allows adhesion of the cathode electrode 102, has a suitable electrical conductivity, and does not cause significant chemical changes in the corresponding solid state battery 100 in the voltage range of the solid state battery 100. For example, the current collector 108 is made of or includes various materials, such as, a metal, a conductive carbon, or a conductive ceramic, although not limited thereto. The metal of the current collector 108 may include one or more selected from the group consisting aluminum, an aluminum alloy, copper, a copper alloy, nickel, a nickel alloy, titanium, a titanium alloy, iron, an iron alloy (e.g., steel, stainless steel), silver, a silver alloy, gold, platinum, palladium, chromium, molybdenum, tungsten, tantalum, niobium, zirconium, vanadium, manganese, cobalt, indium, tin, lead, bismuth, or a combination thereof, although not limited thereto.

Current Collector Geometry

The current collector 108 may also be configured in various other geometries to optimize its performance and integration with the cathode electrode 102, and may be sized for specific form factors, such as pouch, cylindrical, and/or prismatic form factors.

Shape of Current Collector at Cathode Electrode

It is possible to increase the adhesion of the cathode electrode 102 to the current collector 108 by forming fine surface irregularities on the surface of the current collector 108. The current collector 108 may have various shapes, such as, for example, a film, a sheet, a foil, a net, a porous body, a foam, a non-woven web, the like, or combinations thereof.

Examples of Shape and Size of Current Collector

For instance, the current collector 108 may be structured as a mesh or grid, which can provide enhanced mechanical support while maintaining high surface area for electrode adhesion. In some embodiments, the current collector 108 may be designed with a corrugated or wavy pattern, potentially increasing the contact area with the cathode material and improving overall conductivity. The current collector 108 may also be fabricated as a perforated sheet, allowing for better electrolyte penetration and ion transport. In certain cases, the current collector 108 may be formed as a three-dimensional structure, such as an interconnected network of fibers or a honeycomb-like configuration, which could enhance the structural integrity of the electrode assembly while facilitating efficient current collection.

Thickness of Current Collector at Cathode Electrode

A thickness, $t_3$, of the current collector 108 can be at or about any number in a range of from greater than 0 to 500 µm, such as 1, 2, 3, 4, 5, 6, 7, 8, 9, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 µm. In embodiments, the thickness, $t_3$, of the current collector 108 may be within a range formed by selecting any two numbers listed above or by selecting any two numbers within the range of from greater than 0 to 500 µm, e.g., between about 5 µm and about 500 µm.

Manufacturing Methods for Cathode Electrode

The cathode electrode 102 may be obtained by various methods.

Dry Powder Coating Process

For instance, a dry powder coating process may be employed, where the cathode active material, conductive additives, and binder are mixed in a dry state and then directly applied to the current collector 108 using electrostatic deposition or mechanical compression. This method may reduce environmental impact by reducing use of solvents.

3D Printing

In some cases, the cathode electrode 102 may be fabricated using additive manufacturing techniques such as 3D printing. This approach allows for precise control over the electrode structure and porosity, potentially enhancing the electrode's performance and energy density. Various 3D printing methods, including fused deposition modeling (FDM), selective laser sintering (SLS), or direct ink writing (DIW), may be utilized depending on the specific materials and desired electrode properties.

Electrospinning

Another method for manufacturing the cathode electrode 102 may involve electrospinning. In this process, a solution containing the cathode active material, conductive additives, and a polymer binder is extruded through a nozzle under an electric field, resulting in the formation of nanofibers. These fibers can be collected directly on the current collector 108 to form a highly porous electrode structure with increased surface area.

Tape Casting

In some embodiments, the cathode electrode 102 may be prepared using a tape casting method. This technique involves spreading a slurry of electrode materials onto a moving carrier film using a doctor blade, followed by drying and calendaring. The resulting electrode tape can then be laminated onto the current collector 108.

Spray Coating

Alternatively, the cathode electrode 102 may be fabricated using a spray coating technique. In this method, a fine mist of the electrode slurry is sprayed onto the current collector 108 using compressed air or ultrasonic atomization. This approach may allow for the creation of thin, uniform electrode layers and can be particularly useful for large-scale production.

Freeze-Casting

In certain cases, the cathode electrode 102 may be manufactured using a freeze-casting method. This process involves freezing a slurry of electrode materials, followed by sublimation of the ice to create a porous structure. The resulting porous electrode can then be sintered and attached to the current collector 108.

Sol-Gel Process

For some applications, the cathode electrode 102 may be prepared using a sol-gel process. This method involves the formation of a colloidal suspension (sol) that is then converted into a gel-like network containing the cathode active material and other components. The gel can be applied to the current collector 108 and subsequently heat-treated to form the final electrode structure.

Slurry-Based Process

For example, the cathode active material can be mixed and agitated with a solvent, and optionally a binder, conductive material, and a dispersing agent to form slurry. Then, the slurry can be applied (e.g., coated) onto the current collector 108, followed by pressing and drying, to obtain the cathode electrode 102.

Application Methods for Slurry for Cathode Electrode

The application of the slurry to the cathode electrode 102 may include using a technique selected from the group consisting of slot die coating, gravure coating, spin coating, spray coating, roll coating, curtain coating, extrusion, casting, screen printing, inkjet printing, spray printing, gravure printing, heat transfer printing, a Toppan printing method, intaglio printing, offset printing, the like, and combinations thereof.

Double Layer Slot Die Coating

In some embodiments, the cathode electrode 102 may be fabricated using a double layer slot die coating (DLD) technique. This method involves the simultaneous application of two distinct layers of electrode materials onto the current collector 108 in a single pass. The DLD process may allow for the creation of gradient structures within the electrode, potentially optimizing both the electrochemical performance and mechanical properties of the cathode. Additionally, this technique may enable the incorporation of functional interlayers or protective coatings as part of the electrode manufacturing process, potentially enhancing the overall battery performance and longevity.

Solvent for Slurry for Cathode Electrode

The solvent for forming the cathode electrode 102 may include water and/or an organic solvents, such as, for example, N-methyl pyrrolidone (NMP), dimethyl formamide (DMF), acetone, dimethyl acetamide, dimethyl sulfoxide (DMSO), isopropyl alcohol, the like, or combinations thereof. The solvent may be used in an amount sufficient to dissolve and disperse the electrode ingredients, such as the cathode active material, binder, and conductive material, considering the slurry coating thickness, production yield, the like, or combinations thereof. Additional solvents that may be used include ethanol, methanol, propanol, butanol, ethyl acetate, methyl ethyl ketone, tetrahydrofuran, diethyl ether, and toluene.

Solvent-Free Methods

In some aspects of the disclosure, the cathode electrode 102 may be prepared using a solvent-free method, such as dry powder processing or melt extrusion, which reduce the use of liquid solvents and may offer environmental and cost benefits.

Dispersing Agent for Slurry for Cathode Electrode

The dispersing agent forming the cathode electrode 102 may include an aqueous dispersing agent and/or an organic dispersing agent, such as, for example, N-methyl-2-pyrrolidone. Other possible dispersing agents may include polyvinylpyrrolidone (PVP), carboxymethyl cellulose (CMC), sodium dodecyl sulfate (SDS), Triton X-100, polyethylene glycol (PEG), polyacrylic acid (PAA), and various surfactants such as polysorbates or poloxamers.

Drying Technique for Slurry for Cathode Electrode

The slurry for the cathode electrode 102 may be dried by irradiating heat, electron beams (E-beams), gamma rays, or UV (G, H, I-line), the like, or combinations thereof, to vaporize the solvent. For example, the slurry may be vacuum dried at room temperature. Although the solvent is removed through evaporation by the drying step, the other ingredients do not evaporate and remain as they are to form the cathode electrode 102.

Additional Drying Techniques

In addition to the drying techniques mentioned, the cathode electrode 102 may be dried using other methods such as infrared (IR) drying, microwave drying, or freeze-drying.

Combination of Drying Techniques

In some embodiments, a combination of drying techniques may be employed, such as using convection heating followed by vacuum drying, to optimize the drying process and ensure complete solvent removal while maintaining the integrity of the electrode structure.

Anode Electrode Generally

The anode electrode 104 is associated with one polarity (e.g., negative) of the solid state battery 100, which is different than the polarity of the cathode electrode 102. The anode electrode 104 is configured as a negative electrode during discharge of the solid state battery 100. The anode electrode 104 is suitable for lithium ion diffusion between a current collector 110 and the solid electrolyte layer 106.

Anode Electrode Positioning

The anode electrode 104 is in electrical communication with the current collector 110. In embodiments, the anode electrode 104 is formed over and in direct contact with the current collector 110. In other embodiments, another functional layer may be interposed between the anode electrode 104 and the current collector 110.

Anodeless Electrode System

In some embodiments, as explained above, the solid state battery 100 may utilize an anodeless electrode system. In such configurations, the anode electrode 104 may be omitted, and lithium metal may be deposited directly onto the current collector 110 during charging. This approach may potentially increase the energy density of the battery and eliminate a separate anode material, while also potentially reducing the overall thickness of the battery structure.

Materials for Anode Electrode

The anode electrode 104 may be capable of reversible intercalation and deintercalation of lithium ions. For example, the anode electrode 104 can comprise an anode active material alone. In other examples, the anode electrode 104 may include conductive particles, a binder, the like, or combinations thereof.

Additives for Anode Electrode

Optionally, the anode electrode 104 may further comprise an additive, such as, for example, an oxidation stabilizing agent (e.g., butylated hydroxyanisole, butylated hydroxytoluene, propyl gallate, tert-butylhydroquinone), a reduction stabilizing agent (e.g., ascorbic acid, sodium sulfite, erythorbic acid, sodium metabisulfite), a flame retardant (e.g., aluminum hydroxide, magnesium hydroxide, ammonium polyphosphate, melamine cyanurate), a heat or light stabilizer (e.g., phenolic compounds, phosphites, hindered amine light stabilizers, UV absorbers like benzophenones or benzotriazoles), an antifogging agent (e.g., polyethylene glycol, silica nanoparticles, glycerol, sorbitol), a thickener (e.g., carboxymethyl cellulose, xanthan gum), the like, or a combination thereof.

Other Additives for Anode Electrode

Additionally, conductive additives such as carbon black, graphene, or carbon nanotubes may be incorporated to enhance electrical conductivity, while binder modifiers like styrene-butadiene rubber or polyacrylic acid may improve adhesion and mechanical stability. Functional additives such as fluoroethylene carbonate or vinylene carbonate may also be included to promote the formation of a stable solid electrolyte interphase layer on the anode surface.

Materials for Anode Active Material

The anode active material is made of or includes various materials, such as, for example, an alkali earth metal, an alkaline earth metal, a group 3B metal, a transition metal, a metalloid, an alloy thereof, a conductive carbon, the like, or a combination thereof, although not limited thereof. In embodiments, the anode active material can comprise silicon, a silicon alloy, lithium, a lithium alloy, a conductive carbon, or a combination thereof, although not limited thereto. In embodiments, the lithium alloy is made of or includes a lithium alloy comprising silicon, chlorine, or a combination thereof. A lithium metal thin film may be used as the anode active material.

Other Materials Anode Active Materials

The anode active material can include carbon-based material such as artificial graphite, natural graphite, graphitized carbon fiber, amorphous carbon or the like; a metallic compound capable of alloying with lithium such as Si, Al, Sn, Pb, Zn, Bi, In, Mg, Ga, Cd, a Si alloy, a Sn alloy, an Al alloy, or the like; a metal oxide capable of doping and dedoping lithium ions such as $SiO_x$ ($0<x<2$), $SnO_2$, vanadium oxide or lithium vanadium oxide; and a composite including the metallic compound and the carbon-based material such as a Si—C composite or a Sn—C composite.

Carbon-Based Materials

The carbon-based material can include low-crystallinity carbon, high-crystallinity carbon, the like, or combinations thereof. A representative example of low-crystallinity carbon is soft carbon or hard carbon, and a representative example of the high-crystallinity carbon is high-temperature calcined carbon such as amorphous, platy, flaky, spherical or fibrous natural graphite or artificial graphite, kish graphite, pyrolytic carbon, mesophase pitch-based carbon fiber, mesocarbon microbeads, mesophase pitches, petroleum or coal tar pitch-derived coke, the like, or combinations thereof.

Metal Carbon Composite Materials

Alternatively, according to aspects of the disclosure, the anode electrode 104 may comprise an anode material with a metal carbon composite, such as a silver-carbon blend or composite, where silver particles are complexed between amorphous and/or crystalline carbon particles. Here silver is used as an example, and other metals may be used, including for example, tin and/or zinc. Silicon can be used in place of the silver.

Further Materials for Anode Active Material

In addition to the materials mentioned, the anode active material may also include titanium-based compounds such as lithium titanate (Li4Ti5O12) or titanium dioxide (TiO2), which can offer excellent cycling stability and high-rate capability. Other potential materials may include transition metal oxides like molybdenum oxides (MoOx), iron oxides (FeOx), or nickel oxides (NiOx), which can provide high theoretical capacities. In some cases, composite materials combining different active materials, such as silicon-graphite composites or tin-carbon composites, may be used to leverage the advantages of multiple materials while mitigating their individual limitations.

Dendrite Formation

When the anode electrode 104 is made of or includes lithium or a lithium alloy, dendrites may form on the anode electrode 104. The dendrites are a metallic lithium structure formed when extra lithium ions accumulate on a surface of the anode electrode 104. The formed dendrites may damage the solid electrolyte layer 106, reduce battery capacity of the solid state battery 100, and/or otherwise lead to undesired performance of the solid state battery 100. Dendrite formation is a significant challenge in lithium-based batteries, as these structures can grow through the electrolyte, potentially causing short circuits and safety hazards. The growth rate and morphology of dendrites may be influenced by factors such as current density, temperature, and the nature of the electrolyte-electrode interface.

Advantages of Solid Electrolytes in Mitigating Dendrite Formation

Solid electrolytes offer several advantages over liquid electrolytes when it comes to mitigating dendrite formation. The mechanical strength of solid electrolytes may help suppress dendrite growth by providing a physical barrier to lithium metal penetration. Additionally, the uniform ion distribution in solid electrolytes may promote more even lithium deposition, reducing the likelihood of localized dendrite nucleation. Some solid electrolytes may also form a stable interface with the lithium metal anode, further inhibiting dendrite formation. However, while solid electrolytes can significantly reduce the risk of dendrite growth, they may not completely eliminate it, and ongoing research aims to develop advanced solid electrolyte materials with enhanced dendrite suppression capabilities.

Shape of Anode Active Material

The anode active material can be particle shaped or it may be a continuous, unitary form (e.g., a thin film or sheet).

Particle Size

In embodiments where the anode active material is particle shaped, the anode active material can comprise a particle size of any number in a range from at or about 10 nm to at or about 1000 µm, such as at or about 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1000 nm, 2 µm, 3 µm, 4 µm, 5 µm, 6 µm, 7 µm, 8 µm, 9 µm, 10 µm, 15 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 510 µm, 520 µm, 530 µm, 540 µm, 550 µm, 560 µm, 570 µm, 580 µm, 590 µm, 600 µm, 610 µm, 620 µm, 630 µm, 640 µm, 650 µm, 660 µm, 670 µm, 680 µm, 690 µm, 700 µm, 710 µm, 720 µm, 730 µm, 740 µm, 750 µm, 760 µm, 770 µm, 780 µm, 790 µm, 800 µm, 810 µm, 820 µm, 830 µm, 840 µm, 850 µm, 860 µm, 870 µm, 880 µm, 890 µm, 900 µm, 910 µm, 920 µm, 930 µm, 940 µm, 950 µm, 960 µm, 970 µm, 980 µm, 990 µm, or 1,000 µm. In embodiments, particle size of the anode active material may be within a range formed by selecting any two numbers listed above or by selecting any two numbers in the range of from at or about 10 nm to at or about 1000 µm, e.g., between about 10 nm and about 1,000 µm.

Amount of Anode Active Material in Anode Electrode

The amount of the anode active material in the solid state battery 100 affects the charge and discharge capacity of the solid state battery 100. In order to manufacture a high-capacity anode electrode 104, a high level of anode active material can be included in the anode electrode 104. For example, the anode electrode 104 includes at, about, or greater than 70, 80, 90, 95, 98, 99, or 100 wt % of anode active material based on the total weight of the anode electrode 104. In embodiments, anode active material in the anode electrode 104 may be within a range formed by selecting any two numbers listed in the immediately previous sentence, e.g., between about 70 wt % and about 100 wt %.

Materials for Binder in Anode Electrode

The binder can comprise various types of binder polymers, such as, for example, polyvinylidene fluoride-co-hexafluoropropylene (PVdF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate, ethylene-propylene-diene monomer (EPDM), sulfonated EPDM, styrene butadiene rubber (SBR), fluororubber, polyacrylic acid, polymers thereof whose hydrogen atoms are substituted with Li, Na or Ca, various copolymers thereof, the like, or combinations thereof.

Examples of Materials for Binder in Anode Electrode

In addition to the binders mentioned, other suitable binders for use in the anode electrode may include polyimide, polyamide-imide, polyurethane, polyethylene oxide (PEO), poly(ethylene-co-vinyl acetate) (PEVA), poly(vinyl acetate) (PVA), alginate, chitosan, guar gum, xanthan gum, carrageenan, pectin, gelatin, lignin, and various water-soluble polymers or their derivatives. In some cases, conductive polymers such as polypyrrole, polyaniline, or poly(3,4-ethylenedioxythiophene) (PEDOT) may also be used as binders to simultaneously improve adhesion and electrical conductivity within the anode electrode.

Amount of Binder in Anode Electrode

The anode electrode 104 may include at or about 0, 1, 2, 3, 4, 5, 6, 7, 8, 9, 10, 11, 12, 13, 14, 15, 17, 18, 19, 20, 21, 22, 23, 24, 25, 26, 27, 28, 29, or 30 wt %, or any other wt % in the range between 0 and 30 wt % of binder based on the total weight of the anode electrode 104. In embodiments, binder in the anode electrode 104 may be within a range formed by selecting any two numbers listed above or by selecting any two numbers in the range between 0 and 30 wt %, e.g., between about 0 wt % and about 30 wt %.

Thickness of Anode Electrode

The anode electrode 104 can have a thickness of at or about 10, 15, 20, 25, 30, 35, 40, 45, 50, 55, 60, 65, 70, 75, 80, 85, 90, 95, or 100 μm. In embodiments, the thickness, $t_4$, of the anode electrode 104 may be within a range formed by selecting any two numbers listed above or by selecting any two numbers in the range of from 10 μm to about 100 μm, e.g., between about m and about 100 μm or about 10 μm and about 20 μm.

Porosity of Anode Electrode

A porosity of the anode electrode 104 can be about 0, 1, 2, 3, 4, 5, 6, 7, 8, 9, 10, 11, 12, 13, 14, 15, 16, 17, or 18 vol %, or any other vol % in the range from 0 to 18 vol %, based on the total volume of the anode electrode 104. In embodiments, the porosity of the anode electrode 104 may be within a range formed by selecting any two numbers listed above or by selecting any two numbers in the range from between 0 vol % to about 18 vol %.

Lithium Ion Diffusivity of Anode Electrode.

The anode electrode 104 may include a lithium ion diffusivity of at or about $1\times10^{-14}$ cm$^2$/s, $1\times10^{-13}$ cm$^2$/s, $1\times10^{-12}$ cm$^2$/s, $1\times10^{-11}$ cm$^2$/s, $1\times10^{-11}$ cm$^2$/s, $1\times10^{-9}$ cm$^2$/s, $1\times10^{-8}$ cm$^2$/s, or $1\times10^{-7}$ cm$^2$/s. In embodiments, the lithium ion diffusivity of the anode electrode 104 may be within a range formed by selecting any two numbers listed above or by selecting any two numbers in the range from at or about $1\times10^{-14}$ cm$^2$/s to at or about $1\times10^{-7}$ cm$^2$/s.

Current Collector at Anode Electrode

The current collector 110 collects electrical energy generated at the anode electrode 104 and supports the anode electrode 104.

Materials for Current Collector at Anode Electrode

The material of the current collector 110 is not particularly limited as long as it allows adhesion of the anode electrode 104, has a suitable electrical conductivity, and does not cause significant chemical changes in the corresponding solid state battery 100 in the voltage range of the solid state battery 100. For example, the current collector 110 is made of or includes a metal or a conductive carbon, although not limited thereto.

Metal for Current Collector

The metal of the current collector 110 may include one or more selected from the group consisting aluminum, an aluminum alloy, copper, a copper alloy, nickel, a nickel alloy, titanium, a titanium alloy, iron, an iron alloy (e.g., steel, stainless steel), silver, a silver alloy, or a combination thereof, although not limited thereto.

Shape of Current Collector at Anode Electrode

It is possible to increase the adhesion of the anode electrode 104 to the current collector 110 by forming fine surface irregularities on the surface of the current collector 110. The current collector 110 may have various shapes, such as, for example, a film, a sheet, a foil, a net, a porous body, a foam, a non-woven web body, the like, or combinations thereof. In addition to the shapes mentioned, the current collector 110 may also be configured as a honeycomb structure, a perforated sheet, a woven or non-woven mesh, a sintered porous body, or a three-dimensional interconnected network. These various shapes can be tailored to optimize the surface area, mechanical strength, and current collection efficiency of the current collector 110.

Design of Current Collector at Anode Electrode

Furthermore, the current collector 110 may be designed to accommodate different form factors of solid state batteries, such as pouch cells, cylindrical cells, or prismatic cells, each may offer advantages in terms of packaging efficiency, thermal management, and overall battery performance.

Thickness of Current Collector at Anode Electrode

A thickness, $t_5$, of the current collector 110 can be at or about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 μm. In embodiments, the thickness, $t_5$, of the current collector 110 may be within a range formed by selecting any two numbers listed above or by selecting any two numbers in the range of from at or about 1 μm to at or about 500 μm, e.g., between about 5 μm and about 500 μm.

Manufacturing Methods for Anode Electrode

The anode electrode 104 may be obtained by various methods, such as, for example, atomic deposition, extrusion, rolling, a slurry method, or a combination thereof. In addition to the methods mentioned, the anode electrode 104 may be manufactured using various other techniques, including dry electrode processes. These alternative methods may offer advantages in terms of environmental impact, cost-effectiveness, and scalability.

Dry Powder Coating

Dry powder coating may be employed as an alternative to the slurry method. In this process, the anode active material, conductive additives, and binder are mixed in a dry state and then directly applied to the current collector 110 using electrostatic deposition or mechanical compression. This method may reduce the use of solvents, potentially reducing environmental impact and processing time.

3D Printing

Additive manufacturing techniques, such as 3D printing, may be used to fabricate the anode electrode 104. Various 3D printing methods, including fused deposition modeling (FDM), selective laser sintering (SLS), or direct ink writing (DIW), can be utilized depending on the specific materials and desired electrode properties. This approach allows for precise control over the electrode structure and porosity.

Electrospinning

Electrospinning is another potential method for manufacturing the anode electrode 104. In this process, a solution containing the anode active material, conductive additives, and a polymer binder is extruded through a nozzle under an electric field, resulting in the formation of nanofibers. These fibers can be collected directly on the current collector 110 to form a highly porous electrode structure with increased surface area.

Tape Casting

Tape casting may be employed to prepare the anode electrode 104. This technique involves spreading a slurry of electrode materials onto a moving carrier film using a doctor blade, followed by drying and calendaring. The resulting electrode tape can then be laminated onto the current collector 110.

Spray Coating

Spray coating techniques may be used to fabricate the anode electrode 104. A fine mist of the electrode slurry is sprayed onto the current collector 110 using compressed air or ultrasonic atomization. This approach may allow for the creation of thin, uniform electrode layers and can be particularly useful for large-scale production.

Freeze-Casting

Freeze-casting is another potential method for manufacturing the anode electrode 104. This process involves freezing a slurry of electrode materials, followed by sublimation of the ice to create a porous structure. The resulting porous electrode can then be sintered and attached to the current collector 110.

Sol-Gel Process

In some cases, a sol-gel process may be used to prepare the anode electrode 104. This method involves the formation of a colloidal suspension (sol) that is then converted into a gel-like network containing the anode active material and other components. The gel can be applied to the current collector 110 and subsequently heat-treated to form the final electrode structure.

Vapor Deposition

For certain applications, physical vapor deposition (PVD) or chemical vapor deposition (CVD) techniques may be employed to create thin film anodes directly on the current collector 110. These methods can produce highly uniform and dense electrode layers, which may be particularly beneficial for certain types of solid-state batteries.

Alloying and Ball Milling

Mechanical alloying and high-energy ball milling may be used to prepare composite anode materials, which can then be pressed into electrodes or applied to the current collector 110 using one of the aforementioned methods. This technique can be particularly useful for creating nanostructured or amorphous anode materials with enhanced electrochemical properties.

Slurry Method

For example, the anode active material can be mixed and agitated with a solvent, and optionally a binder, and a dispersing agent to form slurry. Then, the slurry can be applied (e.g., coated) onto the current collector 110, followed by pressing and drying, to obtain the anode electrode 104.

Application Methods for Slurry for Anode Electrode

The application of the slurry for the anode electrode 104 may include using a technique selected from the group consisting of slot die coating, gravure coating, spin coating, spray coating, roll coating, curtain coating, extrusion, casting, screen printing, inkjet printing, spray printing, gravure printing, heat transfer printing, a Toppan printing method, intaglio printing, offset printing, the like, and combinations thereof. In addition to the aforementioned techniques, other methods for applying the anode slurry to the current collector may include doctor blade coating, dip coating, and meniscus coating.

Double Slot Die Layer Coating

Double slot die layer coating may also be employed, which allows for the simultaneous application of two distinct layers of electrode materials onto the current collector in a single pass. This method can potentially enable the creation of gradient structures within the electrode, optimizing both electrochemical performance and mechanical properties.

Solvent for Slurry for Anode Electrode

The solvent for forming the anode electrode 104 may include water and/or an organic solvents, such as, for example, N-methyl pyrrolidone (NMP), dimethyl formamide (DMF), acetone, dimethyl acetamide, dimethyl sulfoxide (DMSO), isopropyl alcohol, the like, or combinations thereof. The solvent may be used in an amount sufficient to dissolve and disperse the electrode ingredients, such as the anode active material and binder, considering the slurry coating thickness, production yield, the like, or combinations thereof. Additional organic solvents that may be used include ethanol, methanol, propanol, butanol, ethyl acetate, methyl ethyl ketone, tetrahydrofuran, diethyl ether, and toluene.

Solvent-Free Methods

In some embodiments, the anode electrode 104 may be prepared using a solvent-free method, such as dry powder processing or melt extrusion, which eliminates the need for liquid solvents and may offer environmental and cost benefits.

Dispersing Agent for Slurry for Anode Electrode

The dispersing agent forming the anode electrode 104 may include an aqueous dispersing agent and/or an organic dispersing agent, such as, for example, N-methyl-2-pyrrolidone. Other examples of aqueous dispersing agents may include sodium dodecyl sulfate (SDS), polyvinylpyrrolidone (PVP), and carboxymethyl cellulose (CMC), while additional organic dispersing agents may include Triton X-100, polyethylene glycol (PEG), and various surfactants such as polysorbates or poloxamers.

Methods without a Dispersing Agent

In some embodiments, the anode electrode 104 may be prepared using methods that do not require a dispersing agent, such as dry powder processing or certain additive manufacturing techniques.

Drying Technique for Slurry for Anode Electrode

The slurry for the anode electrode 104 may be dried by irradiating heat, electron beams (E-beams), gamma rays, or UV (G, H, I-line), the like, or combinations thereof, to vaporize the solvent. For example, the slurry may be vacuum dried at room temperature. Although the solvent is removed through evaporation by the drying step, the other ingredients do not evaporate and remain as they are to form the anode electrode 104.

Other Drying Techniques

In addition to the drying techniques mentioned, several other methods may be employed to dry the anode electrode slurry. These additional techniques can offer various advantages depending on the specific materials, production requirements, and desired electrode properties.

Infrared (IR) Drying

Infrared (IR) drying may be used to rapidly heat the electrode surface, promoting efficient solvent evaporation. This method can be particularly effective for thin electrode coatings and may allow for precise control of the drying process.

Microwave Drying

Microwave drying is another option that can provide volumetric heating of the electrode material, potentially leading to more uniform drying throughout the electrode thickness. In some cases, a combination of convection and microwave drying may be employed to optimize both drying speed and uniformity.

Freeze-Drying

Freeze-drying, also known as lyophilization, may be utilized for certain electrode formulations. This process involves freezing the slurry and then sublimating the solvent under vacuum conditions. Freeze-drying can help maintain the porous structure of the electrode, which may be beneficial for electrolyte penetration and ion transport.

Supercritical CO2 Drying

Supercritical $CO_2$ drying is an advanced technique that may be employed for specialized electrode materials. This method involves replacing the solvent with liquid $CO_2$, which is then brought to its supercritical state and vented. This approach can help preserve delicate nanostructures within the electrode and may be particularly useful for aerogel-based electrodes.

Two-Step Drying

In some cases, a two-step drying process may be employed. For example, initial drying may be performed at a lower temperature to remove bulk solvent, followed by a higher temperature step to remove residual solvent and potentially initiate any desired chemical reactions within the electrode material.

Ultrasonic Drying

Ultrasonic drying may also be considered for certain electrode formulations. This technique uses high-frequency sound waves to agitate the solvent molecules, potentially accelerating the drying process and improving solvent removal from porous structures within the electrode.

Solid Electrolyte Layer Generally

The solid electrolyte layer 106 is suitable for lithium ion diffusion between the cathode electrode 102 and the anode electrode 104. The solid electrolyte layer 106 provides an electrically conductive pathway for the movement of charge carriers between the cathode electrode 102 and the anode electrode 104. The solid electrolyte layer 106 is in electrical communication with the cathode electrode 102 and the anode electrode 104.

Solid Electrolyte Positioning

In embodiments, the solid electrolyte layer 106 is formed over and in direct contact with the cathode electrode 102 or the anode electrode 104. In embodiments, the solid electrolyte layer 106 is in direct contact with the cathode electrode 102 and the anode electrode 104. In other embodiments, another functional layer may be interposed between the solid electrolyte layer 106 and the cathode electrode 102 and/or the anode electrode 104.

Materials for Solid Electrolyte Layer

The solid electrolyte layer 106 may be capable of transport of lithium ions. The material of the solid electrolyte layer 106 is not particularly limited as long as it allows adhesion with adjacent layers, has a suitable electrical conductivity, and does not cause significant chemical changes in the corresponding solid state battery 100 in the voltage range of the solid state battery 100. For example, the solid electrolyte layer 106 may include various inorganic solid electrolytes, polymer solid electrolytes, and/or polymer gel electrolytes, although not limited thereto. Additionally or alternatively, the solid electrolyte layer 106 may include ceramic electrolytes, glass electrolytes, hybrid organic-inorganic electrolytes, and nanostructured electrolytes, although not limited to these categories.

Inorganic Solid Electrolyte

The inorganic solid electrolyte may include a crystalline solid electrolyte, a non-crystalline solid electrolyte, a glass ceramic solid electrolyte, the like, or a combination thereof, although not limited thereto. The inorganic solid electrolyte may be sulfide-based, oxide-based, the like, or a combination thereof. In addition to sulfide-based and oxide-based inorganic solid electrolytes, other types of inorganic solid electrolytes may include halide-based electrolytes, nitride-based electrolytes, and borate-based electrolytes. For example, lithium-rich anti-perovskites (LiRAP) such as Li3OCl and Li3OBr, lithium nitride (Li3N), and lithium borohydride (LiBH4) have been investigated as potential solid electrolyte materials for lithium-ion batteries.

Sulfide Based Solid Electrolyte

The sulfide-based solid electrolyte includes sulfur (S) and has ionic conductivity of metal belonging to Group I or Group II of the periodic table, and may include Li—P—S-based glass or Li—P—S-based glass ceramics.

Examples of Sulfide-Based Solid Electrolyte

For example, the sulfide-based solid electrolyte may include lithium sulfide, silicon sulfide, germanium sulfide and boron sulfide. Particular examples of the inorganic solid electrolyte may include $Li_{3.833}Sn_{0.833}As_{0.166}S_4$, $Li_4SnS_4$, $Li_{3.25}Ge_{0.25}P_{0.75}S_4$, $Li_2S\ P_2So$, $B_2S_3$—$Li_2S$, $XLi_2S$-(100-x) $P_2S_5$ (x=70-80), $Li_2S$—$SiS_2$—$Li_3N$, $Li_2S$—$P_2S_5$—$LiI$, $Li_2S$—$SiS_2$—$LiI$, $Li_2S$—$B_2S_3$—$LiI$, $Li_3N$, LISICON, UPON ($Li_{3+y}PO_{4-x}N_x$), thio-LISICON ($Li_{3.25}Ge_{0.25}P_{0.75}S_4$), $Li_2O$—$Al_2O_3$—$TiO_2$—$P_2O_5$(LATP), $Li_2S$—$P_2S_5$, $Li_2S$—$LiI$—$P_2S_5$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$, $Li_2S\ GeS_2$—$ZnS$, Li10GeP2S12 (LGPS), Li7P3S11, Li6PS5Cl, Li6PS5Br, Li6PS5I, Li9.54Si1.74P1.44S11.7C10.3, Li11Si2PS12, the like, or combinations thereof.

Doped Variants

In some cases, doped variants of these materials, such as Al-doped Li10GeP2S12 or Sb-doped Li6PS5Cl, may also be employed to further enhance ionic conductivity or stability.

Oxide Based Solid Electrolyte

The oxide-based solid electrolyte material contains oxygen (O) and has ionic conductivity of metal belonging to Group I or II of the periodic table.

Examples of Oxide-Based Solid Electrolyte Material

The oxide-based solid electrolyte material may include at least one selected from the group consisting of LLTO-based compounds, $Li_6La_2CaTa_2O_{12}$, $Li_6La_2ANb_2O_{12}$ (A is Ca or Sr), $Li_2Nd_3TeSbO_{12}$, $Li_3BO_{2.5}N_{0.5}$, $Li_9SiA_1O_8$, LAGP-based compounds, LATP-based compounds, $Li_{1+x}Ti_{2-x}Al_xSi_y(PO_4)_{3-y}$ (0≤x≤1, 0≤y≤1), $LiAl_xZr_{2-x}(PO_4)_3$ (0≤x≤1, 0≤y≤1), $LiTi_xZr_{2-x}(PO_4)_3$ (0<x≤1, 0≤y≤1), LISICON-based compounds, LIPON-based compounds, perovskite-based compounds, NASICON-based compounds and LLZO-based or derived compounds (such as Al-doped Li7La3Zr2O12 and Ta-doped Li7La3Zr2O12). Lithium-rich anti-perovskites like Li3OCl and Li3OBr have also been investigated as potential oxide-based solid electrolytes.

Composite Oxide Electrolyte

In some cases, composite oxide electrolytes combining multiple oxide materials, such as LLZO-LATP composites, may be employed to leverage the advantages of different oxide systems.

Polymer Solid Electrolyte

The polymer solid electrolyte is a composite of electrolyte salt with polymer resin and has lithium ion conductivity. The polymer solid electrolyte may include a polyether polymer, a polycarbonate polymer, an acrylate polymer, a polysiloxane polymer, a phosphazene polymer, a polyethylene derivative, an alkylene oxide derivative, a phosphate polymer, a polyagitation lysine, a polyester sulfide, a polyvinyl alcohol, a polyvinylidene fluoride, a polymer containing an ionically dissociable group, poly(ethylene imine) (PEI), poly(methyl methacrylate) (PMMA), poly(acrylonitrile) (PAN), poly(ethylene succinate) (PES), biopolymers such as chitosan and cellulose derivatives, the like, or combinations thereof.

Polymer Resin for the Solid Polymer Electrolyte

The solid polymer electrolyte may include a polymer resin, such as a branched copolymer including polyethylene oxide (PEO) backbone copolymerized with a comonomer including an amorphous polymer, such as, for example, PMMA, polycarbonate, polydiloxane (pdms) and/or phosphazene, comb-like polymer, crosslinked polymer resin, polyethylene glycol (PEG), polypropylene oxide (PPO), polyacrylonitrile (PAN), poly(methyl methacrylate) (PMMA), poly(vinylidene fluoride-co-hexafluoropropylene) (PVDF-HFP), poly(ethylene oxide-co-propylene oxide) (PEO-PPO), poly(ethylene imine) (PEI), poly(vinyl pyrrolidone) (PVP), poly(vinyl alcohol) (PVA), various block copolymers or graft copolymers incorporating these materials, the like, or combinations thereof.

Polymer Gel Electrolyte

The polymer gel electrolyte can be formed by incorporating an organic electrolyte containing an organic solvent and an electrolyte salt, an ionic liquid, monomer, or oligomer to a polymer resin, the like, or combinations thereof. The polymer resin for the polymer gel can include polyether polymers, PVC polymers, PMMA polymers, polyacrylonitrile (PAN), polyvinylidene fluoride (PVDF), poly(vinylidene fluoride-co-hexafluoropropylene: PVDF-co-HFP), the like, or combinations thereof.

Examples of Polymer Gel Electrolyte

Examples of polymer gel electrolytes that may be suitable for solid state batteries include poly(ethylene oxide) (PEO), poly(methyl methacrylate-co-ethyl acrylate) (PMMA-EA), poly(acrylonitrile-co-methyl methacrylate) (PAN-MMA), poly(vinyl acetate) (PVAc), poly(ethylene glycol diacrylate) (PEGDA), poly(vinyl pyrrolidone) (PVP), poly(ethylene glycol methyl ether acrylate) (PEGMEA), poly(ethylene glycol methyl ether methacrylate) (PEGMEMA), poly(ionic liquid) (PIL), poly(ethylene glycol-co-propylene glycol) (PEG-PPG), poly(vinyl alcohol-co-ethylene) (PVA-PE), poly(acrylamide) (PAM), poly(2-hydroxyethyl methacrylate) (PHEMA), poly(ethylene glycol-co-polyethylene oxide) (PEG-PEO), and poly(methacrylic acid) (PMAA) based gel electrolytes to optimize the electrochemical and physical properties of the solid electrolyte.

Electrolyte Salt

The electrolyte salt is an ionizable lithium salt and may be represented by $Li^+X^-$. $X^-$ may include an anion selected from the group consisting of $F^-$, $Cl^-$, $Br$, $NO_3^-$, $N(CN)_2^-$, $BF_4^-$, $ClO_4^-$, $AlC_4^-$, $AlCl_4^-$, $PF_6^-$, $SbF_6^-$, $AsF_6^-$, $BF_2C_2O_4^-$, $BC_4O_8$—, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3$—, $C_4F_9SO_3^-$, $CF_3CF_2SO_3$—, $(CF_3SO_2)_2N^-$, $(F_2SO_2)_2N^-$, $CF_3CF_2(CF_3)_2CO^-$, $(CF_3SO_2)_2CH$, $CF_3(CF_2)_7SO_3^-$, $CF_3CO_2$—, $CH_3CO_2$—, $SCN^-$, $(CF_3CF_2SO_2)_2N^-$, and the like.

Examples of Lithium Salt

For example, the lithium salt may be any one selected from the group consisting of LiTFSI, LiCl, LiBr, LiI, LiClO₄, lithium tetrafluoroborate (LiBF₄), LiB₁₀Cl₁₀, lithium hexafluorophosphate (LiPF₆), LiAsF₆, LiSbF₆, LiAlCl₄, LiSCN, LiCF₃CO₂, LiCH₃SO₃, LiCF₃SO₃, LiN(SO₂CF₃)₂, LiN(SO₂C₂F₅)₂, LiC₄F₉SO₃, LiC(CF₃SO₂)₃, (CF₃SO₂)₂NLi, lithium chloroborate, lithium lower aliphatic carboxylate, lithium imide 4-phenylborate, lithium bis(oxalato)borate (LiBOB), lithium difluoro(oxalato)borate (LiDFOB), lithium bis(fluorosulfonyl)imide (LiFSI), lithium 4,5-dicyano-2-(trifluoromethyl)imidazolide (LiTDI), lithium bis(trifluoromethanesulfonyl)imide (LiTFSI), and lithium bis(fluorosulfonyl)imide (LiFSI), the like, and combinations thereof. The electrolyte salt can include any combination of the salts described herein.

Amount of Electrolyte Salt

The solid electrolyte layer 106 can include at or about 0, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, or 400 parts, all based on the total weight of the solid electrolyte layer 106. In embodiments, electrolyte salt in the solid electrolyte layer 106 may be within a range formed by selecting any two numbers listed above or by selecting any two numbers between about 0 parts and about 400 parts, or about 60 parts and 400 parts, based on the total weight of the solid electrolyte layer 106.

Ion Conductivity of Solid Electrolyte Layer

The solid electrolyte layer 106 may have a suitable reduction stability and/or ion conductivity. Since the solid electrolyte layer 106 mainly functions to transport lithium ions between electrodes, the solid electrolyte layer 106 can include a desirable ion conductivity of at, about, or greater than, for example, $10^{-7}$ S/cm, $10^{-6}$ S/cm, $10^{-1}$ S/cm, or $10^{-4}$ S/cm. Thickness of Solid Electrolyte Layer A thickness, $t_6$, of the solid electrolyte layer 106 can be at or about 1, 2, 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1,000 µm. In embodiments, the thickness, $t_6$, of the solid electrolyte layer 106 may be within a range formed by selecting any two numbers listed above or by selecting any two numbers in the range of between 0 and at or about 1,000 µm, e.g., between about 5 µm and about 1,000 µm, about 30 µm and about 100 µm, or about 30 µm and about 50 µm.

Unfinished Product

The cell 101 as shown in FIG. 1 can be provided as an unfinished product. In embodiments, the cell 101 is stored, transported, and/or delivered to a reseller, customer, or the like that finishes manufacture of a battery assembly or product comprising the cell 101. In other embodiments, the cell 101 is a finished battery assembly or product.

Sealing Battery

An enclosure 112 of the solid state battery can be sealed to finish making the solid state battery 100 such that it will work as a battery. The sealing process may involve various techniques to ensure the internal components are protected from external environmental factors and to maintain the integrity of the battery structure. For example, the enclosure 112 may be hermetically sealed using methods such as laser welding, ultrasonic welding, or adhesive bonding. In some cases, the sealing process may also include the introduction of a protective atmosphere or the removal of air to create a vacuum within the enclosure. This sealing step may be helpful for preventing moisture ingress, which could potentially degrade the performance of the sulfide-based solid electrolyte. Additionally, the sealing process may incorporate safety features such as pressure relief mechanisms to manage any potential gas build-up during battery operation.

After Sealing Battery

Once properly sealed, the solid state battery 100 is ready for final quality control checks, which may include electrical testing, leak detection, and visual inspections. After passing these checks, the solid state battery 100 could be packaged and sold as a finished product, ready for integration into various electronic devices, electric vehicles, energy storage systems, and so forth.

Battery Configuration

The solid state battery 100 is provided in various configurations to suit different applications and device requirements. In some aspects, the battery may be manufactured in a cylindrical form, which can be advantageous for certain types of portable electronics or automotive applications. Alternatively, the solid state battery 100 may be produced in a prismatic form, which can allow for more efficient space utilization in devices with rectangular form factors. In other cases, a pouch form may be employed, offering flexibility in shape and potentially reducing overall battery weight. The pouch form may further be especially suitable for solid state batteries due to easier application and control of uniform pressures within the battery.

Choice of Configuration

The choice of configuration may depend on factors such as the intended use, space constraints, thermal management requirements, and manufacturing considerations. In some embodiments, hybrid or custom configurations combining elements of different forms may be utilized as desired. The versatility in battery form factors can enable the integration of solid state batteries into a wide range of products, from small wearable devices to large-scale energy storage systems.

Voltage

The solid state battery 100 is configured to output a voltage of at or about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 48, 50, 55, 60, 65, 70, 75, 80, 85, 90, 95, 96, 100, 110, 120, 130, 140, 150, 160, 170, 180, 190, 200, 210, 220, 230, 240, 250, 260, 270, 280, 290, 300, 310, 320, 330, 340, 350, 360, 370. 380, 390, 400, 410, 420, 430, 440, 450, 460, 470, 480, 490, or 500 V. In embodiments, the output voltage of the solid state battery 100 may be within a range formed by selecting any two numbers listed above or by selecting any two numbers in the range of between 0 and at or about 500 V, e.g., between about 1 V DC and about 500 V DC.

Capacity

The solid state battery 100 may be configured to have a capacity of at, about, or greater than 100, 110, 120, 130, 140, 150, 160, 170, 180, 190, 200, 210, 220, 230, 240, 250, 260, 270, 280, 290, or 300 mAh/g. In embodiments, the output voltage of the solid state battery 100 may have a capacity formed by selecting any two numbers listed above or by selecting any two numbers in the range of between 0 and 300 mAh/g or between 0 and about 300 mAh/g, e.g., between about 100 mAh/g and about 300 mAh/g.

Volume Expansion Calculation

The solid state battery 100 may be configured to have a desirable volume expansion rate. The volume expansion rate may be calculated from a change in thickness after the first cycle of charging and discharging compared to the initial thickness. The volume expansion rate may be a ratio of the thickness change to the initial thickness. A first cycle of charging and discharging is performed by CC-CV charging a battery at 0.1 C and cutting off at 4.25 to 4.4 V and 0.02 C, and CC discharging the battery at 0.1 C and cutting off at 3 V. The volume expansion rate is calculated by Equation 1 below in which A may represent a thickness before charging and discharging and B may represent a thickness after charging and discharging. The thickness may be measured using a Mauser micrometer or a scanning electron microscope (SEM).

$$\text{Volume expansion rate} = [(B - A)/A] \times 100 \quad \text{Equation 1}$$

C-Rate

C-rate as used herein refers to the rate at which the battery is discharged relative to its maximum capacity. For example, a 1C rate means the discharge current will discharge the entire battery within one hour. That is, for a battery with a capacity of 20 Amp-hrs, a discharge current at a 1C would be 20 Amps.

Other Examples for Volumetric Expansion

Other ways to measure and calculate the volume expansion rate for a solid state battery may include using volumetric expansion measurement (e.g., gas pycnometry), in-situ dilatometry, X-ray tomography, strain gauge measurements, optical methods (e.g., digital image correlation or laser interferometry), pressure-based methods, and electrochemical strain microscopy.

EXAMPLES

Examples will be described more fully hereinafter so that the present disclosure can be understood with ease. However, the following examples are for illustrative purposes only and the scope of the present disclosure is not limited thereto.

Example 1: Solid Electrolyte Material

Example 1.1: LPSCZ

A powder form of LPSCl is obtained. The particle size is between about 0.1 μm and about 50 μm.

Example 1.2: LPSBr

A powder form of LPSBr is obtained. The particle size is between about 0.1 μm and about 50 μm.

Example 1.3: LPSI

A powder form of LPSI is obtained. The particle size is between about 0.1 μm and about 50 μm.

Example 2: Additive Materials

Example 2.1: Additive Material Represented by Chemical Formula 2

A powder form of an additive material represented by Chemical Formula 2 is obtained:

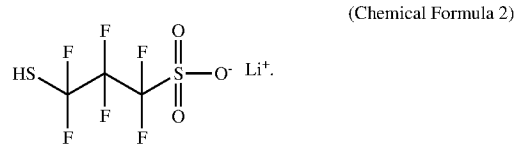

(Chemical Formula 2)

Example 2.2: Additive Material Represented by Chemical Formula 5

A powder form of an additive material represented by Chemical Formula 5 is obtained:

Example 2.3: Additive Material Represented by Chemical Formula 8

A powder form of an additive material represented by Chemical Formula 8 is obtained:

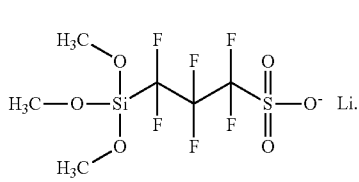

(Chemical Formula 5)

A powder form of an additive material represented by Chemical Formula 8 is obtained:

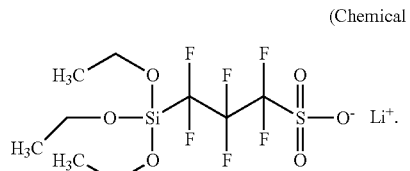

(Chemical Formula 8)

Example 2.4: Additive Material Represented by Chemical Formula 11

A powder form of an additive material represented by Chemical Formula 11 is obtained:

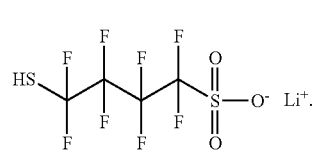

(Chemical Formula 11)

Example 2.5: Additive Material Represented by Chemical Formula 14

A powder form of an additive material represented by Chemical Formula 14 is obtained:

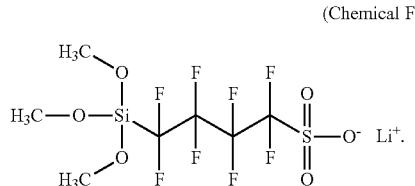

(Chemical Formula 14)

Example 2.6: Additive Material Represented by Chemical Formula 17

A powder form of an additive material represented by Chemical Formula 17 is obtained:

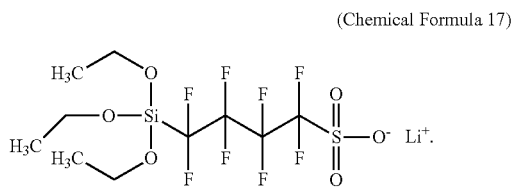

(Chemical Formula 17)

Example 2.7: Additive Material Represented by Chemical Formula 20

A powder form of an additive material represented by Chemical Formula 20 is obtained:

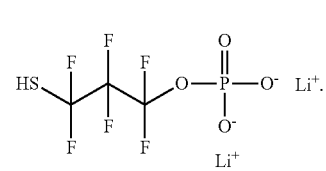

(Chemical Formula 20)

Example 2.8: Additive Material Represented by Chemical Formula 23

A powder form of an additive material represented by Chemical Formula 23 is obtained:

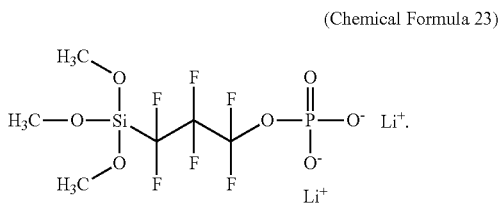

(Chemical Formula 23)

Example 2.9: Additive Material Represented by Chemical Formula 26

A powder form of an additive material represented by Chemical Formula 26 is obtained:

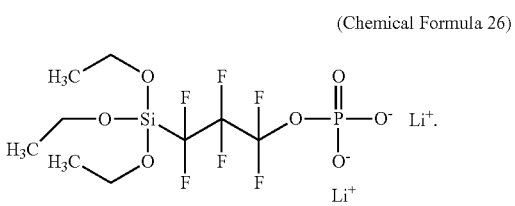

(Chemical Formula 26)

Example 2.10: Additive Material Represented by Chemical Formula 29

A powder form of an additive material represented by Chemical Formula 29 is obtained:

(Chemical Formula 29)

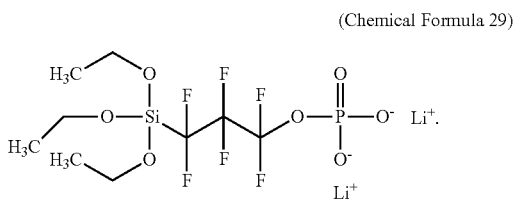

Example 2.11: Additive Material Represented by Chemical Formula 32

A powder form of an additive material represented by Chemical Formula 32 is obtained:

(Chemical Formula 32)

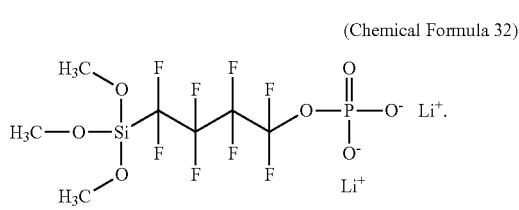

Example 2.12: Additive Material Represented by Chemical Formula 35

A powder form of an additive material represented by Chemical Formula 35 is obtained:

(Chemical Formula 35)

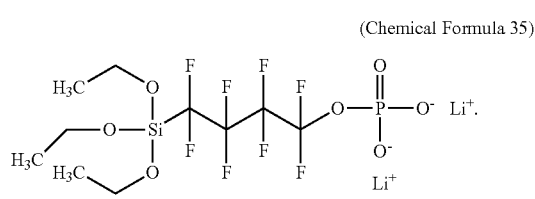

Example 3: Forming Mixture for Solid Electrolyte

Example 3.1.1

A mixture is obtained by mixing the LPSCl from Example 1.1 and the additive material from Example 2.1 in a weight ratio of 1:1. A solid electrode material is prepared by ball-milling the mixture.

Example 3.1.2

A mixture is obtained by mixing the LPSCl from Example 1.1 and the additive material from Example 2.2 in a weight ratio of 1:1. A solid electrode material is prepared by ball-milling the mixture.

Example 3.1.3

A mixture is obtained by mixing the LPSCl from Example 1.1 and the additive material from Example 2.3 in a weight ratio of 1:1. A solid electrode material is prepared by ball-milling the mixture.

Example 3.1.4

A mixture is obtained by mixing the LPSCl from Example 1.1 and the additive material from Example 2.4 in a weight ratio of 1:1. A solid electrode material is prepared by ball-milling the mixture.

Example 3.1.5

A mixture is obtained by mixing the LPSCl from Example 1.1 and the additive material from Example 2.5 in a weight ratio of 1:1. A solid electrode material is prepared by ball-milling the mixture.

Example 3.1.6

A mixture is obtained by mixing the LPSCl from Example 1.1 and the additive material from Example 2.6 in a weight ratio of 1:1. A solid electrode material is prepared by ball-milling the mixture.

Example 3.1.7

A mixture is obtained by mixing the LPSCl from Example 1.1 and the additive material from Example 2.7 in a weight ratio of 1:1. A solid electrode material is prepared by ball-milling the mixture.

Example 3.1.8

A mixture is obtained by mixing the LPSCl from Example 1.1 and the additive material from Example 2.8 in a weight ratio of 1:1. A solid electrode material is prepared by ball-milling the mixture.

Example 3.1.9

A mixture is obtained by mixing the LPSCl from Example 1.1 and the additive material from Example 2.9 in a weight ratio of 1:1. A solid electrode material is prepared by ball-milling the mixture.

Example 3.1.10

A mixture is obtained by mixing the LPSCl from Example 1.1 and the additive material from Example 2.10 in a weight ratio of 1:1. A solid electrode material is prepared by ball-milling the mixture.

Example 3.1.11

A mixture is obtained by mixing the LPSCl from Example 1.1 and the additive material from Example 2.11 in a weight ratio of 1:1. A solid electrode material is prepared by ball-milling the mixture.

Example 3.1.12

A mixture is obtained by mixing the LPSCl from Example 1.1 and the additive material from Example 2.12 in a weight ratio of 1:1. A solid electrode material is prepared by ball-milling the mixture.

Example 3.2.1

A mixture is obtained by mixing the LPSBr from Example 1.2 and the additive material from Example 2.1 in a weight ratio of 1:1. A solid electrode material is prepared by ball-milling the mixture.

Example 3.2.2

A mixture is obtained by mixing the LPSBr from Example 1.2 and the additive material from Example 2.2 in a weight ratio of 1:1. A solid electrode material is prepared by ball-milling the mixture.

Example 3.2.3

A mixture is obtained by mixing the LPSBr from Example 1.2 and the additive material from Example 2.3 in a weight ratio of 1:1. A solid electrode layer is prepared by ball-milling the mixture.

Example 3.2.4

A mixture is obtained by mixing the LPSBr from Example 1.2 and the additive material from Example 2.4 in a weight ratio of 1:1. A solid electrode material is prepared by ball-milling the mixture.

Example 3.2.5

A mixture is obtained by mixing the LPSBr from Example 1.2 and the additive material from Example 2.5 in a weight ratio of 1:1. A solid electrode material is prepared by ball-milling the mixture.

Example 3.2.6

A mixture is obtained by mixing the LPSBr from Example 1.2 and the additive material from Example 2.6 in a weight ratio of 1:1. A solid electrode material is prepared by ball-milling the mixture.

Example 3.2.7

A mixture is obtained by mixing the LPSBr from Example 1.2 and the additive material from Example 2.7 in a weight ratio of 1:1. A solid electrode material is prepared by ball-milling the mixture.

Example 3.2.8

A mixture is obtained by mixing the LPSBr from Example 1.2 and the additive material from Example 2.8 in a weight ratio of 1:1. A solid electrode material is prepared by ball-milling the mixture.

Example 3.2.9

A mixture is obtained by mixing the LPSBr from Example 1.2 and the additive material from Example 2.9 in a weight ratio of 1:1. A solid electrode material is prepared by ball-milling the mixture.

Example 3.2.10

A mixture is obtained by mixing the LPSBr from Example 1.2 and the additive material from Example 2.10 in a weight ratio of 1:1. A solid electrode material is prepared by ball-milling the mixture.

Example 3.2.11

A mixture is obtained by mixing the LPSBr from Example 1.2 and the additive material from Example 2.11 in a weight ratio of 1:1. A solid electrode material is prepared by ball-milling the mixture.

Example 3.2.12

A mixture is obtained by mixing the LPSBr from Example 1.2 and the additive material from Example 2.12 in a weight ratio of 1:1. A solid electrode material is prepared by ball-milling the mixture.

Example 3.3.1

A mixture is obtained by mixing the LPSI from Example 1.3 and the additive material from Example 2.1 in a weight ratio of 1:1. A solid electrode material is prepared by ball-milling the mixture.

Example 3.3.2

A mixture is obtained by mixing the LPSI from Example 1.3 and the additive material from Example 2.2 in a weight ratio of 1:1. A solid electrode material is prepared by ball-milling the mixture.

Example 3.3.3

A mixture is obtained by mixing the LPSI from Example 1.3 and the additive material from Example 2.3 in a weight ratio of 1:1. A solid electrode material is prepared by ball-milling the mixture.

Example 3.3.4

A mixture is obtained by mixing the LPSI from Example 1.3 and the additive material from Example 2.4 in a weight ratio of 1:1. A solid electrode material is prepared by ball-milling the mixture.

Example 3.3.5

A mixture is obtained by mixing the LPSI from Example 1.3 and the additive material from Example 2.5 in a weight ratio of 1:1. A solid electrode material is prepared by ball-milling the mixture.

Example 3.3.6

A mixture is obtained by mixing the LPSI from Example 1.3 and the additive material from Example 2.6 in a weight ratio of 1:1. A solid electrode material is prepared by ball-milling the mixture.

Example 3.3.7

A mixture is obtained by mixing the LPSI from Example 1.3 and the additive material from Example 2.7 in a weight ratio of 1:1. A solid electrode material is prepared by ball-milling the mixture.

Example 3.3.8

A mixture is obtained by mixing the LPSI from Example 1.3 and the additive material from Example 2.8 in a weight ratio of 1:1. A solid electrode material is prepared by ball-milling the mixture.

Example 3.3.9

A mixture is obtained by mixing the LPSI from Example 1.3 and the additive material from Example 2.9 in a weight ratio of 1:1. A solid electrode material is prepared by ball-milling the mixture.

Example 3.3.10

A mixture is obtained by mixing the LPSI from Example 1.3 and the additive material from Example 2.10 in a weight ratio of 1:1. A solid electrode material is prepared by ball-milling the mixture.

Example 3.3.11

A mixture is obtained by mixing the LPSI from Example 1.3 and the additive material from Example 2.11 in a weight ratio of 1:1. A solid electrode material is prepared by ball-milling the mixture.

Example 3.3.12

A mixture is obtained by mixing the LPSI from Example 1.3 and the additive material from Example 2.12 in a weight ratio of 1:1. A solid electrode material is prepared by ball-milling the mixture.

Example 4: Assembling a Battery

[If there is any Preferred Specific Cathode and Anode, we can Use them in the Examples.]

Example 4.1.1

A cathode electrode is obtained. An anode electrode is obtained. A solid electrolyte layer comprising the solid electrolyte material from Example 3.1.1 is positioned between the cathode electrode and the anode electrode to prepare a battery.

Example 4.1.2

A cathode electrode is obtained. An anode electrode is obtained. A solid electrolyte layer comprising the solid electrolyte material from Example 3.1.2 is positioned between the cathode electrode and the anode electrode to prepare a battery.

Example 4.1.3

A cathode electrode is obtained. An anode electrode is obtained. A solid electrolyte layer comprising the solid electrolyte material from Example 3.1.3 is positioned between the cathode electrode and the anode electrode to prepare a battery.

Example 4.1.4

A cathode electrode is obtained. An anode electrode is obtained. A solid electrolyte layer comprising the solid electrolyte material from Example 3.1.4 is positioned between the cathode electrode and the anode electrode to prepare a battery.

Example 4.1.5

A cathode electrode is obtained. An anode electrode is obtained. A solid electrolyte layer comprising the solid electrolyte material from Example 3.1.5 is positioned between the cathode electrode and the anode electrode to prepare a battery.

Example 4.1.6

A cathode electrode is obtained. An anode electrode is obtained. A solid electrolyte layer comprising the solid electrolyte material from Example 3.1.6 is positioned between the cathode electrode and the anode electrode to prepare a battery.

Example 4.1.7

A cathode electrode is obtained. An anode electrode is obtained. A solid electrolyte layer comprising the solid electrolyte material from Example 3.1.7 is positioned between the cathode electrode and the anode electrode to prepare a battery.

Example 4.1.8

A cathode electrode is obtained. An anode electrode is obtained. A solid electrolyte layer comprising the solid electrolyte material from Example 3.1.8 is positioned between the cathode electrode and the anode electrode to prepare a battery.

Example 4.1.9

A cathode electrode is obtained. An anode electrode is obtained. A solid electrolyte layer comprising the solid electrolyte material from Example 3.1.9 is positioned between the cathode electrode and the anode electrode to prepare a battery.

Example 4.1.10

A cathode electrode is obtained. An anode electrode is obtained. A solid electrolyte layer comprising the solid electrolyte material from Example 3.1.10 is positioned between the cathode electrode and the anode electrode to prepare a battery.

Example 4.1.11

A cathode electrode is obtained. An anode electrode is obtained. A solid electrolyte layer comprising the solid electrolyte material from Example 3.1.11 is positioned between the cathode electrode and the anode electrode to prepare a battery.

Example 4.1.12

A cathode electrode is obtained. An anode electrode is obtained. A solid electrolyte layer comprising the solid electrolyte material from Example 3.1.12 is positioned between the cathode electrode and the anode electrode to prepare a battery.

Example 4.2.1

A cathode electrode is obtained. An anode electrode is obtained. A solid electrolyte layer comprising the solid electrolyte material from Example 3.2.1 is positioned between the cathode electrode and the anode electrode to prepare a battery.

Example 4.2.2

A cathode electrode is obtained. An anode electrode is obtained. A solid electrolyte layer comprising the solid electrolyte material from Example 3.2.2 is positioned between the cathode electrode and the anode electrode to prepare a battery.

Example 4.2.3

A cathode electrode is obtained. An anode electrode is obtained. A solid electrolyte layer comprising the solid electrolyte material from Example 3.2.3 is positioned between the cathode electrode and the anode electrode to prepare a battery.

Example 4.2.4

A cathode electrode is obtained. An anode electrode is obtained. A solid electrolyte layer comprising the solid electrolyte material from Example 3.2.4 is positioned between the cathode electrode and the anode electrode to prepare a battery.

Example 4.2.5

A cathode electrode is obtained. An anode electrode is obtained. A solid electrolyte layer comprising the solid electrolyte material from Example 3.2.5 is positioned between the cathode electrode and the anode electrode to prepare a battery.

Example 4.2.6

A cathode electrode is obtained. An anode electrode is obtained. A solid electrolyte layer comprising the solid electrolyte material from Example 3.2.6 is positioned between the cathode electrode and the anode electrode to prepare a battery.

Example 4.2.7

A cathode electrode is obtained. An anode electrode is obtained. A solid electrolyte layer comprising the solid electrolyte material from Example 3.2.7 is positioned between the cathode electrode and the anode electrode to prepare a battery.

Example 4.2.8

A cathode electrode is obtained. An anode electrode is obtained. A solid electrolyte layer comprising the solid electrolyte material from Example 3.2.8 is positioned between the cathode electrode and the anode electrode to prepare a battery.

Example 4.2.9

A cathode electrode is obtained. An anode electrode is obtained. A solid electrolyte layer comprising the solid electrolyte material from Example 3.2.9 is positioned between the cathode electrode and the anode electrode to prepare a battery.

Example 4.2.10

A cathode electrode is obtained. An anode electrode is obtained. A solid electrolyte layer comprising the solid electrolyte material from Example 3.2.10 is positioned between the cathode electrode and the anode electrode to prepare a battery.

Example 4.2.11

A cathode electrode is obtained. An anode electrode is obtained. A solid electrolyte layer comprising the solid electrolyte material from Example 3.2.11 is positioned between the cathode electrode and the anode electrode to prepare a battery.

Example 4.2.12

A cathode electrode is obtained. An anode electrode is obtained. A solid electrolyte layer comprising the solid electrolyte material from Example 3.1.12 is positioned between the cathode electrode and the anode electrode to prepare a battery.

Example 4.3.1

A cathode electrode is obtained. An anode electrode is obtained. A solid electrolyte layer comprising the solid electrolyte material from Example 3.3.1 is positioned between the cathode electrode and the anode electrode to prepare a battery.

Example 4.3.2

A cathode electrode is obtained. An anode electrode is obtained. A solid electrolyte layer comprising the solid electrolyte material from Example 3.3.2 is positioned between the cathode electrode and the anode electrode to prepare a battery.

Example 4.3.3

A cathode electrode is obtained. An anode electrode is obtained. A solid electrolyte layer comprising the solid electrolyte material from Example 3.3.3 is positioned between the cathode electrode and the anode electrode to prepare a battery.

Example 4.3.4

A cathode electrode is obtained. An anode electrode is obtained. A solid electrolyte layer comprising the solid electrolyte material from Example 3.3.4 is positioned between the cathode electrode and the anode electrode to prepare a battery.

Example 4.3.5

A cathode electrode is obtained. An anode electrode is obtained. A solid electrolyte layer comprising the solid electrolyte material from Example 3.3.5 is positioned between the cathode electrode and the anode electrode to prepare a battery.

Example 4.3.6

A cathode electrode is obtained. An anode electrode is obtained. A solid electrolyte layer comprising the solid electrolyte material from Example 3.3.6 is positioned between the cathode electrode and the anode electrode to prepare a battery.

Example 4.3.7

A cathode electrode is obtained. An anode electrode is obtained. A solid electrolyte layer comprising the solid electrolyte material from Example 3.3.7 is positioned between the cathode electrode and the anode electrode to prepare a battery.

Example 4.3.8

A cathode electrode is obtained. An anode electrode is obtained. A solid electrolyte layer comprising the solid electrolyte material from Example 3.3.8 is positioned between the cathode electrode and the anode electrode to prepare a battery.

Example 4.3.9

A cathode electrode is obtained. An anode electrode is obtained. A solid electrolyte layer comprising the solid electrolyte material from Example 3.3.9 is positioned between the cathode electrode and the anode electrode to prepare a battery.

Example 4.3.10

A cathode electrode is obtained. An anode electrode is obtained. A solid electrolyte layer comprising the solid electrolyte material from Example 3.3.10 is positioned between the cathode electrode and the anode electrode to prepare a battery.

Example 4.3.11

A cathode electrode is obtained. An anode electrode is obtained. A solid electrolyte layer comprising the solid electrolyte material from Example 3.3.11 is positioned between the cathode electrode and the anode electrode to prepare a battery.

Example 4.3.12

A cathode electrode is obtained. An anode electrode is obtained. A solid electrolyte layer comprising the solid electrolyte material from Example 3.3.12 is positioned between the cathode electrode and the anode electrode to prepare a battery.

Example 5: Measuring Lithium Ion Diffusivity

Example 5.1.1.1

The battery from Example 4.1.1 is operated under a pressure at 1 MPa. The lithium ion diffusivity of the battery is measured.

Example 5.1.1.2

The battery from Example 4.1.2 is operated under a pressure at 1 MPa. The lithium ion diffusivity of the battery is measured.

Example 5.1.1.3

The battery from Example 4.1.3 is operated under a pressure at 1 MPa. The lithium ion diffusivity of the battery is measured.

Example 5.1.1.4

The battery from Example 4.1.4 is operated under a pressure at 1 MPa. The lithium ion diffusivity of the battery is measured.

Example 5.1.1.5

The battery from Example 4.1.5 is operated under a pressure at 1 MPa. The lithium ion diffusivity of the battery is measured.

Example 5.1.1.6

The battery from Example 4.1.6 is operated under a pressure at 1 MPa. The lithium ion diffusivity of the battery is measured.

Example 5.1.1.7

The battery from Example 4.1.7 is operated under a pressure at 1 MPa. The lithium ion diffusivity of the battery is measured.

Example 5.1.1.8

The battery from Example 4.1.8 is operated under a pressure at 1 MPa. The lithium ion diffusivity of the battery is measured.

Example 5.1.1.9

The battery from Example 4.1.9 is operated under a pressure at 1 MPa. The lithium ion diffusivity of the battery is measured.

Example 5.1.1.10

The battery from Example 4.1.10 is operated under a pressure at 1 MPa. The lithium ion diffusivity of the battery is measured.

Example 5.1.1.11

The battery from Example 4.1.11 is operated under a pressure at 1 MPa. The lithium ion diffusivity of the battery is measured.

Example 5.1.1.12

The battery from Example 4.1.12 is operated under a pressure at 1 MPa. The lithium ion diffusivity of the battery is measured.

Example 5.1.2.1

The battery from Example 4.2.1 is operated under a pressure at 1 MPa. The lithium ion diffusivity of the battery is measured.

Example 5.1.2.2

The battery from Example 4.2.2 is operated under a pressure at 1 MPa. The lithium ion diffusivity of the battery is measured.

Example 5.1.2.3

The battery from Example 4.2.3 is operated under a pressure at 1 MPa. The lithium ion diffusivity of the battery is measured.

Example 5.1.2.4

The battery from Example 4.2.4 is operated under a pressure at 1 MPa. The lithium ion diffusivity of the battery is measured.

Example 5.1.2.5

The battery from Example 4.2.5 is operated under a pressure at 1 MPa. The lithium ion diffusivity of the battery is measured.

Example 5.1.2.6

The battery from Example 4.2.6 is operated under a pressure at 1 MPa. The lithium ion diffusivity of the battery is measured.

Example 5.1.2.7

The battery from Example 4.2.7 is operated under a pressure at 1 MPa. The lithium ion diffusivity of the battery is measured.

Example 5.1.2.8

The battery from Example 4.2.8 is operated under a pressure at 1 MPa. The lithium ion diffusivity of the battery is measured.

Example 5.1.2.9

The battery from Example 4.2.9 is operated under a pressure at 1 MPa. The lithium ion diffusivity of the battery is measured.

Example 5.1.2.10

The battery from Example 4.2.10 is operated under a pressure at 1 MPa. The lithium ion diffusivity of the battery is measured.

Example 5.1.2.11

The battery from Example 4.2.11 is operated under a pressure at 1 MPa. The lithium ion diffusivity of the battery is measured.

Example 5.1.2.12

The battery from Example 4.2.12 is operated under a pressure at 1 MPa. The lithium ion diffusivity of the battery is measured.

Example 5.1.3.1

The battery from Example 4.3.1 is operated under a pressure at 1 MPa. The lithium ion diffusivity of the battery is measured.

Example 5.1.3.2

The battery from Example 4.3.2 is operated under a pressure at 1 MPa. The lithium ion diffusivity of the battery is measured.

Example 5.1.3.3

The battery from Example 4.3.3 is operated under a pressure at 1 MPa. The lithium ion diffusivity of the battery is measured.

Example 5.1.3.4

The battery from Example 4.3.4 is operated under a pressure at 1 MPa. The lithium ion diffusivity of the battery is measured.

Example 5.1.3.5

The battery from Example 4.3.5 is operated under a pressure at 1 MPa. The lithium ion diffusivity of the battery is measured.

Example 5.1.3.6

The battery from Example 4.3.6 is operated under a pressure at 1 MPa. The lithium ion diffusivity of the battery is measured.

Example 5.1.3.7

The battery from Example 4.3.7 is operated under a pressure at 1 MPa. The lithium ion diffusivity of the battery is measured.

Example 5.1.3.8

The battery from Example 4.3.8 is operated under a pressure at 1 MPa. The lithium ion diffusivity of the battery is measured.

Example 5.1.3.9

The battery from Example 4.3.9 is operated under a pressure at 1 MPa. The lithium ion diffusivity of the battery is measured.

Example 5.1.3.10

The battery from Example 4.3.10 is operated under a pressure at 1 MPa. The lithium ion diffusivity of the battery is measured.

Example 5.1.3.11

The battery from Example 4.3.11 is operated under a pressure at 1 MPa. The lithium ion diffusivity of the battery is measured.

Example 5.1.3.12

The battery from Example 4.3.12 is operated under a pressure at 1 MPa. The lithium ion diffusivity of the battery is measured.

Example 5.2.1.1

The battery from Example 4.1.1 is operated under a pressure at 2 MPa. The lithium ion diffusivity of the battery is measured.

Example 5.2.1.2

The battery from Example 4.1.2 is operated under a pressure at 2 MPa. The lithium ion diffusivity of the battery is measured.

Example 5.2.1.3

The battery from Example 4.1.3 is operated under a pressure at 2 MPa. The lithium ion diffusivity of the battery is measured.

Example 5.2.1.4

The battery from Example 4.1.4 is operated under a pressure at 2 MPa. The lithium ion diffusivity of the battery is measured.

Example 5.2.1.5

The battery from Example 4.1.5 is operated under a pressure at 2 MPa. The lithium ion diffusivity of the battery is measured.

Example 5.2.1.6

The battery from Example 4.1.6 is operated under a pressure at 2 MPa. The lithium ion diffusivity of the battery is measured.

Example 5.2.1.7

The battery from Example 4.1.7 is operated under a pressure at 2 MPa. The lithium ion diffusivity of the battery is measured.

Example 5.2.1.8

The battery from Example 4.1.8 is operated under a pressure at 2 MPa. The lithium ion diffusivity of the battery is measured.

Example 5.2.1.9

The battery from Example 4.1.9 is operated under a pressure at 2 MPa. The lithium ion diffusivity of the battery is measured.

Example 5.2.1.10

The battery from Example 4.1.10 is operated under a pressure at 2 MPa. The lithium ion diffusivity of the battery is measured.

Example 5.2.1.11

The battery from Example 4.1.11 is operated under a pressure at 2 MPa. The lithium ion diffusivity of the battery is measured.

Example 5.2.1.12

The battery from Example 4.1.12 is operated under a pressure at 2 MPa. The lithium ion diffusivity of the battery is measured.

Example 5.2.2.1

The battery from Example 4.2.1 is operated under a pressure at 2 MPa. The lithium ion diffusivity of the battery is measured.

Example 5.2.2.2

The battery from Example 4.2.2 is operated under a pressure at 2 MPa. The lithium ion diffusivity of the battery is measured.

Example 5.2.2.3

The battery from Example 4.2.3 is operated under a pressure at 2 MPa. The lithium ion diffusivity of the battery is measured.

Example 5.2.2.4

The battery from Example 4.2.4 is operated under a pressure at 2 MPa. The lithium ion diffusivity of the battery is measured.

Example 5.2.2.5

The battery from Example 4.2.5 is operated under a pressure at 2 MPa. The lithium ion diffusivity of the battery is measured.

Example 5.2.2.6

The battery from Example 4.2.6 is operated under a pressure at 2 MPa. The lithium ion diffusivity of the battery is measured.

Example 5.2.2.7

The battery from Example 4.2.7 is operated under a pressure at 2 MPa. The lithium ion diffusivity of the battery is measured.

Example 5.2.2.8

The battery from Example 4.2.8 is operated under a pressure at 2 MPa. The lithium ion diffusivity of the battery is measured.

Example 5.2.2.9

The battery from Example 4.2.9 is operated under a pressure at 2 MPa. The lithium ion diffusivity of the battery is measured.

Example 5.2.2.10

The battery from Example 4.2.10 is operated under a pressure at 2 MPa. The lithium ion diffusivity of the battery is measured.

Example 5.2.2.11

The battery from Example 4.2.11 is operated under a pressure at 2 MPa. The lithium ion diffusivity of the battery is measured.

Example 5.2.2.12

The battery from Example 4.2.12 is operated under a pressure at 2 MPa. The lithium ion diffusivity of the battery is measured.

Example 5.2.3.1

The battery from Example 4.3.1 is operated under a pressure at 2 MPa. The lithium ion diffusivity of the battery is measured.

Example 5.2.3.2

The battery from Example 4.3.2 is operated under a pressure at 2 MPa. The lithium ion diffusivity of the battery is measured.

Example 5.2.3.3

The battery from Example 4.3.3 is operated under a pressure at 2 MPa. The lithium ion diffusivity of the battery is measured.

Example 5.2.3.4

The battery from Example 4.3.4 is operated under a pressure at 2 MPa. The lithium ion diffusivity of the battery is measured.

Example 5.2.3.5

The battery from Example 4.3.5 is operated under a pressure at 2 MPa. The lithium ion diffusivity of the battery is measured.

Example 5.2.3.6

The battery from Example 4.3.6 is operated under a pressure at 2 MPa. The lithium ion diffusivity of the battery is measured.

Example 5.2.3.7

The battery from Example 4.3.7 is operated under a pressure at 2 MPa. The lithium ion diffusivity of the battery is measured.

Example 5.2.3.8

The battery from Example 4.3.8 is operated under a pressure at 2 MPa. The lithium ion diffusivity of the battery is measured.

Example 5.2.3.9

The battery from Example 4.3.9 is operated under a pressure at 2 MPa. The lithium ion diffusivity of the battery is measured.

Example 5.2.3.10

The battery from Example 4.3.10 is operated under a pressure at 2 MPa. The lithium ion diffusivity of the battery is measured.

Example 5.2.3.11

The battery from Example 4.3.11 is operated under a pressure at 2 MPa. The lithium ion diffusivity of the battery is measured.

Example 5.2.3.12

The battery from Example 4.3.12 is operated under a pressure at 2 MPa. The lithium ion diffusivity of the battery is measured.

Example 5.3.1.1

The battery from Example 4.1.1 is operated under a pressure at 3 MPa. The lithium ion diffusivity of the battery is measured.

Example 5.3.1.2

The battery from Example 4.1.2 is operated under a pressure at 3 MPa. The lithium ion diffusivity of the battery is measured.

Example 5.3.1.3

The battery from Example 4.1.3 is operated under a pressure at 3 MPa. The lithium ion diffusivity of the battery is measured.

Example 5.3.1.4

The battery from Example 4.1.4 is operated under a pressure at 3 MPa. The lithium ion diffusivity of the battery is measured.

Example 5.3.1.5

The battery from Example 4.1.5 is operated under a pressure at 3 MPa. The lithium ion diffusivity of the battery is measured.

Example 5.3.1.6

The battery from Example 4.1.6 is operated under a pressure at 3 MPa. The lithium ion diffusivity of the battery is measured.

Example 5.3.1.7

The battery from Example 4.1.7 is operated under a pressure at 3 MPa. The lithium ion diffusivity of the battery is measured.

Example 5.3.1.8

The battery from Example 4.1.8 is operated under a pressure at 3 MPa. The lithium ion diffusivity of the battery is measured.

Example 5.3.1.9

The battery from Example 4.1.9 is operated under a pressure at 3 MPa. The lithium ion diffusivity of the battery is measured.

Example 5.3.1.10

The battery from Example 4.1.10 is operated under a pressure at 3 MPa. The lithium ion diffusivity of the battery is measured.

Example 5.3.1.11

The battery from Example 4.1.11 is operated under a pressure at 3 MPa. The lithium ion diffusivity of the battery is measured.

Example 5.3.1.12

The battery from Example 4.1.12 is operated under a pressure at 3 MPa. The lithium ion diffusivity of the battery is measured.

Example 5.3.2.1

The battery from Example 4.2.1 is operated under a pressure at 3 MPa. The lithium ion diffusivity of the battery is measured.

Example 5.3.2.2

The battery from Example 4.2.2 is operated under a pressure at 3 MPa. The lithium ion diffusivity of the battery is measured.

Example 5.3.2.3

The battery from Example 4.2.3 is operated under a pressure at 3 MPa. The lithium ion diffusivity of the battery is measured.

Example 5.3.2.4

The battery from Example 4.2.4 is operated under a pressure at 3 MPa. The lithium ion diffusivity of the battery is measured.

Example 5.3.2.5

The battery from Example 4.2.5 is operated under a pressure at 3 MPa. The lithium ion diffusivity of the battery is measured.

Example 5.3.2.6

The battery from Example 4.2.6 is operated under a pressure at 3 MPa. The lithium ion diffusivity of the battery is measured.

Example 5.3.2.7

The battery from Example 4.2.7 is operated under a pressure at 3 MPa. The lithium ion diffusivity of the battery is measured.

Example 5.3.2.8

The battery from Example 4.2.8 is operated under a pressure at 3 MPa. The lithium ion diffusivity of the battery is measured.

Example 5.3.2.9

The battery from Example 4.2.9 is operated under a pressure at 3 MPa. The lithium ion diffusivity of the battery is measured.

Example 5.3.2.10

The battery from Example 4.2.10 is operated under a pressure at 3 MPa. The lithium ion diffusivity of the battery is measured.

Example 5.3.2.11

The battery from Example 4.2.11 is operated under a pressure at 3 MPa. The lithium ion diffusivity of the battery is measured.

Example 5.3.2.12

The battery from Example 4.2.12 is operated under a pressure at 3 MPa. The lithium ion diffusivity of the battery is measured.

Example 5.3.3.1

The battery from Example 4.3.1 is operated under a pressure at 3 MPa. The lithium ion diffusivity of the battery is measured.

Example 5.3.3.2

The battery from Example 4.3.2 is operated under a pressure at 3 MPa. The lithium ion diffusivity of the battery is measured.

Example 5.3.3.3

The battery from Example 4.3.3 is operated under a pressure at 3 MPa. The lithium ion diffusivity of the battery is measured.

Example 5.3.3.4

The battery from Example 4.3.4 is operated under a pressure at 3 MPa. The lithium ion diffusivity of the battery is measured.

Example 5.3.3.5

The battery from Example 4.3.5 is operated under a pressure at 3 MPa. The lithium ion diffusivity of the battery is measured.

Example 5.3.3.6

The battery from Example 4.3.6 is operated under a pressure at 3 MPa. The lithium ion diffusivity of the battery is measured.

Example 5.3.3.7

The battery from Example 4.3.7 is operated under a pressure at 3 MPa. The lithium ion diffusivity of the battery is measured.

Example 5.3.3.8

The battery from Example 4.3.8 is operated under a pressure at 3 MPa. The lithium ion diffusivity of the battery is measured.

Example 5.3.3.9

The battery from Example 4.3.9 is operated under a pressure at 3 MPa. The lithium ion diffusivity of the battery is measured.

Example 5.3.3.10

The battery from Example 4.3.10 is operated under a pressure at 3 MPa. The lithium ion diffusivity of the battery is measured.

Example 5.3.3.11

The battery from Example 4.3.11 is operated under a pressure at 3 MPa. The lithium ion diffusivity of the battery is measured.

Example 5.3.3.12

The battery from Example 4.3.12 is operated under a pressure at 3 MPa. The lithium ion diffusivity of the battery is measured.

Example 5.4.1.1

The battery from Example 4.1.1 is operated under a pressure at 4 MPa. The lithium ion diffusivity of the battery is measured.

Example 5.4.1.2

The battery from Example 4.1.2 is operated under a pressure at 4 MPa. The lithium ion diffusivity of the battery is measured.

Example 5.4.1.3

The battery from Example 4.1.3 is operated under a pressure at 4 MPa. The lithium ion diffusivity of the battery is measured.

Example 5.4.1.4

The battery from Example 4.4.1.4 is operated under a pressure at 4 MPa. The lithium ion diffusivity of the battery is measured.

Example 5.4.1.5

The battery from Example 4.1.5 is operated under a pressure at 4 MPa. The lithium ion diffusivity of the battery is measured.

Example 5.4.1.6

The battery from Example 4.1.6 is operated under a pressure at 4 MPa. The lithium ion diffusivity of the battery is measured.

Example 5.4.1.7

The battery from Example 4.1.7 is operated under a pressure at 4 MPa. The lithium ion diffusivity of the battery is measured.

Example 5.4.1.8

The battery from Example 4.1.8 is operated under a pressure at 4 MPa. The lithium ion diffusivity of the battery is measured.

Example 5.4.1.9

The battery from Example 4.1.9 is operated under a pressure at 4 MPa. The lithium ion diffusivity of the battery is measured.

Example 5.4.1.10

The battery from Example 4.1.10 is operated under a pressure at 4 MPa. The lithium ion diffusivity of the battery is measured.

Example 5.4.1.11

The battery from Example 4.1.11 is operated under a pressure at 4 MPa. The lithium ion diffusivity of the battery is measured.

Example 5.4.1.12

The battery from Example 4.1.12 is operated under a pressure at 4 MPa. The lithium ion diffusivity of the battery is measured.

Example 5.4.2.1

The battery from Example 4.2.1 is operated under a pressure at 4 MPa. The lithium ion diffusivity of the battery is measured.

Example 5.4.2.2

The battery from Example 4.2.2 is operated under a pressure at 4 MPa. The lithium ion diffusivity of the battery is measured.

Example 5.4.2.3

The battery from Example 4.2.3 is operated under a pressure at 4 MPa. The lithium ion diffusivity of the battery is measured.

Example 5.4.2.4

The battery from Example 4.2.4 is operated under a pressure at 4 MPa. The lithium ion diffusivity of the battery is measured.

Example 5.4.2.5

The battery from Example 4.2.5 is operated under a pressure at 4 MPa. The lithium ion diffusivity of the battery is measured.

Example 5.4.2.6

The battery from Example 4.2.6 is operated under a pressure at 4 MPa. The lithium ion diffusivity of the battery is measured.

Example 5.4.2.7

The battery from Example 4.2.7 is operated under a pressure at 4 MPa. The lithium ion diffusivity of the battery is measured.

Example 5.4.2.8

The battery from Example 4.2.8 is operated under a pressure at 4 MPa. The lithium ion diffusivity of the battery is measured.

Example 5.4.2.9

The battery from Example 4.2.9 is operated under a pressure at 4 MPa. The lithium ion diffusivity of the battery is measured.

Example 5.4.2.10

The battery from Example 4.2.10 is operated under a pressure at 4 MPa. The lithium ion diffusivity of the battery is measured.

Example 5.4.2.11

The battery from Example 4.2.11 is operated under a pressure at 4 MPa. The lithium ion diffusivity of the battery is measured.

Example 5.4.2.12

The battery from Example 4.2.12 is operated under a pressure at 4 MPa. The lithium ion diffusivity of the battery is measured.

Example 5.4.3.1

The battery from Example 4.3.1 is operated under a pressure at 4 MPa. The lithium ion diffusivity of the battery is measured.

Example 5.4.3.2

The battery from Example 4.3.2 is operated under a pressure at 4 MPa. The lithium ion diffusivity of the battery is measured.

Example 5.4.3.3

The battery from Example 4.3.3 is operated under a pressure at 4 MPa. The lithium ion diffusivity of the battery is measured.

Example 5.4.3.4

The battery from Example 4.3.4 is operated under a pressure at 4 MPa. The lithium ion diffusivity of the battery is measured.

Example 5.4.3.5

The battery from Example 4.3.5 is operated under a pressure at 4 MPa. The lithium ion diffusivity of the battery is measured.

Example 5.4.3.6

The battery from Example 4.3.6 is operated under a pressure at 4 MPa. The lithium ion diffusivity of the battery is measured.

Example 5.4.3.7

The battery from Example 4.3.7 is operated under a pressure at 4 MPa. The lithium ion diffusivity of the battery is measured.

Example 5.4.3.8

The battery from Example 4.3.8 is operated under a pressure at 4 MPa. The lithium ion diffusivity of the battery is measured

Example 5.4.3.9

The battery from Example 4.3.9 is operated under a pressure at 4 MPa. The lithium ion diffusivity of the battery is measured.

Example 5.4.3.10

The battery from Example 4.3.10 is operated under a pressure at 4 MPa. The lithium ion diffusivity of the battery is measured.

Example 5.4.3.11

The battery from Example 4.3.11 is operated under a pressure at 4 MPa. The lithium ion diffusivity of the battery is measured.

Example 5.4.3.12

The battery from Example 4.3.12 is operated under a pressure at 4 MPa. The lithium ion diffusivity of the battery is measured.

Example 5.5.1.1

The battery from Example 4.1.1 is operated under a pressure at 5 MPa. The lithium ion diffusivity of the battery is measured.

Example 5.5.1.2

The battery from Example 4.1.2 is operated under a pressure at 5 MPa. The lithium ion diffusivity of the battery is measured.

Example 5.5.1.3

The battery from Example 4.1.3 is operated under a pressure at 5 MPa. The lithium ion diffusivity of the battery is measured.

Example 5.5.1.4

The battery from Example 4.1.4 is operated under a pressure at 5 MPa. The lithium ion diffusivity of the battery is measured.

Example 5.5.1.5

The battery from Example 4.1.5 is operated under a pressure at 5 MPa. The lithium ion diffusivity of the battery is measured.

Example 5.5.1.6

The battery from Example 4.1.6 is operated under a pressure at 5 MPa. The lithium ion diffusivity of the battery is measured.

Example 5.5.1.7

The battery from Example 4.1.7 is operated under a pressure at 5 MPa. The lithium ion diffusivity of the battery is measured.

Example 5.5.1.8

The battery from Example 4.1.8 is operated under a pressure at 5 MPa. The lithium ion diffusivity of the battery is measured.

Example 5.5.1.9

The battery from Example 4.1.9 is operated under a pressure at 5 MPa. The lithium ion diffusivity of the battery is measured.

Example 5.5.1.10

The battery from Example 4.1.10 is operated under a pressure at 5 MPa. The lithium ion diffusivity of the battery is measured.

Example 5.5.1.11

The battery from Example 4.1.11 is operated under a pressure at 5 MPa. The lithium ion diffusivity of the battery is measured.

Example 5.5.1.12

The battery from Example 4.1.12 is operated under a pressure at 5 MPa. The lithium ion diffusivity of the battery is measured.

Example 5.5.2.1

The battery from Example 4.2.1 is operated under a pressure at 5 MPa. The lithium ion diffusivity of the battery is measured.

Example 5.5.2.2

The battery from Example 4.2.2 is operated under a pressure at 5 MPa. The lithium ion diffusivity of the battery is measured.

Example 5.5.2.3

The battery from Example 4.2.3 is operated under a pressure at 5 MPa. The lithium ion diffusivity of the battery is measured.

Example 5.5.2.4

The battery from Example 4.2.4 is operated under a pressure at 5 MPa. The lithium ion diffusivity of the battery is measured.

Example 5.5.2.5

The battery from Example 4.2.5 is operated under a pressure at 5 MPa. The lithium ion diffusivity of the battery is measured.

Example 5.5.2.6

The battery from Example 4.2.6 is operated under a pressure at 5 MPa. The lithium ion diffusivity of the battery is measured.

Example 5.5.2.7

The battery from Example 4.2.7 is operated under a pressure at 5 MPa. The lithium ion diffusivity of the battery is measured.

Example 5.5.2.8

The battery from Example 4.2.8 is operated under a pressure at 5 MPa. The lithium ion diffusivity of the battery is measured.

Example 5.5.2.9

The battery from Example 4.2.9 is operated under a pressure at 5 MPa. The lithium ion diffusivity of the battery is measured.

Example 5.5.2.10

The battery from Example 4.2.10 is operated under a pressure at 5 MPa. The lithium ion diffusivity of the battery is measured.

Example 5.5.2.11

The battery from Example 4.2.11 is operated under a pressure at 5 MPa. The lithium ion diffusivity of the battery is measured.

Example 5.5.2.12

The battery from Example 4.2.12 is operated under a pressure at 5 MPa. The lithium ion diffusivity of the battery is measured.

Example 5.5.3.1

The battery from Example 4.3.1 is operated under a pressure at 5 MPa. The lithium ion diffusivity of the battery is measured.

Example 5.5.3.2

The battery from Example 4.3.2 is operated under a pressure at 5 MPa. The lithium ion diffusivity of the battery is measured.

Example 5.5.3.3

The battery from Example 4.3.3 is operated under a pressure at 5 MPa. The lithium ion diffusivity of the battery is measured.

Example 5.5.3.4

The battery from Example 4.3.4 is operated under a pressure at 5 MPa. The lithium ion diffusivity of the battery is measured.

Example 5.5.3.5

The battery from Example 4.3.5 is operated under a pressure at 5 MPa. The lithium ion diffusivity of the battery is measured.

Example 5.5.3.6

The battery from Example 4.3.6 is operated under a pressure at 5 MPa. The lithium ion diffusivity of the battery is measured.

Example 5.5.3.7

The battery from Example 4.3.7 is operated under a pressure at 5 MPa. The lithium ion diffusivity of the battery is measured.

Example 5.5.3.8

The battery from Example 4.3.8 is operated under a pressure at 5 MPa. The lithium ion diffusivity of the battery is measured.

Example 5.5.3.9

The battery from Example 4.3.9 is operated under a pressure at 5 MPa. The lithium ion diffusivity of the battery is measured.

Example 5.5.3.10

The battery from Example 4.3.10 is operated under a pressure at 5 MPa. The lithium ion diffusivity of the battery is measured.

Example 5.5.3.11

The battery from Example 4.3.11 is operated under a pressure at 5 MPa. The lithium ion diffusivity of the battery is measured.

Example 5.5.3.12

The battery from Example 4.3.12 is operated under a pressure at 5 MPa. The lithium ion diffusivity of the battery is measured.

Example 6: Measuring Specific Capacity

Example 6.1.1.1

The battery from Example 4.1.1 is operated under a pressure at 1 MPa. The specific capacity of the battery is measured.

Example 6.1.1.2

The battery from Example 4.1.2 is operated under a pressure at 1 MPa. The specific capacity of the battery is measured.

Example 6.1.1.3

The battery from Example 4.1.3 is operated under a pressure at 1 MPa. The specific capacity of the battery is measured.

Example 6.1.1.4

The battery from Example 4.1.4 is operated under a pressure at 1 MPa. The specific capacity of the battery is measured.

Example 6.1.1.5

The battery from Example 4.1.5 is operated under a pressure at 1 MPa. The specific capacity of the battery is measured.

Example 6.1.1.6

The battery from Example 4.1.6 is operated under a pressure at 1 MPa. The specific capacity of the battery is measured.

Example 6.1.1.7

The battery from Example 4.1.7 is operated under a pressure at 1 MPa. The specific capacity of the battery is measured.

Example 6.1.1.8

The battery from Example 4.1.8 is operated under a pressure at 1 MPa. The specific capacity of the battery is measured.

Example 6.1.1.9

The battery from Example 4.1.9 is operated under a pressure at 1 MPa. The specific capacity of the battery is measured.

Example 6.1.1.10

The battery from Example 4.1.10 is operated under a pressure at 1 MPa. The specific capacity of the battery is measured.

Example 6.1.1.11

The battery from Example 4.1.11 is operated under a pressure at 1 MPa. The specific capacity of the battery is measured.

Example 6.1.1.12

The battery from Example 4.1.12 is operated under a pressure at 1 MPa. The specific capacity of the battery is measured.

Example 6.1.2.1

The battery from Example 4.2.1 is operated under a pressure at 1 MPa. The specific capacity of the battery is measured.

Example 6.1.2.2

The battery from Example 4.2.2 is operated under a pressure at 1 MPa. The specific capacity of the battery is measured.

Example 6.1.2.3

The battery from Example 4.2.3 is operated under a pressure at 1 MPa. The specific capacity of the battery is measured.

Example 6.1.2.4

The battery from Example 4.2.4 is operated under a pressure at 1 MPa. The specific capacity of the battery is measured.

Example 6.1.2.5

The battery from Example 4.2.5 is operated under a pressure at 1 MPa. The specific capacity of the battery is measured.

Example 6.1.2.6

The battery from Example 4.2.6 is operated under a pressure at 1 MPa. The specific capacity of the battery is measured.

Example 6.1.2.7

The battery from Example 4.2.7 is operated under a pressure at 1 MPa. The specific capacity of the battery is measured.

Example 6.1.2.8

The battery from Example 4.2.8 is operated under a pressure at 1 MPa. The specific capacity of the battery is measured.

Example 6.1.2.9

The battery from Example 4.2.9 is operated under a pressure at 1 MPa. The specific capacity of the battery is measured.

Example 6.1.2.10

The battery from Example 4.2.10 is operated under a pressure at 1 MPa. The specific capacity of the battery is measured.

Example 6.1.2.11

The battery from Example 4.2.11 is operated under a pressure at 1 MPa. The specific capacity of the battery is measured.

Example 6.1.2.12

The battery from Example 4.2.12 is operated under a pressure at 1 MPa. The specific capacity of the battery is measured.

Example 6.1.3.1

The battery from Example 4.3.1 is operated under a pressure at 1 MPa. The specific capacity of the battery is measured.

Example 6.1.3.2

The battery from Example 4.3.2 is operated under a pressure at 1 MPa. The specific capacity of the battery is measured.

Example 6.1.3.3

The battery from Example 4.3.3 is operated under a pressure at 1 MPa. The specific capacity of the battery is measured.

Example 6.1.3.4

The battery from Example 4.3.4 is operated under a pressure at 1 MPa. The specific capacity of the battery is measured.

Example 6.1.3.5

The battery from Example 4.3.5 is operated under a pressure at 1 MPa. The specific capacity of the battery is measured.

Example 6.1.3.6

The battery from Example 4.3.6 is operated under a pressure at 1 MPa. The specific capacity of the battery is measured.

Example 6.1.3.7

The battery from Example 4.3.7 is operated under a pressure at 1 MPa. The specific capacity of the battery is measured.

Example 6.1.3.8

The battery from Example 4.3.8 is operated under a pressure at 1 MPa. The specific capacity of the battery is measured.

Example 6.1.3.9

The battery from Example 4.3.9 is operated under a pressure at 1 MPa. The specific capacity of the battery is measured.

Example 6.1.3.10

The battery from Example 4.3.10 is operated under a pressure at 1 MPa. The specific capacity of the battery is measured.

Example 6.1.3.11

The battery from Example 4.3.11 is operated under a pressure at 1 MPa. The specific capacity of the battery is measured.

Example 6.1.3.12

The battery from Example 4.3.12 is operated under a pressure at 1 MPa. The specific capacity of the battery is measured.

Example 6.2.1.1

The battery from Example 4.1.1 is operated under a pressure at 2 MPa. The specific capacity of the battery is measured.

Example 6.2.1.2

The battery from Example 4.1.2 is operated under a pressure at 2 MPa. The specific capacity of the battery is measured.

Example 6.2.1.3

The battery from Example 4.1.3 is operated under a pressure at 2 MPa. The specific capacity of the battery is measured.

Example 6.2.1.4

The battery from Example 4.1.4 is operated under a pressure at 2 MPa. The specific capacity of the battery is measured.

Example 6.2.1.5

The battery from Example 4.1.5 is operated under a pressure at 2 MPa. The specific capacity of the battery is measured.

Example 6.2.1.6

The battery from Example 4.1.6 is operated under a pressure at 2 MPa. The specific capacity of the battery is measured.

Example 6.2.1.7

The battery from Example 4.1.7 is operated under a pressure at 2 MPa. The specific capacity of the battery is measured.

Example 6.2.1.8

The battery from Example 4.1.8 is operated under a pressure at 2 MPa. The specific capacity of the battery is measured.

Example 6.2.1.9

The battery from Example 4.1.9 is operated under a pressure at 2 MPa. The specific capacity of the battery is measured.

Example 6.2.1.10

The battery from Example 4.1.10 is operated under a pressure at 2 MPa. The specific capacity of the battery is measured.

Example 6.2.1.11

The battery from Example 4.1.11 is operated under a pressure at 2 MPa. The specific capacity of the battery is measured.

Example 6.2.1.12

The battery from Example 4.1.12 is operated under a pressure at 2 MPa. The specific capacity of the battery is measured.

Example 6.2.2.1

The battery from Example 4.2.1 is operated under a pressure at 2 MPa. The specific capacity of the battery is measured.

Example 6.2.2.2

The battery from Example 4.2.2 is operated under a pressure at 2 MPa. The specific capacity of the battery is measured.

Example 6.2.2.3

The battery from Example 4.2.3 is operated under a pressure at 2 MPa. The specific capacity of the battery is measured.

Example 6.2.2.4

The battery from Example 4.2.4 is operated under a pressure at 2 MPa. The specific capacity of the battery is measured.

Example 6.2.2.5

The battery from Example 4.2.5 is operated under a pressure at 2 MPa. The specific capacity of the battery is measured.

Example 6.2.2.6

The battery from Example 4.2.6 is operated under a pressure at 2 MPa. The specific capacity of the battery is measured.

Example 6.2.2.7

The battery from Example 4.2.7 is operated under a pressure at 2 MPa. The specific capacity of the battery is measured.

Example 6.2.2.8

The battery from Example 4.2.8 is operated under a pressure at 2 MPa. The specific capacity of the battery is measured.

Example 6.2.2.9

The battery from Example 4.2.9 is operated under a pressure at 2 MPa. The specific capacity of the battery is measured.

Example 6.2.2.10

The battery from Example 4.2.10 is operated under a pressure at 2 MPa. The specific capacity of the battery is measured.

Example 6.2.2.11

The battery from Example 4.2.11 is operated under a pressure at 2 MPa. The specific capacity of the battery is measured.

Example 6.2.2.12

The battery from Example 4.2.12 is operated under a pressure at 2 MPa. The specific capacity of the battery is measured.

Example 6.2.3.1

The battery from Example 4.3.1 is operated under a pressure at 2 MPa. The specific capacity of the battery is measured.

Example 6.2.3.2

The battery from Example 4.3.2 is operated under a pressure at 2 MPa. The specific capacity of the battery is measured.

Example 6.2.3.3

The battery from Example 4.3.3 is operated under a pressure at 2 MPa. The specific capacity of the battery is measured.

Example 6.2.3.4

The battery from Example 4.3.4 is operated under a pressure at 2 MPa. The specific capacity of the battery is measured.

Example 6.2.3.5

The battery from Example 4.3.5 is operated under a pressure at 2 MPa. The specific capacity of the battery is measured.

Example 6.2.3.6

The battery from Example 4.3.6 is operated under a pressure at 2 MPa. The specific capacity of the battery is measured.

Example 6.2.3.7

The battery from Example 4.3.7 is operated under a pressure at 2 MPa. The specific capacity of the battery is measured.

Example 6.2.3.8

The battery from Example 4.3.8 is operated under a pressure at 2 MPa. The specific capacity of the battery is measured.

Example 6.2.3.9

The battery from Example 4.3.9 is operated under a pressure at 2 MPa. The specific capacity of the battery is measured.

Example 6.2.3.10

The battery from Example 4.3.10 is operated under a pressure at 2 MPa. The specific capacity of the battery is measured.

Example 6.2.3.11

The battery from Example 4.3.11 is operated under a pressure at 2 MPa. The specific capacity of the battery is measured.

Example 6.2.3.12

The battery from Example 4.3.12 is operated under a pressure at 2 MPa. The specific capacity of the battery is measured.

Example 6.3.1.1

The battery from Example 4.1.1 is operated under a pressure at 3 MPa. The specific capacity of the battery is measured.

Example 6.3.1.2

The battery from Example 4.1.2 is operated under a pressure at 3 MPa. The specific capacity of the battery is measured.

Example 6.3.1.3

The battery from Example 4.1.3 is operated under a pressure at 3 MPa. The specific capacity of the battery is measured.

Example 6.3.1.4

The battery from Example 4.1.4 is operated under a pressure at 3 MPa. The specific capacity of the battery is measured.

Example 6.3.1.5

The battery from Example 4.1.5 is operated under a pressure at 3 MPa. The specific capacity of the battery is measured.

Example 6.3.1.6

The battery from Example 4.1.6 is operated under a pressure at 3 MPa. The specific capacity of the battery is measured.

Example 6.3.1.7

The battery from Example 4.1.7 is operated under a pressure at 3 MPa. The specific capacity of the battery is measured.

Example 6.3.1.8

The battery from Example 4.1.8 is operated under a pressure at 3 MPa. The specific capacity of the battery is measured.

Example 6.3.1.9

The battery from Example 4.1.9 is operated under a pressure at 3 MPa. The specific capacity of the battery is measured.

Example 6.3.1.10

The battery from Example 4.1.10 is operated under a pressure at 3 MPa. The specific capacity of the battery is measured.

Example 6.3.1.11

The battery from Example 4.1.11 is operated under a pressure at 3 MPa. The specific capacity of the battery is measured.

Example 6.3.1.12

The battery from Example 4.1.12 is operated under a pressure at 3 MPa. The specific capacity of the battery is measured.

Example 6.3.2.1

The battery from Example 4.2.1 is operated under a pressure at 3 MPa. The specific capacity of the battery is measured.

Example 6.3.2.2

The battery from Example 4.2.2 is operated under a pressure at 3 MPa. The specific capacity of the battery is measured.

Example 6.3.2.3

The battery from Example 4.2.3 is operated under a pressure at 3 MPa. The specific capacity of the battery is measured.

Example 6.3.2.4

The battery from Example 4.2.4 is operated under a pressure at 3 MPa. The specific capacity of the battery is measured.

Example 6.3.2.5

The battery from Example 4.2.5 is operated under a pressure at 3 MPa. The specific capacity of the battery is measured.

Example 6.3.2.6

The battery from Example 4.2.6 is operated under a pressure at 3 MPa. The specific capacity of the battery is measured.

Example 6.3.2.7

The battery from Example 4.2.7 is operated under a pressure at 3 MPa. The specific capacity of the battery is measured.

Example 6.3.2.8

The battery from Example 4.2.8 is operated under a pressure at 3 MPa. The specific capacity of the battery is measured.

Example 6.3.2.9

The battery from Example 4.2.9 is operated under a pressure at 3 MPa. The specific capacity of the battery is measured.

Example 6.3.2.10

The battery from Example 4.2.10 is operated under a pressure at 3 MPa. The specific capacity of the battery is measured.

Example 6.3.2.11

The battery from Example 4.2.11 is operated under a pressure at 3 MPa. The specific capacity of the battery is measured.

Example 6.3.2.12

The battery from Example 4.2.12 is operated under a pressure at 3 MPa. The specific capacity of the battery is measured.

Example 6.3.3.1

The battery from Example 4.3.1 is operated under a pressure at 3 MPa. The specific capacity of the battery is measured.

Example 6.3.3.2

The battery from Example 4.3.2 is operated under a pressure at 3 MPa. The 1 specific capacity of the battery is measured.

Example 6.3.3.3

The battery from Example 4.3.3 is operated under a pressure at 3 MPa. The specific capacity of the battery is measured.

Example 6.3.3.4

The battery from Example 4.3.4 is operated under a pressure at 3 MPa. The specific capacity of the battery is measured.

Example 6.3.3.5

The battery from Example 4.3.5 is operated under a pressure at 3 MPa. The specific capacity of the battery is measured.

Example 6.3.3.6

The battery from Example 4.3.6 is operated under a pressure at 3 MPa. The specific capacity of the battery is measured.

Example 6.3.3.7

The battery from Example 4.3.7 is operated under a pressure at 3 MPa. The specific capacity of the battery is measured.

Example 6.3.3.8

The battery from Example 4.3.8 is operated under a pressure at 3 MPa. The specific capacity of the battery is measured.

Example 6.3.3.9

The battery from Example 4.3.9 is operated under a pressure at 3 MPa. The specific capacity of the battery is measured.

Example 6.3.3.10

The battery from Example 4.3.10 is operated under a pressure at 3 MPa. The specific capacity of the battery is measured.

Example 6.3.3.11

The battery from Example 4.3.11 is operated under a pressure at 3 MPa. The specific capacity of the battery is measured.

Example 6.3.3.12

The battery from Example 4.3.12 is operated under a pressure at 3 MPa. The specific capacity of the battery is measured.

Example 6.4.1.1

The battery from Example 4.1.1 is operated under a pressure at 4 MPa. The specific capacity of the battery is measured.

Example 6.4.1.2

The battery from Example 4.1.2 is operated under a pressure at 4 MPa. The specific capacity of the battery is measured.

Example 6.4.1.3

The battery from Example 4.1.3 is operated under a pressure at 4 MPa. The specific capacity of the battery is measured.

Example 6.4.1.4

The battery from Example 4.4.1.4 is operated under a pressure at 4 MPa. The specific capacity of the battery is measured.

Example 6.4.1.5

The battery from Example 4.1.5 is operated under a pressure at 4 MPa. The specific capacity of the battery is measured.

Example 6.4.1.6

The battery from Example 4.1.6 is operated under a pressure at 4 MPa. The specific capacity of the battery is measured.

Example 6.4.1.7

The battery from Example 4.1.7 is operated under a pressure at 4 MPa. The specific capacity of the battery is measured.

Example 6.4.1.8

The battery from Example 4.1.8 is operated under a pressure at 4 MPa. The specific capacity of the battery is measured.

Example 6.4.1.9

The battery from Example 4.1.9 is operated under a pressure at 4 MPa. The specific capacity of the battery is measured.

Example 6.4.1.10

The battery from Example 4.1.10 is operated under a pressure at 4 MPa. The specific capacity of the battery is measured.

Example 6.4.1.11

The battery from Example 4.1.11 is operated under a pressure at 4 MPa. The specific capacity of the battery is measured.

Example 6.4.1.12

The battery from Example 4.1.12 is operated under a pressure at 4 MPa. The specific capacity of the battery is measured.

Example 6.4.2.1

The battery from Example 4.2.1 is operated under a pressure at 4 MPa. The specific capacity of the battery is measured.

Example 6.4.2.2

The battery from Example 4.2.2 is operated under a pressure at 4 MPa. The specific capacity of the battery is measured.

Example 6.4.2.3

The battery from Example 4.2.3 is operated under a pressure at 4 MPa. The specific capacity of the battery is measured.

Example 6.4.2.4

The battery from Example 4.2.4 is operated under a pressure at 4 MPa. The specific capacity of the battery is measured.

Example 6.4.2.5

The battery from Example 4.2.5 is operated under a pressure at 4 MPa. The specific capacity of the battery is measured.

Example 6.4.2.6

The battery from Example 4.2.6 is operated under a pressure at 4 MPa. The specific capacity of the battery is measured.

Example 6.4.2.7

The battery from Example 4.2.7 is operated under a pressure at 4 MPa. The specific capacity of the battery is measured.

Example 6.4.2.8

The battery from Example 4.2.8 is operated under a pressure at 4 MPa. The specific capacity of the battery is measured.

Example 6.4.2.9

The battery from Example 4.2.9 is operated under a pressure at 4 MPa. The specific capacity of the battery is measured.

Example 6.4.21.10

The battery from Example 4.2.10 is operated under a pressure at 4 MPa. The specific capacity of the battery is measured.

Example 6.4.2.11

The battery from Example 4.2.11 is operated under a pressure at 4 MPa. The specific capacity of the battery is measured.

Example 6.4.2.12

The battery from Example 4.2.12 is operated under a pressure at 4 MPa. The specific capacity of the battery is measured.

Example 6.4.3.1

The battery from Example 4.3.1 is operated under a pressure at 4 MPa. The specific capacity of the battery is measured.

Example 6.4.3.2

The battery from Example 4.3.2 is operated under a pressure at 4 MPa. The specific capacity of the battery is measured.

Example 6.4.3.3

The battery from Example 4.3.3 is operated under a pressure at 4 MPa. The specific capacity of the battery is measured.

Example 6.4.3.4

The battery from Example 4.3.4 is operated under a pressure at 4 MPa. The specific capacity of the battery is measured.

Example 6.4.3.5

The battery from Example 4.3.5 is operated under a pressure at 4 MPa. The specific capacity of the battery is measured.

Example 6.4.3.6

The battery from Example 4.3.6 is operated under a pressure at 4 MPa. The specific capacity of the battery is measured.

Example 6.4.3.7

The battery from Example 4.3.7 is operated under a pressure at 4 MPa. The specific capacity of the battery is measured.

Example 6.4.3.8

The battery from Example 4.3.8 is operated under a pressure at 4 MPa. The specific capacity of the battery is measured.

Example 6.4.3.9

The battery from Example 4.3.9 is operated under a pressure at 4 MPa. The specific capacity of the battery is measured.

Example 6.4.3.10

The battery from Example 4.3.10 is operated under a pressure at 4 MPa. The specific capacity of the battery is measured.

Example 6.4.3.11

The battery from Example 4.3.11 is operated under a pressure at 4 MPa. The specific capacity of the battery is measured.

Example 6.4.3.12

The battery from Example 4.3.12 is operated under a pressure at 4 MPa. The specific capacity of the battery is measured.

Example 6.5.1.1

The battery from Example 4.1.1 is operated under a pressure at 5 MPa. The specific capacity of the battery is measured.

Example 6.5.1.2

The battery from Example 4.1.2 is operated under a pressure at 5 MPa. The specific capacity of the battery is measured.

Example 6.5.1.3

The battery from Example 4.1.3 is operated under a pressure at 5 MPa. The specific capacity of the battery is measured.

Example 6.5.1.4

The battery from Example 4.1.4 is operated under a pressure at 5 MPa. The specific capacity of the battery is measured.

Example 6.5.1.5

The battery from Example 4.1.5 is operated under a pressure at 5 MPa. The specific capacity of the battery is measured.

Example 6.5.1.6

The battery from Example 4.1.6 is operated under a pressure at 5 MPa. The specific capacity of the battery is measured.

Example 6.5.1.7

The battery from Example 4.1.7 is operated under a pressure at 5 MPa. The specific capacity of the battery is measured.

Example 6.5.1.8

The battery from Example 4.1.8 is operated under a pressure at 5 MPa. The specific capacity of the battery is measured.

Example 6.5.1.9

The battery from Example 4.1.9 is operated under a pressure at 5 MPa. The specific capacity of the battery is measured.

Example 6.5.1.10

The battery from Example 4.1.10 is operated under a pressure at 5 MPa. The specific capacity of the battery is measured.

Example 6.5.1.11

The battery from Example 4.1.11 is operated under a pressure at 5 MPa. The specific capacity of the battery is measured.

Example 6.5.1.12

The battery from Example 4.1.12 is operated under a pressure at 5 MPa. The specific capacity of the battery is measured.

Example 6.5.2.1

The battery from Example 4.2.1 is operated under a pressure at 5 MPa. The specific capacity of the battery is measured.

Example 6.5.2.2

The battery from Example 4.2.2 is operated under a pressure at 5 MPa. The specific capacity of the battery is measured.

Example 6.5.2.3

The battery from Example 4.2.3 is operated under a pressure at 5 MPa. The specific capacity of the battery is measured.

Example 6.5.2.4

The battery from Example 4.2.4 is operated under a pressure at 5 MPa. The specific capacity of the battery is measured.

Example 6.5.2.5

The battery from Example 4.2.5 is operated under a pressure at 5 MPa. The specific capacity of the battery is measured.

Example 6.5.2.6

The battery from Example 4.2.6 is operated under a pressure at 5 MPa. The specific capacity of the battery is measured.

Example 6.5.2.7

The battery from Example 4.2.7 is operated under a pressure at 5 MPa. The specific capacity of the battery is measured.

Example 6.5.2.8

The battery from Example 4.2.8 is operated under a pressure at 5 MPa. The specific capacity of the battery is measured.

Example 6.5.2.9

The battery from Example 4.2.9 is operated under a pressure at 5 MPa. The specific capacity of the battery is measured.

Example 6.5.2.10

The battery from Example 4.2.10 is operated under a pressure at 5 MPa. The specific capacity of the battery is measured.

Example 6.5.2.11

The battery from Example 4.2.11 is operated under a pressure at 5 MPa. The specific capacity of the battery is measured.

Example 6.5.2.12

The battery from Example 4.2.12 is operated under a pressure at 5 MPa. The specific capacity of the battery is measured.

Example 6.5.3.1

The battery from Example 4.3.1 is operated under a pressure at 5 MPa. The specific capacity of the battery is measured.

Example 6.5.3.2

The battery from Example 4.3.2 is operated under a pressure at 5 MPa. The specific capacity of the battery is measured.

Example 6.5.3.3

The battery from Example 4.3.3 is operated under a pressure at 5 MPa. The specific capacity of the battery is measured.

Example 6.5.3.4

The battery from Example 4.3.4 is operated under a pressure at 5 MPa. The 1 specific capacity of the battery is measured.

Example 6.5.3.5

The battery from Example 4.3.5 is operated under a pressure at 5 MPa. The specific capacity of the battery is measured.

Example 6.5.3.6

The battery from Example 4.3.6 is operated under a pressure at 5 MPa. The specific capacity of the battery is measured.

Example 6.5.3.7

The battery from Example 4.3.7 is operated under a pressure at 5 MPa. The specific capacity of the battery is measured.

Example 6.5.3.8

The battery from Example 4.3.8 is operated under a pressure at 5 MPa. The specific capacity of the battery is measured.

Example 6.5.3.9

The battery from Example 4.3.9 is operated under a pressure at 5 MPa. The specific capacity of the battery is measured.

Example 6.5.3.10

The battery from Example 4.3.10 is operated under a pressure at 5 MPa. The specific capacity of the battery is measured.

Example 6.5.3.11

The battery from Example 4.3.11 is operated under a pressure at 5 MPa. The specific capacity of the battery is measured.

Example 6.5.3.12

The battery from Example 4.3.12 is operated under a pressure at 5 MPa. The specific capacity of the battery is measured.

Combinations and Characteristics Included

Various features and characteristics are described in this specification to provide an understanding of the composition, structure, production, function, and/or operation of the present disclosure, which includes the disclosed compositions, coatings, and methods. It is understood that the various features and characteristics of the present disclosure described in this specification can be combined in any suitable manner, regardless of whether such features and characteristics are expressly described in combination in this specification. The Inventors and the Applicant expressly intend such combinations of features and characteristics to be included within the scope of the present disclosure described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

INCORPORATED BY REFERENCE

Any patent, publication, or other document identified in this specification is incorporated by reference into this specification in its entirety unless otherwise indicated but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification but that conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with the written description, sufficiency of description, and added matter requirements.

Illustration of Various Aspects

While the present disclosure provides descriptions of various specific aspects for the purpose of illustrating various aspects of the present disclosure and/or its potential applications, it is understood that variations and modifications will occur to those skilled in the art. Accordingly, the present disclosure herein should be understood to be at least as broad as claimed and not as more narrowly defined by particular illustrative aspects provided herein.

What is claimed is:

1. A solid state battery comprising:
a cathode;
an anode;
a solid electrolyte layer positioned between the cathode and the anode and configured to enable transport of lithium ions between the cathode and the anode,
wherein the solid electrolyte layer comprises:
particles comprising a sulfide-containing material; and
an additive material represented by A-B-C (Chemical Formula 1),
wherein A is a thiol group (S—H) or a leaving group,
wherein A is configured to interact with sulfur of the sulfide-containing material of the particles, wherein at least part of the additive material is interposed between two immediately neighboring ones of the particles,
wherein when A is a leaving group, A is selected from the group consisting of chloride, bromide, iodide, tosylate (p-toluenesulfonate) or mesylate (methanesulfonate) groups, acetate or trifluoroacetate groups, phosphate or phosphonate groups, carboxylate groups, alkoxide groups, amine groups, cyano (CN) groups, azide (N3) groups, sulfonate groups, a triethoxysilyl moiety, trimethoxysilyl, and combinations thereof,
wherein B is a substituted or unsubstituted C3-C20 perfluoroalkylene group, wherein B comprises a group derived from an alkane selected from the group consisting of Propane, n-Butane ($CH_3CH_2CH_2CH_3$), Isobutane ($CH_3CH(CH_3)_2$), n-Pentane ($CH_3(CH_2)_3CH_3$), Isopentane (2-methylbutane, $CH_3CH_2CH(CH_3)_2$), Neopentane (2,2-dimethylpropane, $(CH_3)_4C$), n-Hexane ($CH_3(CH_2)_4CH_3$), 2-Methylpentane ($CH_3CH_2CH_2CH(CH_3)CH_3$), 3-Methylpentane ($CH_3CH_2CH(CH_3)CH_2CH_3$), 2,2-Dimethylbutane ($CH_3C(CH_3)_2CH_2CH_3$), 2,3-Dimethylbutane ($CH_3CH(CH_3)CH(CH_3)CH_3$), n-Heptane ($CH_3(CH_2)_2CH_3$), 2-Methylhexane ($CH_3CH_2CH_2CH_2CH(CH_3)CH_3$), 3-Methylhexane ($CH_3CH_2CH_2CH(CH_3)CH_2CH_3$), 2,2-Dimethylpentane ($CH_3C(CH_3)_2CH_2CH_2CH_3$), 2,3-Dimethylpentane ($CH_3CH(CH_3)CH_2CH(CH_3)CH_3$), 2,4-Dimethylpentane ($CH_3CH(CH_3)CH_2CH_2CH(CH_3)CH_3$), 3,3-Dimethylpentane ($CH_3CH_2CH(CH_3)_2CH_2CH_3$), 3-Ethylpentane ($CH_3CH_2CH_2CH(CH_2CH_3)CH_3$), 2,2,3-Trimethylbutane (($CH_3)_2CHCH_2CH(CH_3)_2$), n-Octane ($CH_3(CH_2)_6CH_3$), 2-Methylheptane ($CH_3CH_2CH_2CH_2CH_2CH(CH_3)CH_3$), 3-Methylheptane ($CH_3CH_2CH_2CH_2CH(CH_3)CH_2CH_3$), 4-Methylheptane ($CH_3CH_2CH_2CH(CH_3)CH_2CH_2CH_3$), 2,2-Dimethylhexane ($CH_3C(CH_3)_2(CH_2)_4CH_3$), 2,3-Dimethylhexane ($CH_3CH(CH_3)CH_2CH_2CH(CH_3)CH_3$), 2,4-Dimethylhexane ($CH_3CH(CH_3)CH_2CH_2CH_2CH(CH_3)CH_3$), 3,3-Dimethylhexane ($CH_3CH_2CH(CH_3)_2CH_2CH_2CH_3$), 3,4-Dimethylhexane ($CH_3CH_2CH(CH_3)CH_2CH(CH_3)CH_3$), 2,2,4-Trimethylpentane (isooctane, $CH_3CH(CH_3)_2CH(CH_3)_2$), 2-Ethylhexane ($CH_3CH_2CH(CH_2CH_3)CH_2CH_3$), n-Nonane ($CH_3(CH_2)_7CH_3$), 2-Methyloctane ($CH_3CH_2CH_2CH_2CH_2CH_2CH(CH_3)CH_3$), 3-Methyloctane ($CH_3CH_2CH_2CH_2CH_2CH(CH_3)CH_2CH_3$), 2,2-Dimethylheptane ($CH_3C(CH_3)_2(CH_2)_5CH_3$), 2,3-Dimethylheptane ($CH_3CH(CH_3)CH_2CH_2CH_2CH_2CH(CH_3)CH_3$), 2,4-Dimethylheptane ($CH_3CH(CH_3)CH_2CH_2CH(CH_3)CH_2CH_3$), 2,2,4-Trimethylhexane ($CH_3C(CH_3)_2CH_2CH(CH_3)_2CH_2CH_3$), 3,3-Dimethylheptane ($CH_3CH_2CH(CH_3)_2CH_2CH_2CH_2CH_3$), 3-Ethylheptane ($CH_3CH_2CH_2CH(CH_2CH_3)CH_2CH_3$), n-Decane ($CH_3(CH_2)_8CH_3$), 2-Methylnonane ($CH_3CH_2CH_2CH_2CH_2CH_2CH_2CH(CH_3)CH_3$), 3-Methylnonane ($CH_3CH_2CH_2CH_2CH_2CH_2CH(CH_3)CH_2CH_3$), 2,2-Dimethyloctane ($CH_3C(CH_3)_2(CH_2)_6CH_3$), 2,3-Dimethyloctane ($CH_3CH(CH_3)CH_2CH_2CH_2CH_2CH_2CH(CH_3)CH_3$), 2,4-Dimethyloctane ($CH_3CH(CH_3)CH_2CH_2CH_2CH(CH_3)CH_2CH_3$), 2,5-Dimethyloctane ($CH_3CH_2CH(CH_3)CH_2CH_2CH_2CH_2CH_3$), 3,3-Dimethyloctane ($CH_3CH_2CH(CH_3)_2CH_2CH_2CH(CH_3)CH_2CH_3$), 2-Ethyloctane ($CH_3CH_2CH(CH_2CH_3)CH_2CH_2CH_3$), n-Undecane ($C_{11}H_{24}$) and its branched isomers, n-Dodecane ($C_{12}H_{26}$) and its branched isomers, n-Tridecane ($C_{13}H_{28}$) and its branched isomers, n-Tetradecane ($C_{14}H_{30}$) and its branched isomers, n-Pentadecane ($C_{15}H_{32}$) and its branched isomers, n-Hexadecane ($C_{16}H_{34}$) and its branched isomers, n-Heptadecane ($C_{17}H_{36}$) and its branched isomers, n-Octadecane ($C_{18}H_{38}$) and its branched isomers, n-Nonadecane ($C_{19}H_{40}$) and its branched isomers, n-Eicosane ($C_{20}H_{42}$) and its branched isomers,
wherein when B is an unsubstituted C3-C20 perfluoroalkylene group, all hydrogen atoms of the group derived from the alkane are substituted by fluorine atoms,
wherein when B is a substituted C3-C20 perfluoroalkylene group, one or more hydrogen atoms of the group derived from the alkane are each substituted by a substituent, and all the other hydrogen atoms of the group derived from the alkane are substituted by fluorine atoms, wherein the substituent is selected from the group consisting of Chloro (—Cl), Bromo (—Br), Iodo (—I), Hydroxyl (—OH), Ether (—OR), Aldehyde (—CHO), Ketone (—CO), Carboxyl (—COOH), Ester (—COOR), Peroxide (—O—O—), Amino (—NH$_2$), Secondary amine (—NHR), Tertiary amine (—NR$_2$) >, Nitro (—NO$_2$), Cyanide (—CN), Amide (—CONH$_2$), substituted amides (—CONHR, —CONR$_2$), Thiol (—SH), Sulfide (—SR), Sulfonyl (—SO$_2$R), Sulfate (—SO$_4$R), Phosphate (—PO$_4$R$_2$), Phosphine (—PR$_2$); Alkyl (—R), Alkylene (—R=R), Cycloalkyl (—R), Aryl (—Ar), Benzyl (—C$_6$H$_5$CH$_2$), Alkenyl (—C=C—), Alkynyl (—C≡C—), Aromatic rings, Acyl (—COR); Sulfonyl (—SO$_2$R); Carbamoyl (—CONH$_2$); Isonitrile (—NC); Azide (—N$_3$), Perfluoroalkyl (—CF$_3$) and other fluoroalkyl chains, Acetal (—RCH(OR)$_2$), Ketal (—RC(OR)$_2$R), and Organometallic groups, and wherein C is a sulfonate, a phosphate, er a sulfonate salt, or a phosphate salt, wherein the sulfonate salt or the phosphate salt is a salt with at least one selected from the group consisting of sodium (Na), potassium (K), lithium (Li), rubidium sulfonate (Rb), cesium (Cs), calcium (Ca), magnesium (Mg), strontium sulfonate (Sr), a barium (Ba), iron (II) (Fe II), iron (III), (Fe III), copper (I) (Cu I), copper (II) (Cu II), zinc (Zn), manganese (Mn), ammonium (NH$_4^+$), methylammonium (CH$_3$NH$_3^+$), dimethylammonium (—(CH$_3$)$_2$NH$_2^+$), trimethylammonium ((CH$_3$)$_3$N$^+$), pyridinium (C$_5$H$_5$NH$^+$), lead (II) (Pb), mercury (II) (Hg), cadmium (Cd), lanthanum (La), cerium (Ce), uranium (U), sodium-calcium (Na—Ca), potassium-magnesium (K—Mg), tetramethylammonium (N(CH$_3$)$_4^+$), imidazolium (C$_3$H$_4$NH$_2^+$), phosphonium (P$^+$ (CH$_3$)$_4$), and guanidinium (C(NH$_2$)$_3^+$).

2. The solid state battery of claim 1, wherein the at least part of the additive material contacts surfaces of either of the two immediately neighboring ones of the particles.

3. The solid state battery of claim 2, wherein the at least part of the additive material contacts surfaces of either of the two immediately neighboring ones of the particles by at least one of a covalent bond or a non-covalent attachment.

4. The solid state battery of claim 1, wherein the additive material is not in the form of particles.

5. The solid state battery of claim 1, wherein the solid state battery is configured to operate at a pressure under 10 MPa that is substantially lower than a pressure that would be required in the absence of the additive material in the solid electrolyte layer.

6. The solid state battery of claim 1, wherein the sulfide-containing material comprises lithium phosphorus sulfur chloride (LPSCI).

7. The solid state battery of claim 1, wherein the additive material is selected from the group consisting of

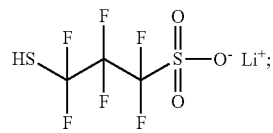

(Chemical Formula 2)

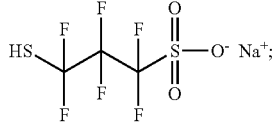

(Chemical Formula 3)

-continued

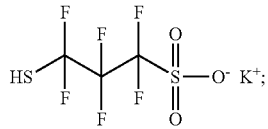

(Chemical Formula 4)

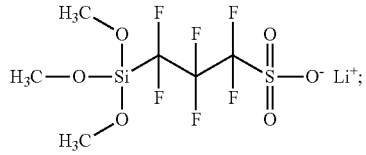

(Chemical Formula 5)

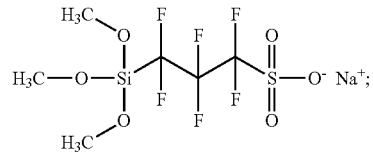

(Chemical Formula 6)

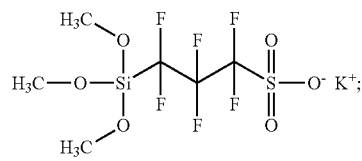

(Chemical Formula 7)

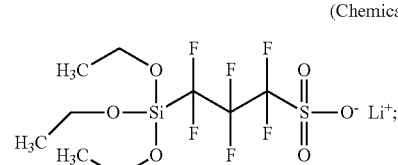

(Chemical Formula 8)

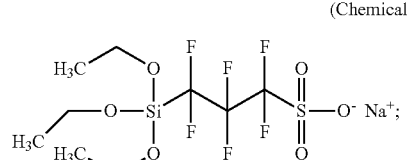

(Chemical Formula 9)

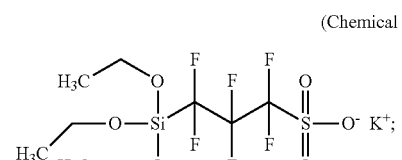

(Chemical Formula 10)

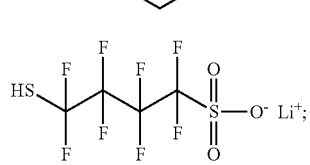

(Chemical Formula 11)

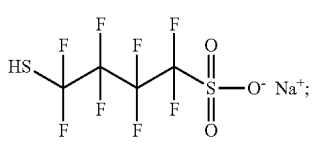

(Chemical Formula 12)

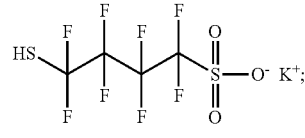

(Chemical Formula 13)

-continued
(Chemical Formula 14)
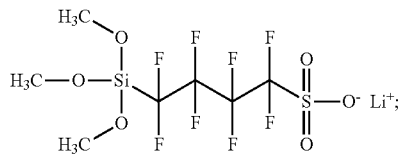
(Chemical Formula 15)
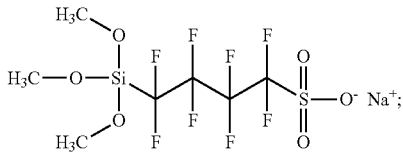
(Chemical Formula 16)
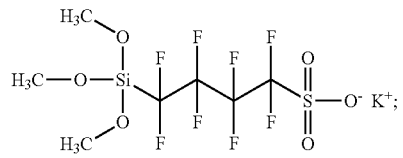
(Chemical Formula 17)
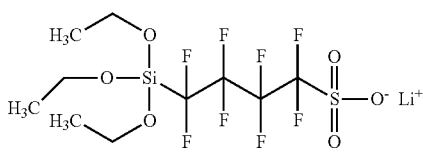
(Chemical Formula 18)
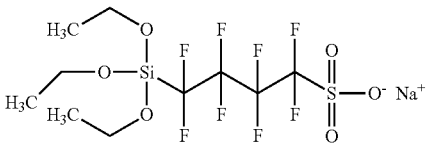
(Chemical Formula 19)
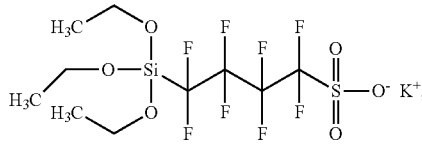
(Chemical Formula 20)
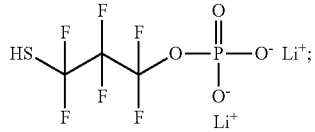
(Chemical Formula 21)
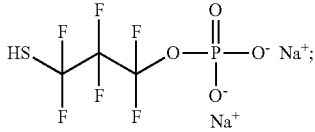
(Chemical Formula 22)
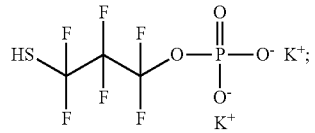
-continued
(Chemical Formula 23)
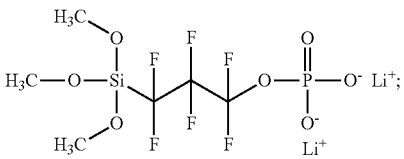
(Chemical Formula 24)
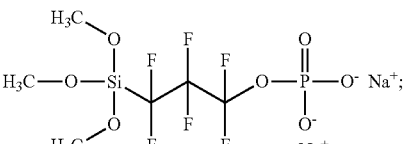
(Chemical Formula 25)
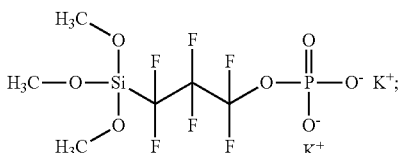
(Chemical Formula 26)
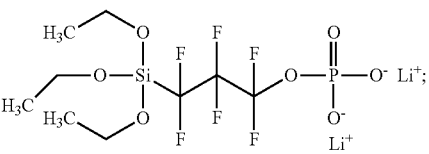
(Chemical Formula 27)
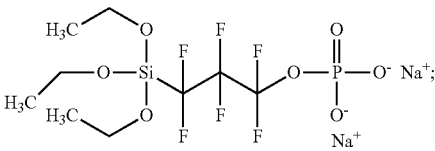
(Chemical Formula 28)
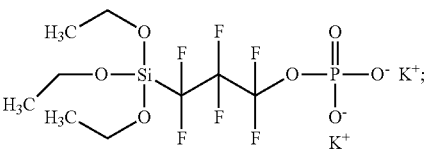
(Chemical Formula 29)
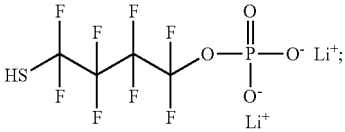
(Chemical Formula 30)
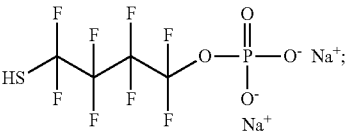
(Chemical Formula 31)
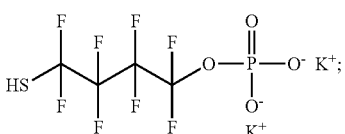

-continued

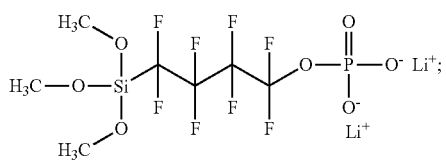
(Chemical Formula 32)

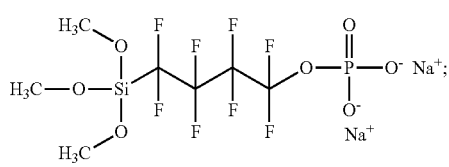
(Chemical Formula 33)

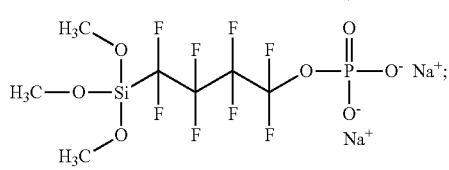
(Chemical Formula 33)

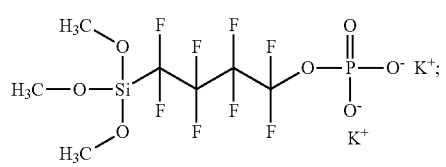
(Chemical Formula 34)

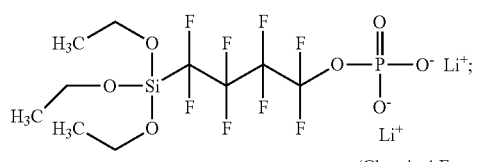
(Chemical Formula 35)

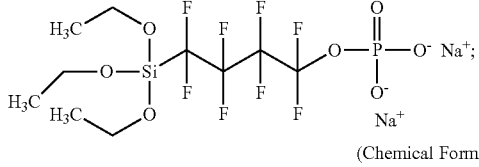
(Chemical Formula 36)

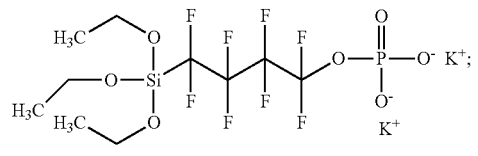
(Chemical Formula 37)

and combinations thereof.

8. The solid state battery of claim 1, wherein the sulfide-containing material has a first hardness of about 0.1 to about 1 GPa obtained from nanoindentation tests, and the additive material has a second hardness of about 0.001 to about 0.01 GPa obtained from nanoindentation tests.

9. The solid state battery of claim 1, wherein the solid electrolyte layer comprises the sulfide-containing material and the additive material in a weight ratio of from about 1:1 to about 25:1.

10. The solid state battery of claim 1, wherein the solid state battery is configured to operate under a pressure of less than 5 MPa.

11. The solid state battery of claim 1, wherein the solid state battery has a specific capacity of greater than 100 mAh/g.

12. The solid state battery of claim 1, wherein the additive material is in a powder form.

13. The solid state battery of claim 1, wherein the solid electrolyte layer has a porosity of from about 5% to about 15%.

14. The solid state battery of claim 1, wherein the solid electrolyte layer has a density increased by more than about 10% compared to one without the additive material.

15. An electric vehicle comprising the solid state battery of claim 1.

16. A solid state battery comprising:
a cathode;
an anode;
a solid electrolyte layer positioned between the cathode and the anode and configured to enable transport of lithium ions between the cathode and the anode, wherein the solid electrolyte layer comprises:
particles comprising a sulfide-containing material; and
an additive material selected from the group consisting of

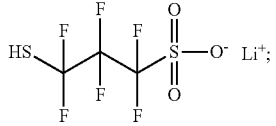
(Chemical Formula 2)

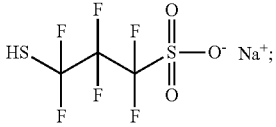
(Chemical Formula 3)

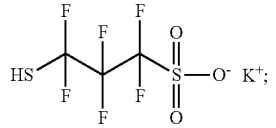
(Chemical Formula 4)

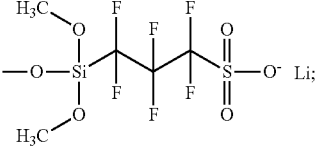
(Chemical Formula 5)

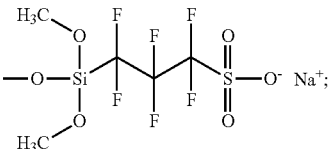
(Chemical Formula 6)

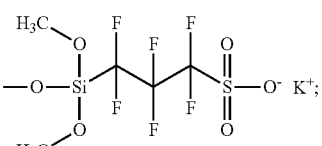
(Chemical Formula 7)

-continued
(Chemical Formula 8)
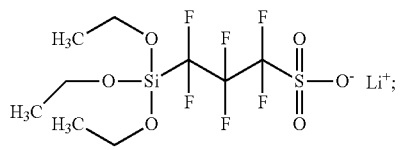
(Chemical Formula 9)
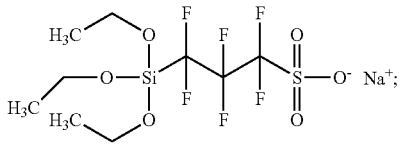
(Chemical Formula 10)
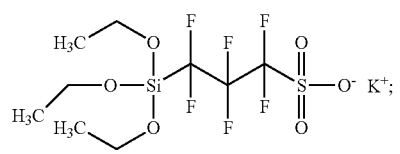
(Chemical Formula 11)
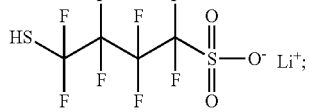
(Chemical Formula 12)
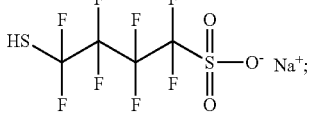
(Chemical Formula 13)
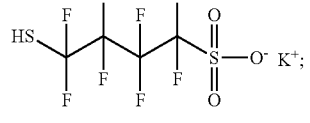
(Chemical Formula 14)
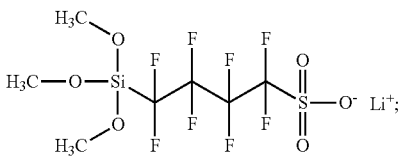
(Chemical Formula 15)
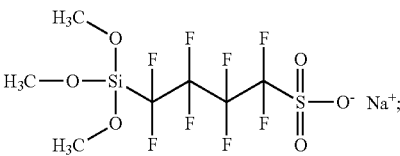
(Chemical Formula 16)
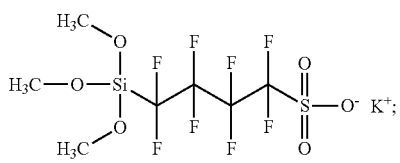
-continued
(Chemical Formula 17)
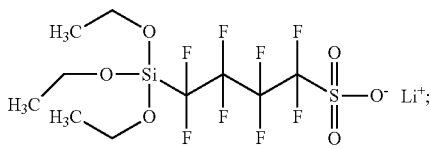
(Chemical Formula 18)
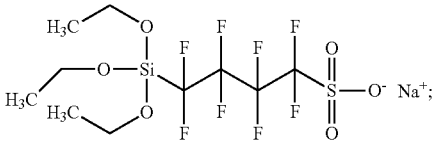
(Chemical Formula 19)
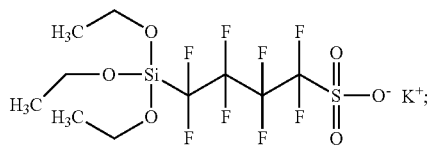
(Chemical Formula 20)
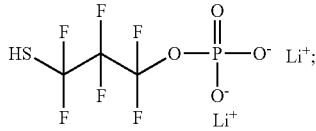
(Chemical Formula 21)
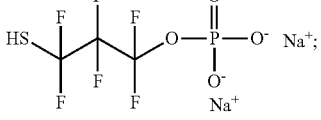
(Chemical Formula 22)
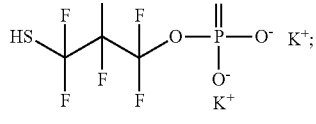
(Chemical Formula 23)
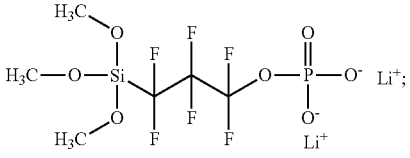
(Chemical Formula 24)
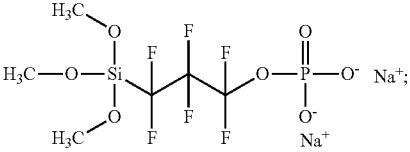
(Chemical Formula 25)
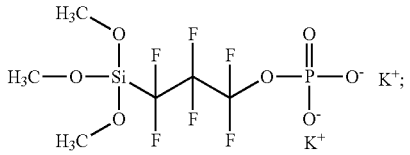

-continued (Chemical Formula 26)
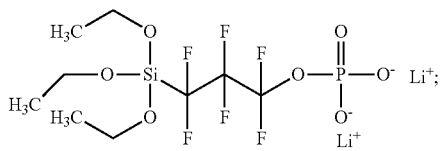

(Chemical Formula 27)
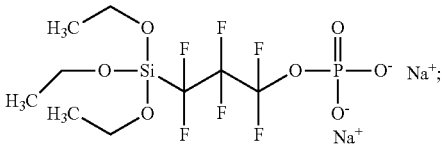

(Chemical Formula 28)
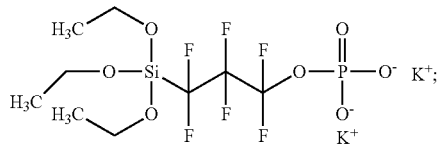

(Chemical Formula 29)
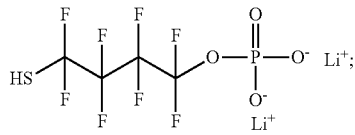

(Chemical Formula 30)
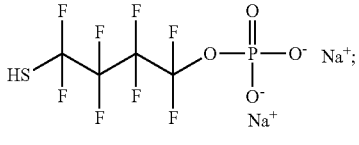

(Chemical Formula 31)
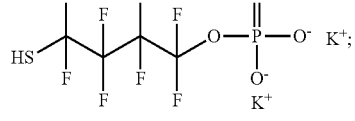

(Chemical Formula 32)
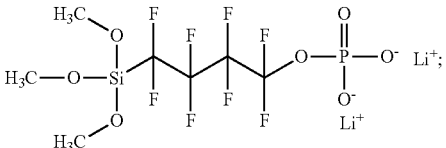

(Chemical Formula 33)
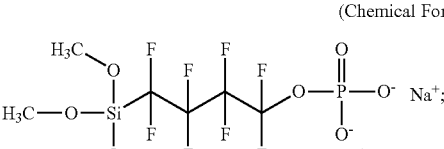

-continued (Chemical Formula 34)
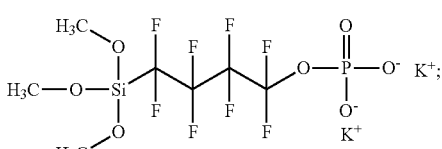

(Chemical Formula 35)
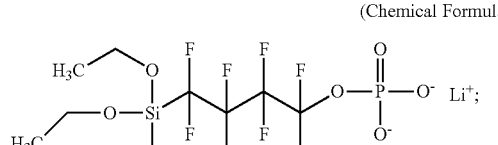

(Chemical Formula 36)
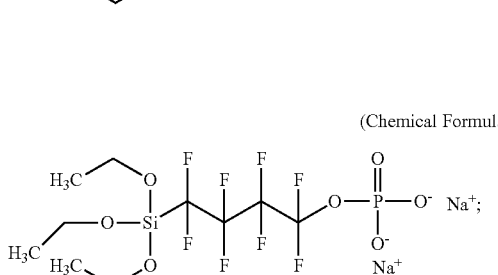

(Chemical Formula 37)
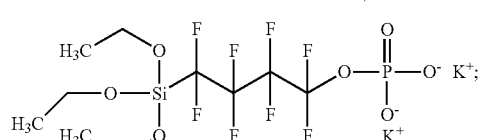

and combinations thereof.

17. The solid state battery of claim 16, wherein the additive material is configured to interact with sulfur of the sulfide-containing material of the particles, and wherein at least part of the additive material is interposed between two immediately neighboring ones of the particles and contacts surfaces of either of the two immediately neighboring ones of the particles by a covalent bond and/or a non-covalent attachment.

18. An electric vehicle comprising the solid state battery of claim 16.

* * * * *